United States Patent
Sawada et al.

(10) Patent No.: US 11,813,750 B2
(45) Date of Patent: Nov. 14, 2023

(54) PROGRAMMING SUPPORT APPARATUS, ROBOT SYSTEM, AND PROGRAMMING SUPPORT METHOD

(71) Applicant: KABUSHIKI KAISHA YASKAWA DENKI, Kitakyushu (JP)

(72) Inventors: Yukiko Sawada, Fukuoka (JP); Kanji Takanishi, Fukuoka (JP)

(*) Notice: Subject to any disclaimer, the term of this patent is extended or adjusted under 35 U.S.C. 154(b) by 324 days.

(21) Appl. No.: 16/655,254

(22) Filed: Oct. 17, 2019

(65) Prior Publication Data
US 2020/0047339 A1    Feb. 13, 2020

Related U.S. Application Data

(63) Continuation of application No. PCT/JP2018/016011, filed on Apr. 18, 2018.

(30) Foreign Application Priority Data

Apr. 19, 2017   (JP) ................................ 2017-083091

(51) Int. Cl.
*B25J 9/16* (2006.01)
*G05B 19/418* (2006.01)

(52) U.S. Cl.
CPC ...... *B25J 9/1661* (2013.01); *G05B 19/41865* (2013.01); *G05B 2219/34418* (2013.01); *G05B 2219/50391* (2013.01)

(58) Field of Classification Search
CPC .......... B25J 9/16; B25J 9/1656; B25J 9/1661; G05B 19/418; G05B 19/41865;
(Continued)

(56) References Cited

U.S. PATENT DOCUMENTS 6,292,715 B1   9/2001  Rongo
9,164,656 B1 * 10/2015  Keller .............. G05B 19/41865
(Continued)

FOREIGN PATENT DOCUMENTS

CN   1478638    3/2004
CN   1876334    12/2006
(Continued)

OTHER PUBLICATIONS

Carnes J R et al, "Task Planning for Autonomous Control Systems", Proceedings of the International Symposium on Intelligent Control. Arlington, Aug. 13-15, 1991, Aug. 13, 1991, P347-P352.
(Continued)

*Primary Examiner* — Khoi H Tran
*Assistant Examiner* — Sarah A Tran
(74) *Attorney, Agent, or Firm* — SOEI PATENT & LAW FIRM

(57) ABSTRACT

A programming support apparatus includes: a storage device configured to store work jobs each of which defines operation pattern of a robot; and circuitry configured to: set an environmental condition of the robot at one or more execution timings associated with the work jobs in accordance with user input; select a plurality of the work jobs in accordance with the user input; and check whether at least one work job of the plurality of work jobs satisfies the environmental condition of the robot at an execution timing of the one work job based on an execution flow of the plurality of work jobs.

23 Claims, 35 Drawing Sheets

(58) Field of Classification Search
CPC ...... G05B 2219/34; G05B 2219/34418; G05B 2219/50; G05B 2219/50391; Y02P 90/02
USPC .......................................................... 700/250
See application file for complete search history.

(56) References Cited

U.S. PATENT DOCUMENTS

| | | | |
|---|---|---|---|
| 9,351,569 B1* | 5/2016 | Lucey | B25J 15/0052 |
| 2004/0133312 A1* | 7/2004 | Watanabe | B25J 13/003 |
| | | | 700/264 |
| 2005/0137734 A1 | 6/2005 | Nieuwelaar et al. | |
| 2006/0276934 A1 | 12/2006 | Nihei et al. | |
| 2009/0306823 A1 | 12/2009 | Baltes et al. | |
| 2013/0321862 A1 | 12/2013 | Ishikawa | |
| 2014/0018959 A1 | 1/2014 | Matsui | |
| 2014/0172167 A1 | 6/2014 | Matsukuma et al. | |
| 2015/0045955 A1 | 2/2015 | Hashiguchi et al. | |
| 2016/0075019 A1 | 3/2016 | Tabuchi et al. | |
| 2016/0144506 A1 | 5/2016 | Natsume et al. | |
| 2016/0299789 A1* | 10/2016 | Mutoh | G06F 9/5066 |
| 2017/0329313 A1 | 11/2017 | Izumi et al. | |
| 2018/0046963 A1* | 2/2018 | Kobayashi | G06Q 10/06 |
| 2019/0321979 A1* | 10/2019 | Ahn | A47L 9/2852 |

FOREIGN PATENT DOCUMENTS

| | | |
|---|---|---|
| CN | 101648378 | 2/2010 |
| CN | 103433923 | 12/2013 |
| CN | 103458151 | 12/2013 |
| CN | 103862472 | 6/2014 |
| JP | 2010-253565 | 11/2010 |
| JP | 2011-156605 | 8/2011 |
| JP | 2014-117781 | 6/2014 |
| JP | 2015-033744 | 2/2015 |
| JP | 2016-059985 | 4/2016 |
| JP | 2016-099846 | 5/2016 |
| WO | 2012/140770 | 10/2012 |
| WO | 2016/125259 | 8/2016 |

OTHER PUBLICATIONS

Ueno H et al, "Model-Based Vision and Intelligent Task Scheduling for Autonomous Human-Type Robot Arm", Robotics and Autonomous Systems, Elsevier BV, Amsterdam, NL, vol. 18, No. 1/02, Jul. 1, 1996, P195-P206.
Office Action issued in European Patent Application No. 18788111.5, dated Feb. 9, 2023.
International Search Report dated Jul. 10, 2018 for PCT/JP2018/016011.
International Preliminary Report on Patentability with Written Opinion dated Oct. 31, 2019 for PCT/JP2018/016011.

* cited by examiner

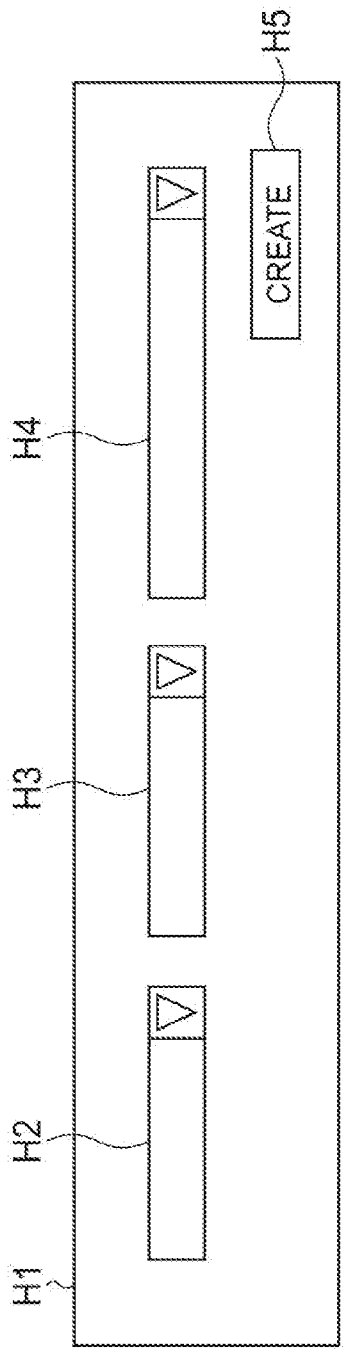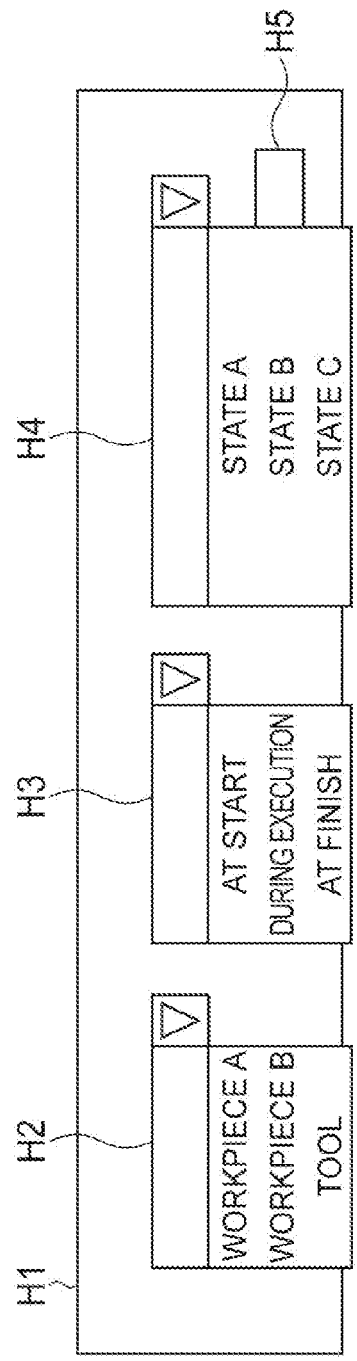

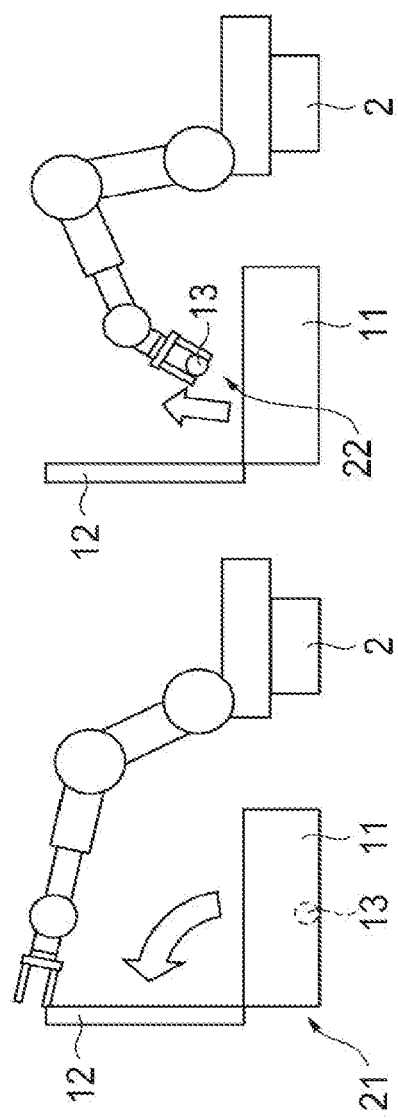
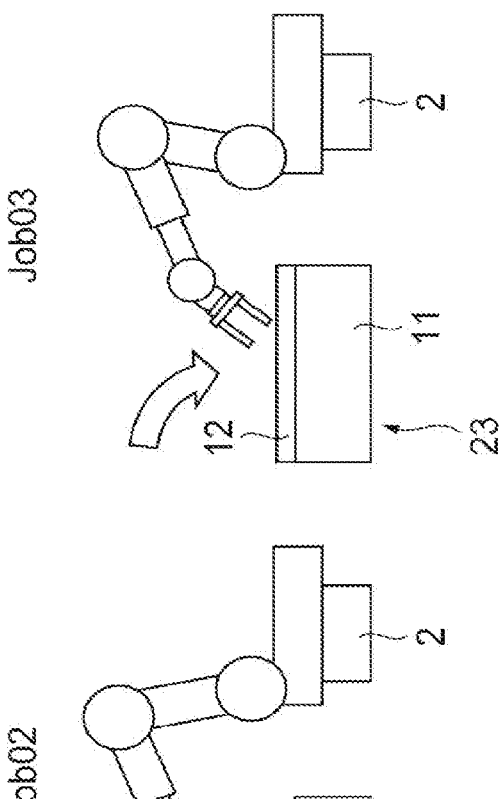
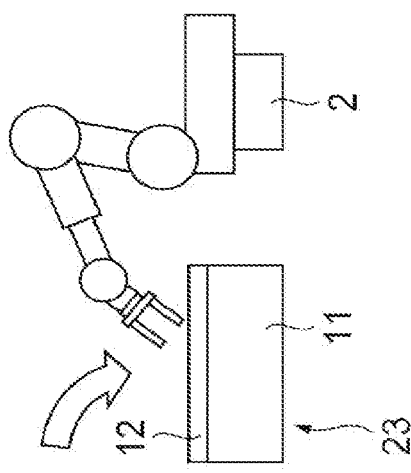

Fig. 32

| JOB ID | Work Object | First Restricting Condition | |
|---|---|---|---|
| | | Operation | Environmental Condition |
| Job01 | Lid 12 | Opening | Lid 12 is closed. |
| Job02 | Bolt 13 | Picking Out | Lid 12 is open. Bolt 13 is inside box 11. |
| Job03 | Lid 12 | Closing | Lid 12 is open. |

Fig.33

| Sequence No. | Job ID | Environmental Condition | Environmental State | |
|---|---|---|---|---|
| | | | Lid | Bolt |
| 01 | Job01 | Lid 12 is closed. | Closed -> Open | Inside the Box 11 |
| 02 | Job02 | Lid 12 is open. Bolt 13 is inside Box 11. | Open | Inside the Box 11 -> Outside the Box 11 |
| 03 | Job03 | Lid 12 is open. | Open -> Closed | Outside the Box 11 |

Fig.34

| JOB ID | Timing Condition |
|---|---|
| Job01 – Job02 | Job01 is before Job02. |
| Job02 – Job03 | Job03 is after Job02. |

Second Restricting Condition

PROGRAMMING SUPPORT APPARATUS, ROBOT SYSTEM, AND PROGRAMMING SUPPORT METHOD

CROSS-REFERENCE TO RELATED APPLICATION

This application is a continuation application of PCT Application No. PCT/JP2018/016011, filed on Apr. 18, 2018, which claims the benefit of priority from Japanese Patent Application No. 2017-083091, filed on Apr. 19, 2017, the entire contents of which are incorporated herein by reference.

BACKGROUND

1. Field

The present disclosure relates to a programming support apparatus, a robot system, and a programming support method.

2. Description of the Related Art

Japanese Unexamined Patent Publication No. 2016-59985 discloses work planner including: a divider that divides an action involving a plurality of executors into a plurality of actions for corresponding to the respective plurality of executors; and an adjustor that adjusts a start timing of at least one of a plurality of actions involving an identical executor among the plurality of actions based on dependency information indicating a relationship of dependency among the plurality of actions involving the action divided by the divider.

SUMMARY

An example programming support apparatus disclosed herein may include: a storage device configured to store work jobs each of which defines an operation pattern of a robot; and circuitry. The circuitry may be configured to: set an environmental condition of the robot at one or more execution timings associated with the work jobs in accordance with user input. The circuitry may be further configured to select a plurality of the work jobs in accordance with the user input. Furthermore, the circuitry may be configured to check whether at least one work job of the plurality of work jobs satisfies an environmental condition of the robot at an execution timing of the one work job based on an execution flow of the plurality of work jobs.

BRIEF DESCRIPTION OF THE DRAWINGS

FIGS. 12A and 12B are schematic diagrams illustrating a first restricting condition input window;
FIGS. 31A, 31B, and 31C are schematic representations of sequenced work jobs;
FIG. 32 is a table showing environmental conditions for each works job;
FIG. 33 is a table showing environmental state of work jobs at the time of execution;
FIG. 34 is a table showing example timing conditions.

DETAILED DESCRIPTION

Figure 1:
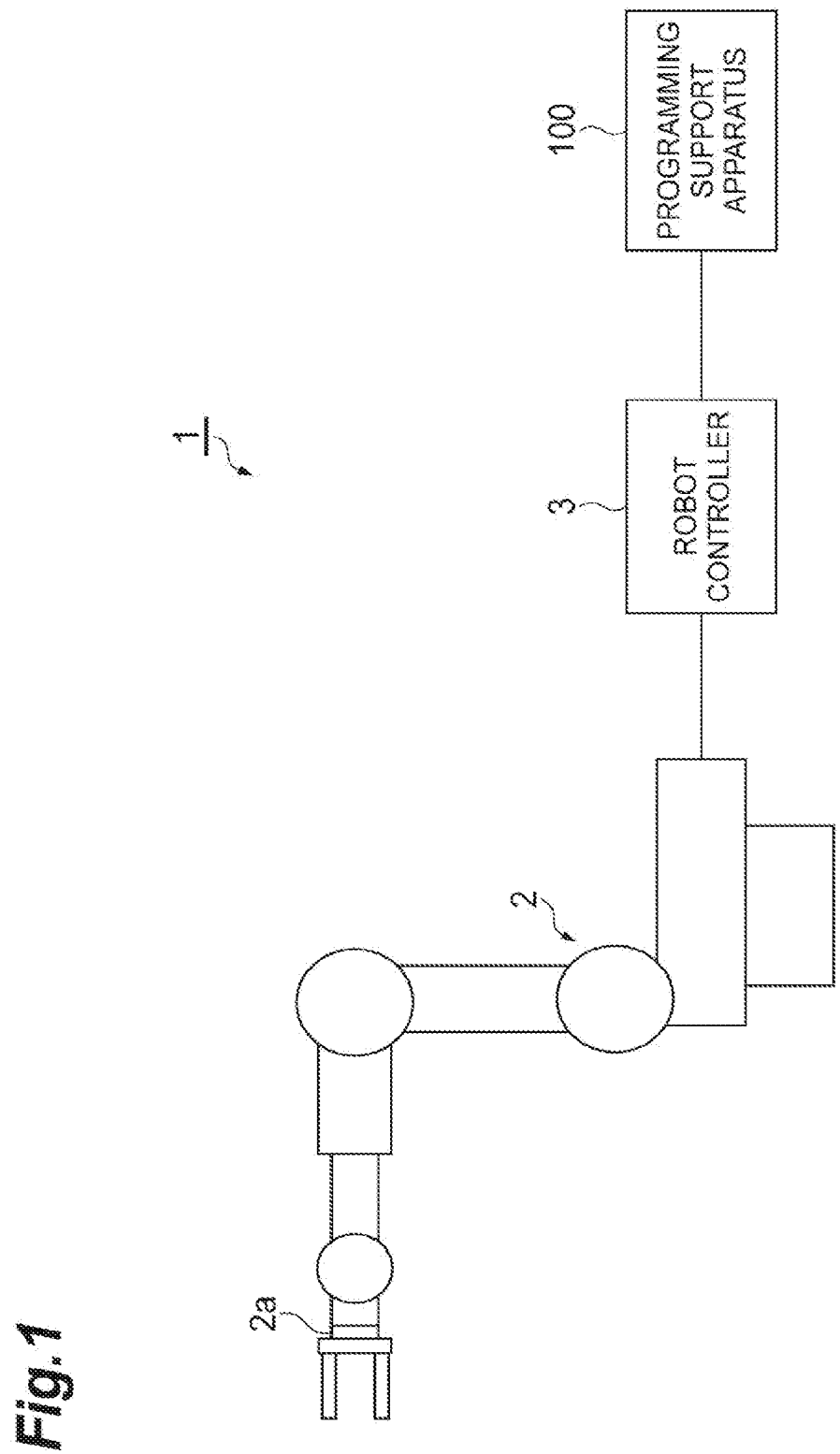
FIG. 1 is a schematic diagram illustrating a robot system.

Hereinafter, with reference to the drawings, the same element or similar elements having the same function are denoted by the same reference numerals, and redundant description is omitted. A robot system automates various types of work such as machining and assembly by causing a robot to execute operation taught by an operator.

1. Robot System

FIG. 1 shows a robot system 1 including a robot 2, a robot controller 3, and a programming support apparatus 100.

The robot 2 is a multi-axis (for example, six-axis or seven-axis) serial link type vertically articulated robot, for example, and is configured to execute various types of work by holding a tool with its distal end portion 2a. According to one or more examples, the robot 2 is capable of freely changing the position and attitude of the distal end portion 2a within a predetermined range. The robot 2 is not necessarily limited to a six-axis vertical articulated robot. For example, the robot 2 may be a seven-axis vertical articulated robot with one redundant axis added to the six axes.

The robot controller 3 controls the robot 2 in accordance with a pre-generated operation program. The operation program includes, for example, path information of the distal end portion 2a of the robot 2. The path information is information designating temporal transition of the position and attitude of the distal end portion 2a. For example, the path information includes a plurality of position and attitude target values listed in time series. The robot controller 3 calculates a joint angle target value (target value of angle of each of joints of the robot 2) to allow the position and attitude of the distal end portion 2a to match the above-described position and attitude target values, and controls the robot 2 in accordance with the obtained joint angle target value.

The programming support apparatus 100 is an apparatus to support programming of the above-described operation program. The programming support apparatus 100 is configured to execute: storing a plurality of work jobs defining the operation pattern of the robot 2; setting, in accordance with user input (ex. an input to a user interface), a first restricting environmental condition that is an execution restricting condition specifies an operation environment of the robot 2 for each of a plurality of one of the work jobs to be executed by the robot 2, in accordance with an input to a user interface; setting a plurality of work jobs to be executed by the robot in the plurality of work jobs in accordance with an input to the user interface; and determining, in an execution flow for defining an execution order of the plurality of work jobs set by the second condition setting unit, whether at least one of the work jobs satisfies the environmental condition based on the execution order. In some example, the programming support apparatus 100 may be configured to: set an environmental condition of the robot at one or more execution timings associated with the work jobs in accordance with user input; select a plurality of the work jobs in accordance with the user input; and check whether at least one work job of the plurality of work jobs satisfies an environmental condition of the robot at an execution timing of the one work job based on an execution flow of the plurality of work jobs.

The operation pattern is an operation command configured to command the robot 2 to execute predetermined work. The operation pattern includes the above-described path information during execution of the predetermined work.

The programming support apparatus 100 may identify an environmental state at the time of executing one of the work jobs in the execution flow based on the operational content (work content) of the robot 2 in another work job in the execution flow and the execution order of the execution flow; and check whether the environmental state satisfies the environmental condition of the one of the work jobs. In some examples, the programming support apparatus 100 may be configured to: identify an environmental state at the execution timing of the one work job of the execution flow based on a work content of the robot in another work job of the execution flow and an execution order of the plurality of work jobs in accordance with the execution flow; and check whether the environmental state satisfies the environmental condition of the one of the work jobs.

FIGS. 31A, 31B, and 31C schematically illustrate an execution flow including three work jobs for operating the robot 2 in an environment including the box 11 having the lid 12 and accommodating the bolt 13, for example. FIG. 31A shows an operation job "Job01" for opening the lid 12. FIG. 31B shows another work job "Job02" for taking out the bolt 13 from the box 11. FIG. 31C shows still another job "Job03" for closing the lid 12 of the box 11.

The operation pattern defined by each of Jobs 01, 02, 03 includes an operation of physically manipulating a work object. For example, the operation pattern defined by Job01 includes an operation of using the lid 12 as a work object to change the lid 12 from a closed state to an open state. The operation pattern defined by Job02 includes an operation of taking out the bolt 13 from the box 11. The operation pattern defined by Job03 includes an operation of closing the lid 12 from the open state to the closed state.

As shown in FIG. 32, the above-described environmental condition is set for each of Jobs 01, 02, and 03. Each environmental condition includes a condition that specifies the state of an object included in the work environment of the robot. An object included in the work environment of the robot may include the above-described work object and other objects. For example, the operation of opening the lid 12 of Job01 cannot be executed unless the lid 12 is closed. For this reason, in Job01, "the lid 12 is closed" is set as an environmental condition for designating the state of the lid 12 that is the work object of the job. The operation of taking out the bolt 13 from the box 11 of Job02 cannot be executed unless the bolt 13 is located in the box 11 and the lid 12 is open. For this reason, in Job02, "the bolt 13 is in the box 11" is set as an environmental condition for designating the state of the bolt 13 that is the work object of the job, and "the lid 12 is open" is set as an environmental condition for designating the state of the lid 12 that is another object. Further, the operation of closing the lid 12 of Job03 can be executed only when the lid 12 is open. For this reason, in Job03, "the lid 12 is open" is set as an environmental condition for designating the state of the lid 12 that is the work object of the job.

As shown in FIGS. 31A, 31B, and 31C, in a case that the execution flow includes two or more work jobs in order, the programming support apparatus 100 may be configured to identify the environmental state of a subsequent work job (hereinafter referred to as "second work job") based on at least the work content of the robot in a preceding work job (hereinafter referred to as "first work job"); and determine whether the environmental condition satisfies the environmental condition of the second work job. In some examples, the programming support apparatus may be configured to: identify an environmental state of the robot at an execution timing of the second work job based on at least a work content of the robot in the first work job; and check whether the environmental state satisfies the environmental condition at the execution timing of the second work job.

In some examples, in a case that an operation pattern defined by the first work job includes an operation of physically manipulating a work object, and that the environmental condition of the second work job includes a condition to identify a condition of the work object, the planning support apparatus 100 may be configured to: identify a state of the work object after the robot 2 operates in accordance with the first work job as an environmental state at the time of executing the second work job; and determine whether the environmental state satisfies the environmental condition of the second work job. In spine examples, wherein the work content of the first work job includes physically manipulating a work object, and wherein the environmental condition includes a condition of the work object, the programming support apparatus 100 may be configured to: identify a state of the work object after execution of the first work job as the environmental state at the execution timing of the second work job; and check whether the environmental state satisfies the environmental condition at the execution timing of the second work job.

The environmental state means a state that actually occurs in the work environment of the robot 2 at each timing in the execution flow when the robot 2 operates in accordance with the execution flow. Similar to the environmental condition, the environmental state includes a state of an object included in the work environment of the robot 2. The object included in the work environment of the robot 2 may include the above-described work object and other objects.

For example, as illustrated in FIG. 33, the programming support apparatus 100 identifies "open", which is the state of the lid 12 after the robot operates according to Job01, as the environmental state at the execution timing of Job02. Further, since Job01 does not include an operation for the bolt 13, the programming support apparatus 100 does not change the state of the bolt 13 before and after the robot 2 operates according to Job01, and continues to keep the state of the bolt 13 in Job02 "In box 11". The programming support apparatus 100 determines whether or not these environmental state satisfy the environmental condition of Job02. Since the environmental conditions in Job02 include "the bolt 13 is in the box 11" and "the lid 12 is open", the environmental state satisfies the environmental condition in Job02.

In a case that the execution flow includes the first work job, the second work job, and a third work job in this order, the planning support apparatus 100 may be configured to: identify the environmental state in the time of executing the second work job based on at least the work content of the robot in the first work job; update the environmental state based on at least the work content of the robot in the second work job so as to identify the environmental state of the third work job; and determine whether the environmental state satisfies the environmental condition of the third work job. In some examples, wherein the execution flow includes the first work job, the second work job, and a third work job in this order, and the programming support apparatus 100 may be configured to: identify the environmental state in the execution time of the second work job based on at least the work content of the robot in the first work job; update the environmental state based on at least the work content of the robot in the second work job to identify an environmental state of the robot at an execution timing of the third work job; and check whether the environmental state satisfies the environmental condition at the execution timing of the third work job.

For example, as described above, the programming support apparatus 100 identifies the state of the lid 12 and the bolt 13 at the execution timing of Job02 to "open" and "in the box 11" based on the operation content of the robot in Job01. Furthermore, the programming support apparatus 100 identifies "outside the box 11", which is the state of the bolt 13 after the robot has operated in accordance with Job02, as the environmental state at the execution timing of Job03. Further, since Job02 does not include an operation on the lid 12, the programming support apparatus 100 does not change the state of the lid 12 before and after the robot 2 operates in accordance with Job02, and continues to keep the state of the lid 12 in Job03 "open". The programming support apparatus 100 determines whether these environmental conditions satisfy the environmental condition of Job03. Since the environmental condition in Job03 includes "the lid 12 is open" and does not include the condition for the bolt 13, the environmental state satisfies the environmental condition in Job03.

The planning support apparatus 100 may be configured to: generate, based on an environmental condition of the one work job in the execution flow and the operation content of the robot 2 in the other work job in the execution flow, an order condition required between the one work job and the other work job so that the one work job satisfies the environment; and determine whether the execution order of the execution flow satisfies the execution order. In some examples, the programming support apparatus 100 may be configured to: generate an order condition required between one work job and another work job in the execution flow, based on an environmental condition of the robot at an execution timing of the one work job and a work content of the robot in the other work job; and check whether an execution order of the plurality of work jobs in accordance with the execution flow satisfies the execution order.

For example, in the programming support apparatus 100, the execution flow generates an order condition that Job02 is executed after Job01 and before Job03 based on the "Open" which is the state of the lid 12 after the robot 2 is operated in accordance with Job01, "Closed", which is the state of the lid 12 after the robot 2 is operated in accordance with Job03, and "the lid 12 is open", which is specified by the environmental condition of Job02. In FIG. 31, since Job01, Job02, and Job03 are arranged in order, the execution order of the execution flow in FIG. 31 satisfies the order condition. In some examples, wherein the execution flow includes a first work job and a second work job, the first work job having a work content including physically manipulating a work object, the environmental condition including a condition of a work object, the programming support apparatus 100 may be further configured to generate the order condition between the first work job and the second work job based on a state of the work object after execution of the first work job and a condition of the work object at the execution timing of the second work job.

The programming support apparatus 100 may be further configured to set a timing condition identifying a relationship of execution timings between at least two of the work jobs to be executed in accordance with an input to the user interface. In some examples, the programming support apparatus 100 may be configured to set a timing condition identifying a relationship of execution timing between at least two jobs of the plurality of work jobs in accordance with the user input. Specific examples of timing condition include conditions for specifying the order of work jobs, as well as conditions for specifying a waiting time to be secured between the work jobs. In this case, programming support apparatus 100 may determine whether the at least one work job satisfies the environmental condition in the execution flow in which the execution order is defined so that the timing condition is satisfied.

FIG. 34 shows an example of setting timing conditions. In the example of FIG. 34, a condition that "Job01 is executed before Job02" is set between Job01 and Job02, and a condition that "Job03 is executed after Job02" is set between Job02 and Job03. In a case that such a timing condition is set, according to the execution flow consistent with the timing condition, the state of the lid 12 at the execution timing of Job02 is necessarily "open". Therefore, when the timing condition shown in FIG. 34 is set, it is not essential to specify the state of the lid 12 as the environmental condition of Job02. In some examples, if the environmental condition of Job02 includes "the lid is open", it is not essential to set the timing condition of FIG. 34.

The operation program (that is supported by the programming support apparatus 100) is executed by a controller for example, that controls one or more control target(s) such as robot 2. The control target(s) is not limited to one robot 2. For example, the programming support apparatus 100 may be configured to execute programming support of an operation program for controlling a plurality of control targets (for example, a plurality of robots 2).

2. Programming Support Apparatus

Figure 2:
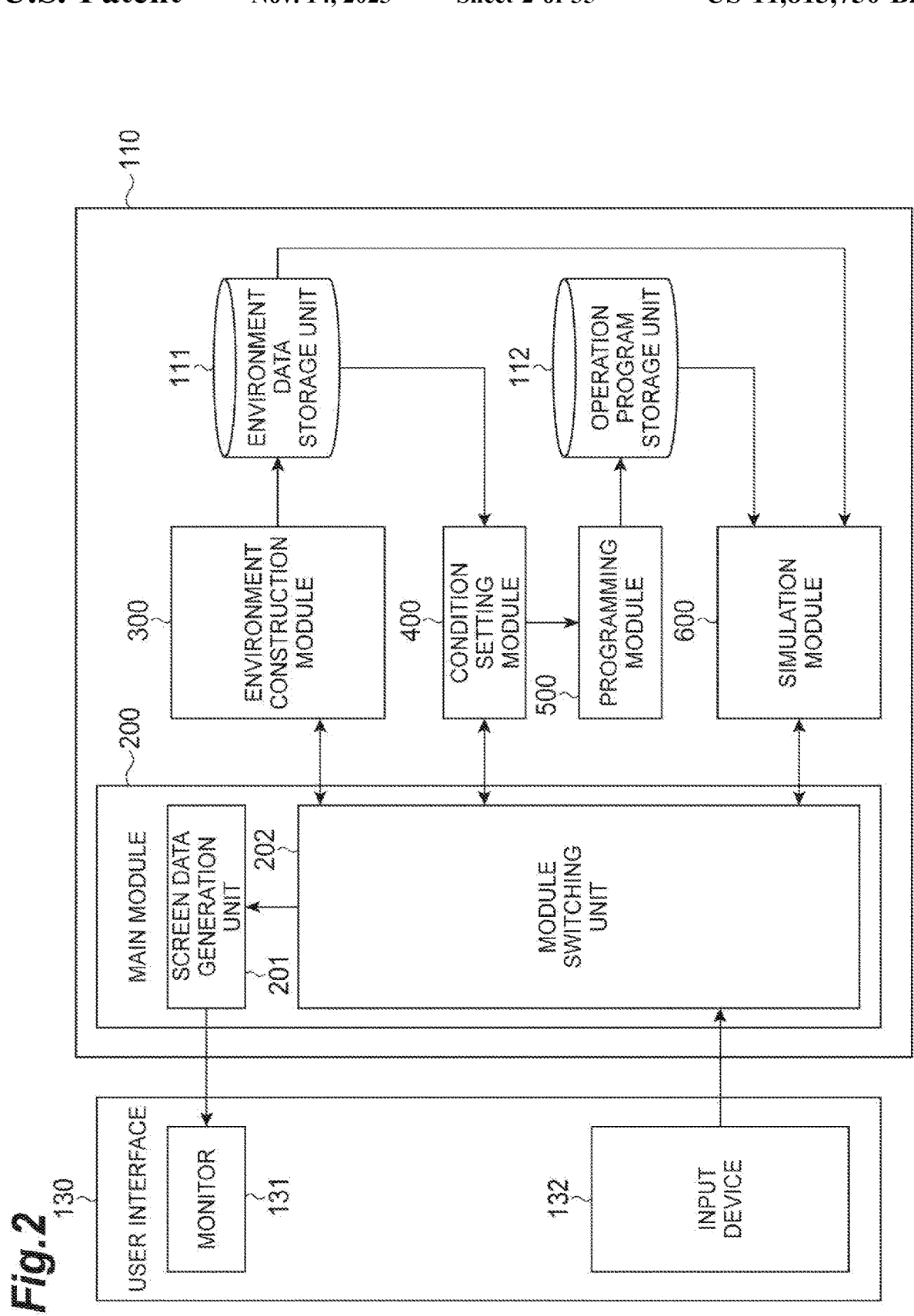
FIG. 2 is a block diagram illustrating a functional configuration of a programming support apparatus.

Hereinafter, an example configuration of the programming support apparatus 100 will be described. As illustrated in FIG. 2, the programming support apparatus 100 includes: a main body 110 comprising one or more computers; and a user interface 130.

The user interface 130 includes a monitor 131 and an input device 132, for example. The monitor 131 is an apparatus used for displaying information output from the main body 110. The monitor 131 may be of any type as long as graphic display is possible on the monitor, and an example thereof is a liquid crystal panel. The input device 132 is an apparatus used for inputting information into the main body 110. The input device 132 may be of any type as long as desired information can be input on the apparatus, and examples thereof include a keypad and a mouse. Note that the monitor 131 and the input device 132 may be integrated as a touchscreen having both an input function and a display function.

In terms of functional configuration, the main body 110 comprises functional modules including a main module 200, an environment construction module 300, a condition setting module 400, a programming module 500, and a simulation module 600.

The main module 200 is a module for invoking various functions of the programming support apparatus 100 in accordance with user's input.

The environment construction module 300 is a module for constructing environment model data (model data) for operation simulation of the robot 2. The environment model data is, for example, three-dimensional surface data including models of the robot 2 and of its surrounding environment constituted by polygons. The environment construction module 300 writes the constructed environment model data into an environment data storage 111.

The condition setting module 400 is configured to set a programming support condition including the first restricting condition which is a restricting condition for execution for each work job and the second restricting condition which is a restricting condition regarding the relationship between work jobs.

The first restricting condition includes a condition that is unavoidable to achieve the purpose of the work job, such as the environmental condition described above. For example, with respect to a work job for putting a workpiece in and out of a box, the above-mentioned unavoidable condition is that the work job is executed with a lid open. With respect to a work job for processing with a tool, the above-mentioned unavoidable conditions are that the tool is held, the tool is turned on, and the like.

The second restricting condition includes a condition that defines the relationship between work jobs, such as the timing condition described above. The relationship between work jobs may be derived from the first restricting condition, or may not be derived from the first restricting condition.

The second restricting condition includes a condition that is not unavoidable in order to achieve the purpose of each work job.

The programming module 500 is configured to execute programming support of the operation program in accordance with the programming support condition set by the condition setting module 400. For example, the programming module 500 generates an operation program in accordance with the above-described programming support condition and writes the generated operation program into an operation program storage 112. The programming module 500 may check a provisional execution flow in order to generate the operation program.

The simulation module 600 is a module to execute operation simulation of the robot 2. The operation simulation represents causing the model of the robot 2 to operate under a simulation environment. For example, the simulation module 600 causes the model of the robot 2 to operate in accordance with the above-described operation program (operation program stored in the operation program storage 112) under the simulation environment specified by the above-described environment model data (environment model data stored in the environment data storage 111).

The main module 200 includes a window data generation unit 201 and a module switching unit 202. The window data generation unit 201 generates data for displaying a main window A1 (see FIG. 3) on the monitor 131. The main window A1 is an operation window for invoking various functions of the programming support apparatus 100. The module switching unit 202 is associated with one or more buttons on the user interface for switching modules to be executed in response to an operation input in the main window A1.

Figure 3:
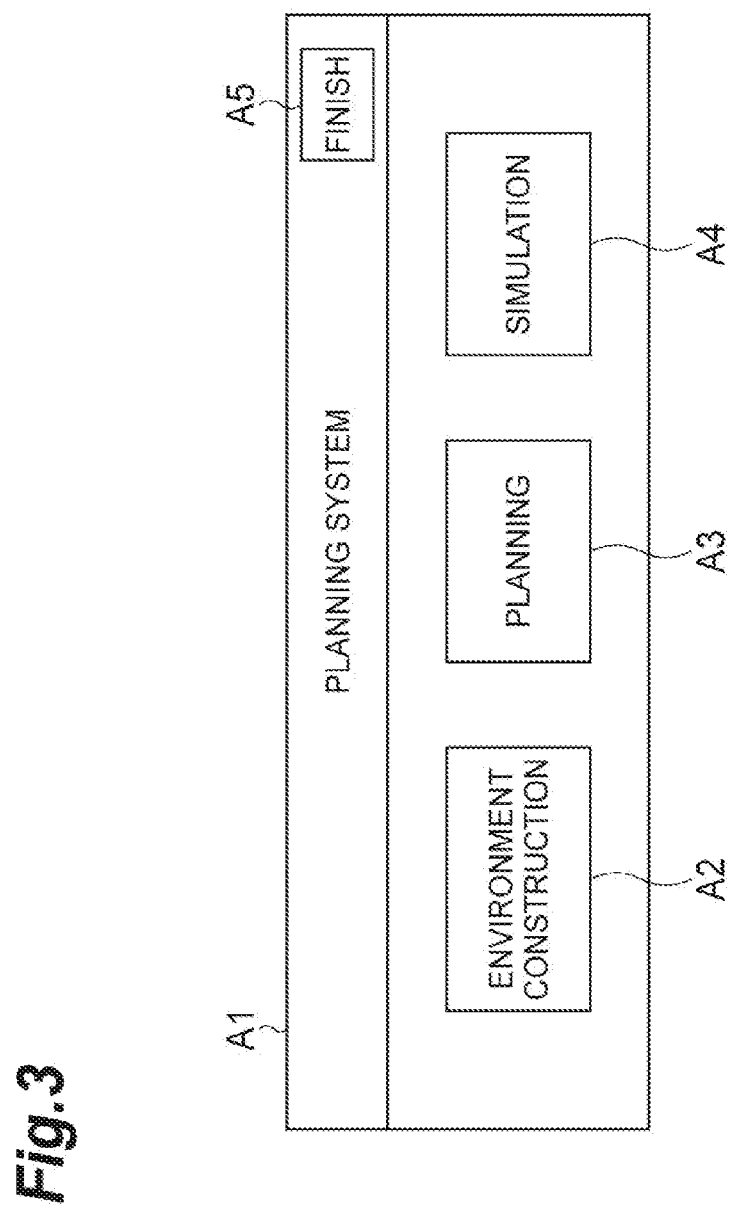
FIG. 3 is a schematic diagram illustrating a main window.

As illustrated in FIG. 3, the main window A1 includes an environment construction button A2, a planning button A3, a simulation button A4, and a finish button A5. The environment construction button A2 is a button for activating the environment construction module 300. The planning button A3 is a button for activating the condition setting module 400 and the programming module 500. The simulation button A4 is a button for activating the simulation module 600. The finish button A5 is a button for closing the main window and finishing the processing by the main module 200.

Hereinafter, configurations of the environment construction module 300, the condition setting module 400, the programming module 500, and the simulation module 600 will be described.

(1) Environment Construction Module

Figure 4:
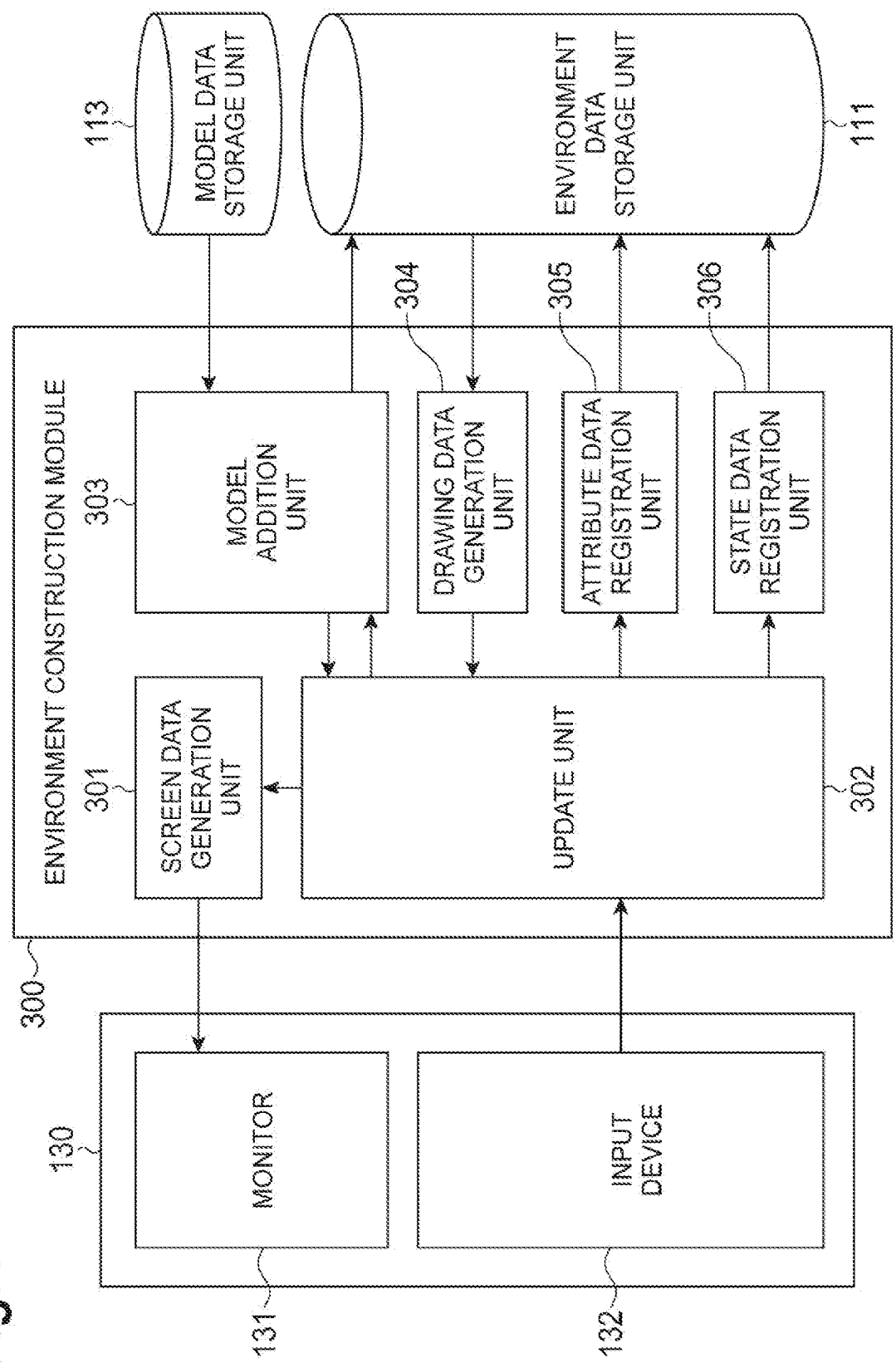
FIG. 4 is a block diagram illustrating a functional configuration of an environment construction module.

As illustrated in FIG. 4, the environment construction module 300 comprises subdivided functional modules including a window data generation unit 301, an update unit 302, a model addition unit 303, a drawing data generation unit 304, an attribute data registration unit 305, and a state data registration unit 306.

The window data generation unit 301 generates data for displaying an environment construction window B1 on the monitor 131. The environment construction window B1 is an input window for environment model data construction.

Figure 5:
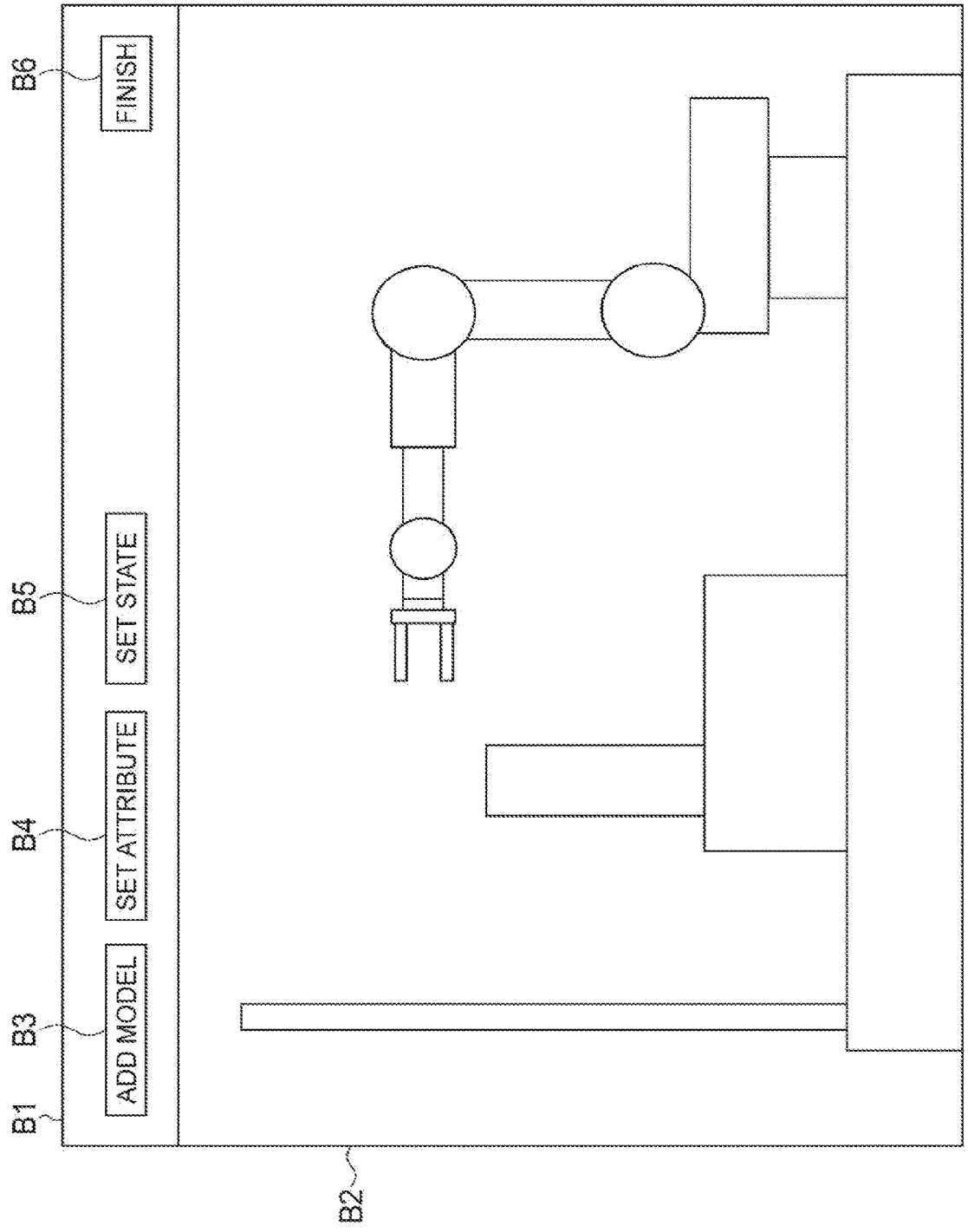
FIG. 5 is a schematic diagram illustrating an environment construction window.

With reference to FIG. 5, the environment construction window B1 allows: adding a model (via a model addition button B3) to the simulation environment (represented at a simulation environment area B2); defining attributes of the model (via an attribute setting button B4); and setting a state of the model (via a state setting button B5). A model represents an object in a simulation environment. The model is also referred to herein as "input target model." The model represents an object in the simulation environment. For some of the functional features of the environment construction window B1, the input target model may be selected from the image displayed in the simulation environment area (B2). As illustrated in FIG. 5, the environment construction window B1 includes the simulation environment area B2, the model addition button B3, the attribute setting button B4, the state setting button B5, and a finish button B6, for example. The simulation environment area B2 is an area for displaying a simulation environment indicated by the environment model data under construction, with a three-dimensional image, or the like.

The model addition button B3 is a button for adding model data to the environment model data. The model data is three-dimensional surface data constituted with polygons, for example.

The attribute setting button B4 is a button for inputting data (hereinafter referred to as "attribute data") specifying an object (i.e. the "input target model") included in environment model data.

The state setting button B5 is a button for inputting data (hereinafter referred to as "state data") indicating a state of an object included in the environment model data. Specific examples of the state data in a case where the object is a lidded box include "a state where the lid is open" and "a state where the lid is closed". Another example is "on state", "off state", and the like, in a case where the object is a tool turned on/off in use.

The finish button B6 is a button for closing the environment construction window B1 and finishing the processing of the environment construction module 300.

Returning to FIG. 4, the update unit 302 updates display data for the environment construction window B1 in accordance with an operation input to the input device 132. For example, the update unit 302 updates the display data for the environment construction window B1 so as to display a model selection window C1 in response to the clicking on the model addition button B3. In response to the clicking on the attribute setting button B4, the update unit 302 updates the display data for the environment construction window B1 so as to display an attribute input window D1. Furthermore, the update unit 302 updates the display data for the environment construction window B1 so as to display a state input window F1 in response to the clicking on the state setting button B5.

Figure 6:
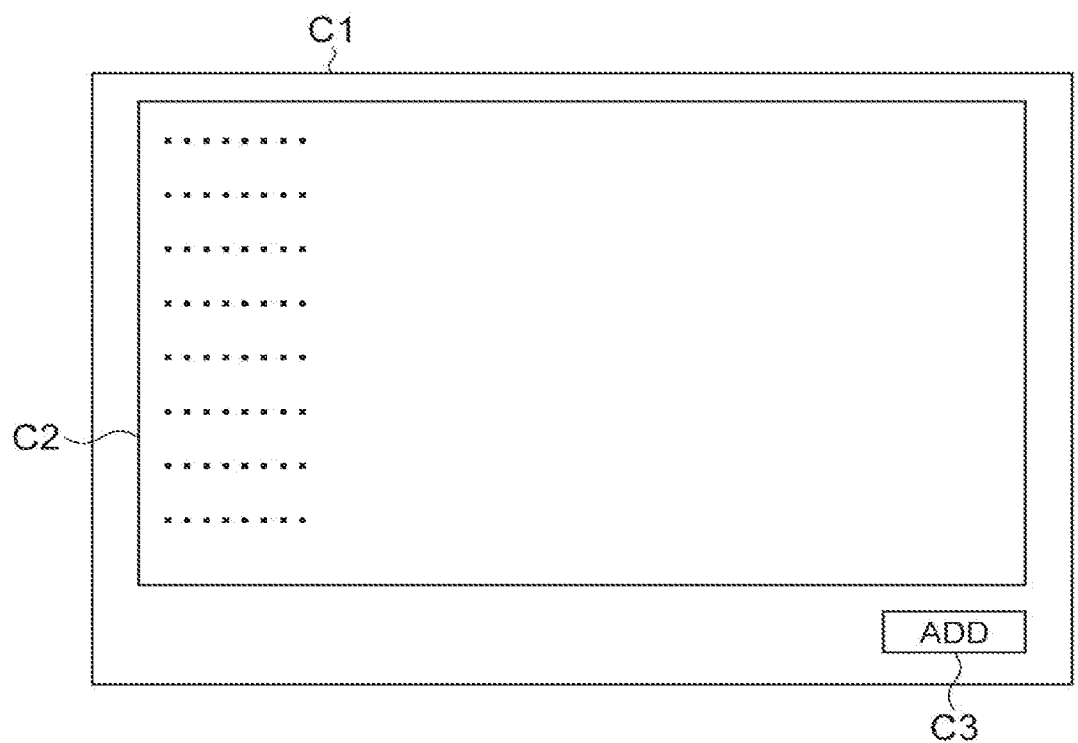
FIG. 6 is a schematic diagram illustrating a model selection window.

Further to the model addition button B3 being clicked (FIG. 5), the model selection window C1 shown in FIG. 6, is opened on the user interface. The model selection window C1 is a window for selecting model data to be added to the environment model data. As illustrated in FIG. 6, the model selection window C1 includes a list display area C2 and an add button C3. The list display area C2 displays a list of model data that can be added to the environment model data. The add button C3 is a button for instructing addition of model data selected in the list display area C2.

Figure 7A:
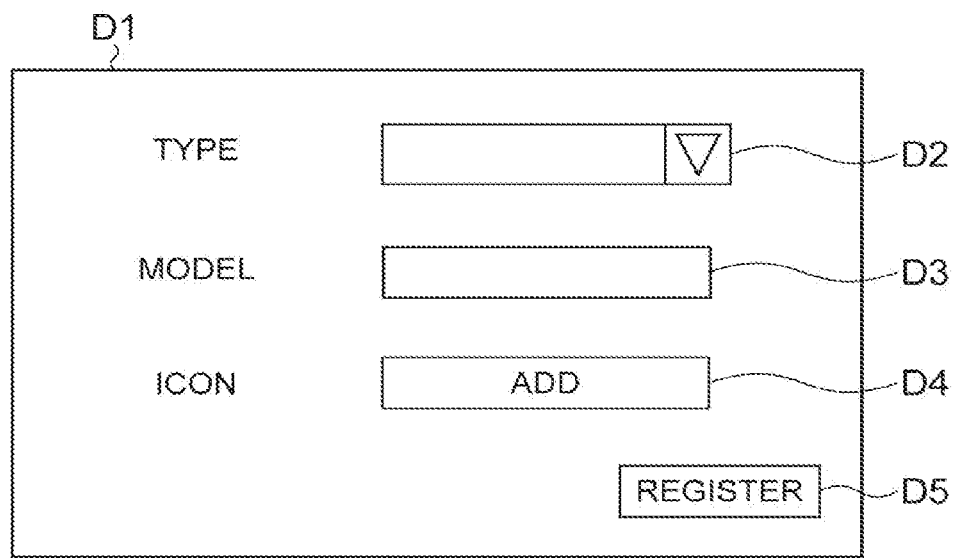
FIGS. 7A and 7B are schematic diagrams illustrating an attribute input window.
Figure 7B:
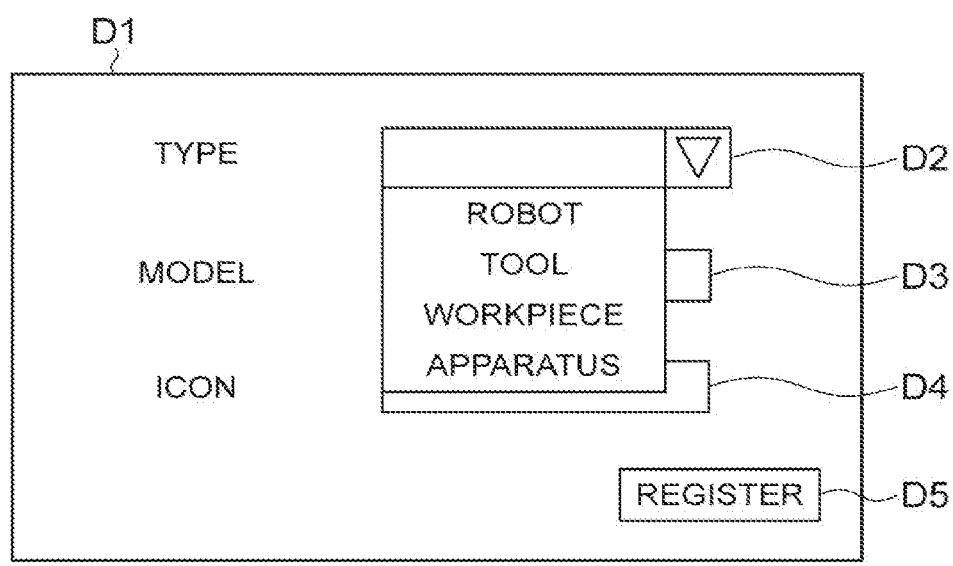

Further to the attribution setting button B4 being clicked (FIG. 5), the attribute input window D1 shown in FIGS. 7A and 7B is opened on the user interface. The attribute input window D1 is for inputting attribute data of an input target model. The input target model can be selected by clicking on any of the models displayed in the simulation environment area B2 (FIG. 5), as a component of the environment data. As illustrated in FIGS. 7A and 7B, the attribute input window D1 includes an input box D2, an input box D3, an icon addition button D4, and a registration button D5. The input box D2 is for inputting an input target model type (for example, "Robot", "Tool", "Workpiece", "Apparatus", etc.).

The input box D2 may be configured to enable selection input by pre-registered options (refer to FIG. 7B). The input box D3 is for inputting a name of the above-described input target model. The icon addition button D4 is a button for inputting icon data to be associated with the input target model. For example, the icon data can be input on an icon selection window E1 (FIG. 8) displayed by clicking on the icon addition button D4.

Figure 8:
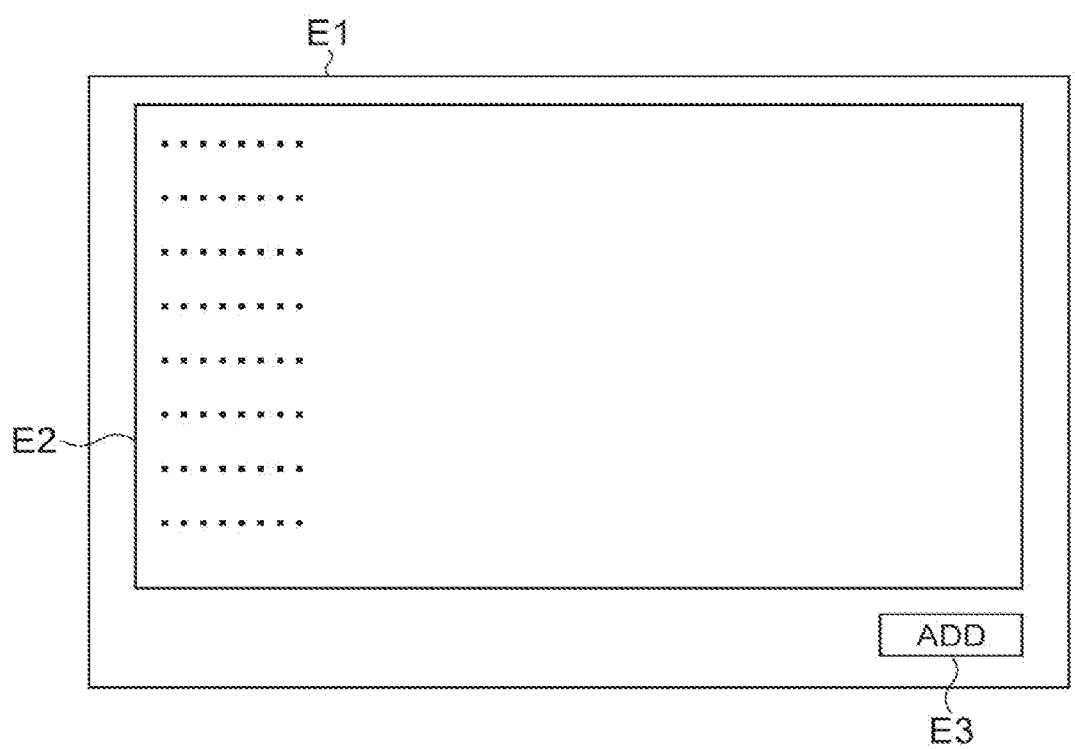
FIG. 8 is a schematic diagram illustrating an icon selection window.

As illustrated in FIG. 8, the icon selection window E1 includes a list display area E2 and an add button E3. The list display area E2 displays a list of available icon data. The add button E3 is for instructing addition of the icon data selected in the list display area E2.

Returning to FIGS. 7A and 7B, the registration button D5 is for instructing registration of data input in the attribute input window D1. The registration button D5 is for registering (or recording) in a storage the attribute data that has been entered, in association with the input target model (or "object", or "model component" of the simulation environment).

Figure 9:
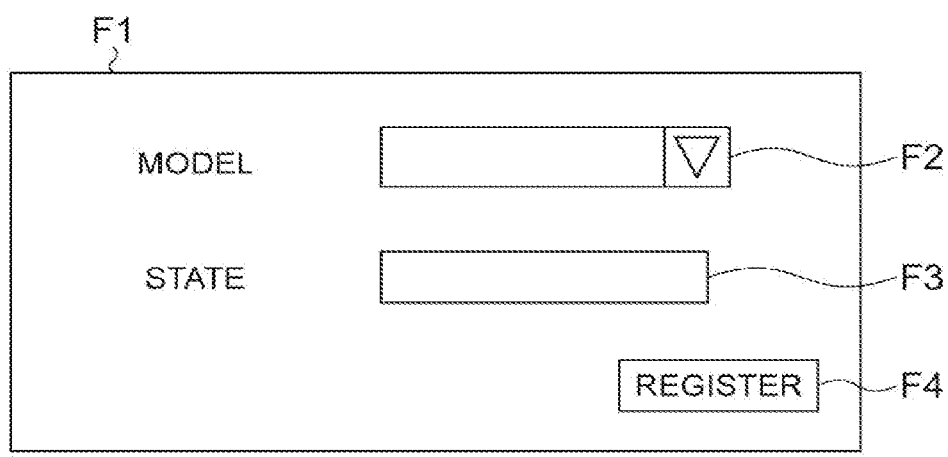
FIG. 9 is a schematic diagram illustrating a state input window.

Further to the state setting button B5 being clicked (FIG. 5), the state input window F1 shown in FIG. 9 is opened on the user interface. As illustrated in FIG. 9, the state input window F1 includes an input box F2, an input box F3, and a registration button F4. The input box F2 is an input box for selecting an input target model. The input box F2 may be configured so as to enable selection input of a model name registered in the environment data storage 111. The input box F3 is an input box for inputting the name of the state. The registration button F4 is for registering (or recording) in a storage the state that has been entered, in association with the input target model (or "object", or "model component" of the simulation environment) having been selected in the state input window F1.

Returning to FIG. 4, the update unit 302 updates the display data for the simulation environment area B2 to display an image in the simulation environment after model data has been added to the environment model data, via the model addition button B3 in the environment construction window B1 (FIG. 5).

Still with reference to FIG. 4, the model addition unit 303 adds model data to the environment model data in the environment data storage 111 in accordance with an input via the user interface 130. For example, in response to the clicking on the model addition button B3 (FIG. 5), the model addition unit 303 generates a list of model data with reference to the model data storage 113 and outputs the list to the update unit 302 as display data for the list display area C2 (FIG. 6).

The model data storage 113 stores a plurality of pieces (or data components) of model data that may be created beforehand. The model data storage 113 may be provided in the programming support apparatus 100 or may be provided in another apparatus (for example, a computer for three-dimensional design) other than the programming support apparatus 100.

With further reference to the model selection window C1 shown in FIG. 6, the model addition unit 303 retrieves the model data selected (via the add button C3) from the model data storage 113, and adds the model data to the environment model data in the environment data storage 111.

The drawing data generation unit 304 generates drawing data for the simulation environment using the environment model data stored in the environment data storage 111 and outputs the drawing data to the update unit 302 as display data for the simulation environment area B2 (FIG. 5).

In response to an input on the user interface 130, the attribute data registration unit 305 adds the above-described attribute data to the environment data in the environment model data storage 111. For example, the attribute data registration unit 305 obtains the data input on the attribute input window D1 (FIGS. 7A and 7B) in response to the clicking on the registration button D5 (FIGS. 7A and 7B), and writes the data into the environment data storage 111 in association with the input target model.

In response to an input on the user interface 130, the state data registration unit 306 adds the above-described state data to the environment data of the environment model data storage 111. For example, the state data registration unit 306 obtains the data input on the state input window F1 (FIG. 9) in response to the clicking on the registration button F4 (FIG. 9), and writes the data into the environment data storage 111 in association with the input target model.

(2) Condition Setting Module

Figure 10:
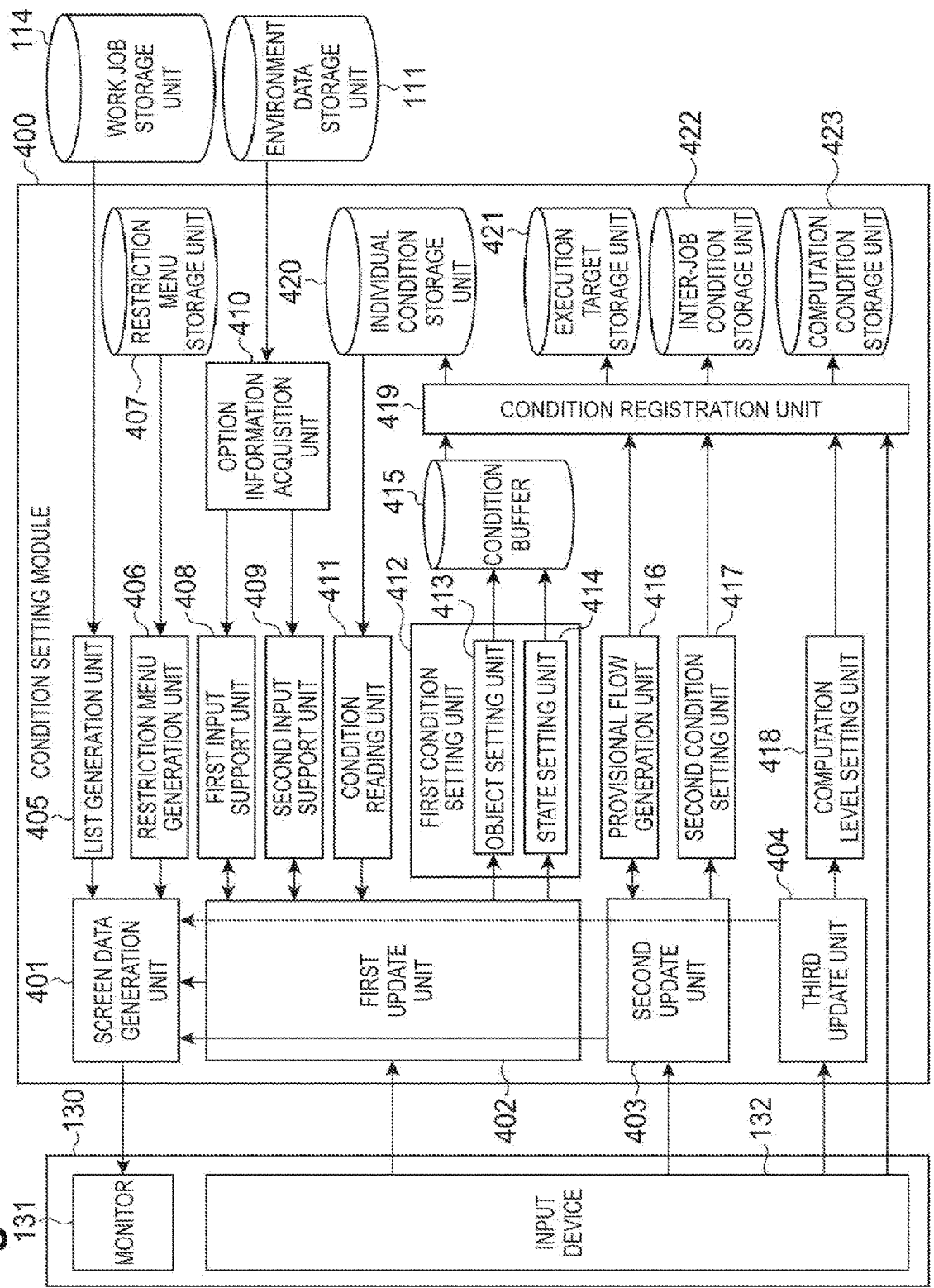
FIG. 10 is a block diagram illustrating a functional configuration of a condition setting module.

The condition setting module 400 (FIG. 2) sets the first restricting condition and the second restricting condition, by operating distinct functional modules and/or processes. As illustrated in FIG. 10, the condition setting module 400 includes, as subdivided functional modules, a window data generation unit 401, a first update unit 402, a second update unit 403, a third update unit 404, a list generation unit 405, a restriction menu generation unit 406, a first input support unit 408, a second input support unit 409, an option information acquisition unit 410, a condition reading unit 411, a first condition setting unit 412, a provisional flow generation unit 416, a second condition setting unit 417, a computation level setting unit 418, and a condition registration unit 419.

The window data generation unit 401 generates display data for an input window (see FIG. 11) including a first input area for inputting the first restricting condition and a second input area for inputting the second restricting condition and outputs the generated data to the monitor 131. The window data generation unit 401 may generate display data for an input window further including a list display area indicating a list of a plurality of work jobs. The window data generation unit 401 may generate the display data for the input window so as to allow the list display area to be arranged between the first input area and the second input area.

Figure 11:
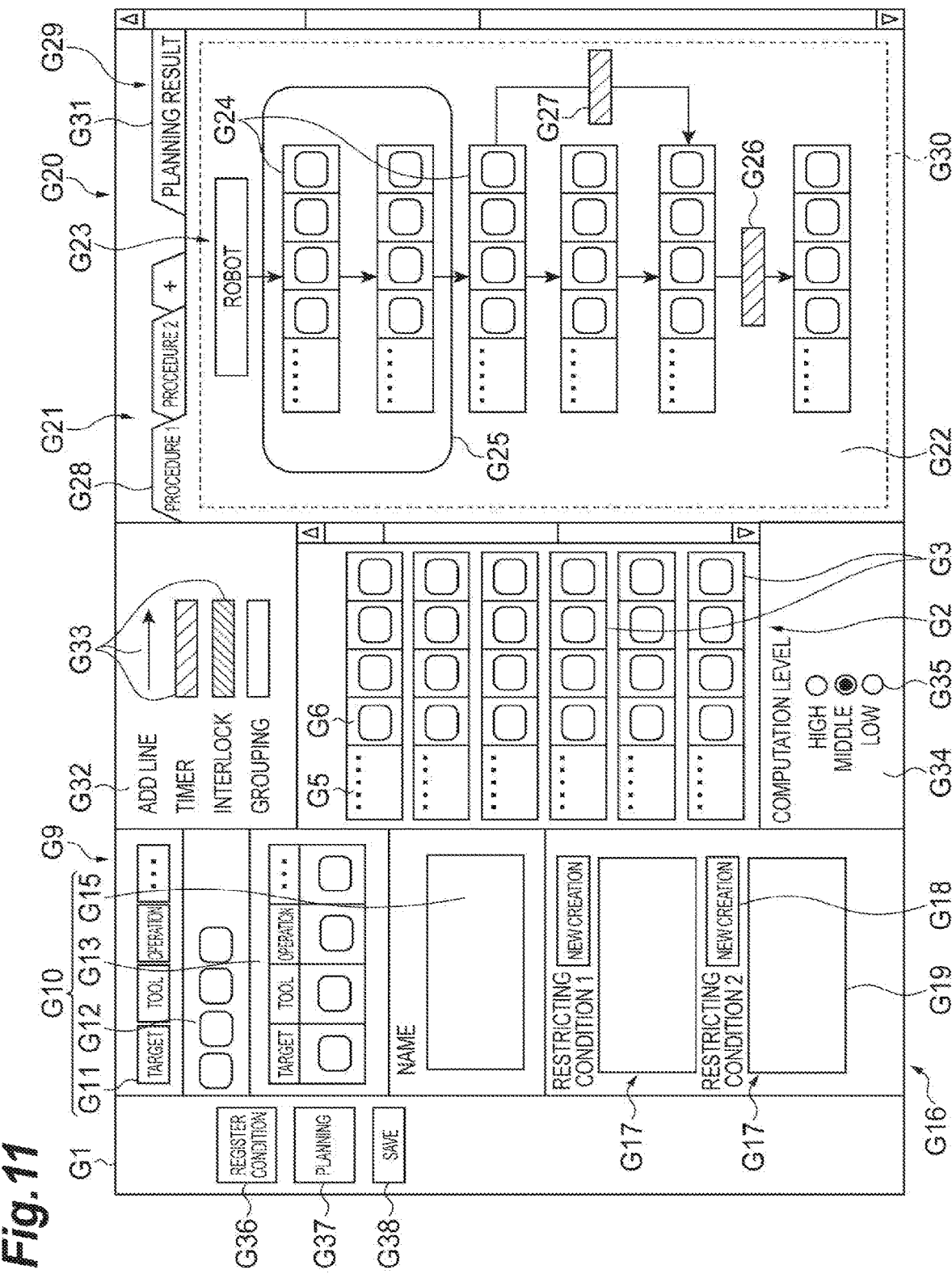
FIG. 11 is a schematic diagram illustrating a planning window.

For example, the window data generation unit 401 generates display data for a planning window G1 (input window) illustrated in FIG. 11. The planning window G1 includes a list display area G2, a first input area G9, a second input area G20, a restriction menu display area G32, a third input area G34, a condition registration button G36, a planning button G37, and a save button G38.

The list display area G2 displays a list containing list elements G3 corresponding to a plurality of work jobs created beforehand. The list element G3 may be sequenced according to a given chronological order. The list element G3 includes a name display section G5 and an icon display section G6. The name display section G5 displays names of work jobs in text format. The icon display section G6 displays one or more icons related to the content of a work job (for example, an icon of a work object).

The first input area G9 is for inputting the first restricting condition. The first input area G9 includes a work content input area G10 and a restricting condition input area G16.

The work content input area G10 is for inputting information specifying the content of the work job (hereinafter referred to as "work content information"). The work content information includes information specifying the work object and information specifying the operation content to be applied on the work object, for example. Note that any work object may be employed as long as it is a target of work by the robot 2. The work object also includes a tool used by the robot 2 in the working on the workpiece because the tool is one of targets of conveyance work by the robot 2.

For example, the work content input area G10 includes a plurality of item designation buttons G11, an icon selection area G12, an input content display area G13, and a name input area G15. The item designation button G11 is a button for selecting an item of the above-described work content information. The icon selection area G12 displays options (or optional values), in the form of icons, that can be selected (via clicking) to be associated with the work content information item selected (target, tool, operation, etc.). For example, when the "TARGET" button (among the buttons G11) is clicked, options of targets (for example, a box, a bolt, an object that is contained in the box, etc.) are displayed as icons. As another example, when the "TOOL" button (among the buttons G11) is clicked, options of tools (for example, a screw driver, a wrench, a jig, etc.) are displayed as icons. The input content display area G13 displays the work content information that has been input. The name input area G15 obtains an input for the name of the work job.

The restricting condition input area G16 is an area for inputting restricting conditions. The restricting condition input area G16 includes a plurality of condition input sections G17. Each of the condition input sections G17 obtains an input of one restricting condition. The condition input section G17 includes a new creation button G18 and a display section G19. The new creation button G18 is a button for displaying a condition creation window H1 (described below, with reference to FIGS. 12A and 12B). The display section G19 displays the conditions created via the condition creation window H1.

The second input area G20 is an area for inputting the second restricting condition. The second input area G20 includes a condition input section G21 and a result output section G29. The condition input section G21 includes a flow display section G22 and a tab G28. The flow display section G22 displays a provisional flow G23 in which a plurality of flow elements G24 is arranged, and displays at least one condition element G25. The provisional flow G23 represents a procedure containing the work jobs to be executed by the control target (e.g. the robot 2). The provisional flow G23 illustrates execution order of a plurality of work jobs selected for constituting the operation program. Each of the plurality of flow elements G24 corresponds to each of the plurality of work jobs.

In a case where the programming support apparatus 100 executes programming support of the operation program for a plurality of control targets (such as robots), the second input area G20 may display a plurality of the provisional flows G23 each corresponding to each of the plurality of control targets, as illustrated in FIG. 11 by the tabs entitled "Procedure 1" and "Procedure 2".

The condition element G25 illustrates a second restricting condition set between work jobs in the provisional flow G23. For example, the condition element G25 is displayed in association with two flow elements G24 corresponding to two work jobs as setting targets of the second restricting condition.

In the illustrated example, three condition elements G25, G26, and G27 are displayed. The condition element G25 indicates a restricting condition of grouping the first work job and the second work job as one set of jobs and is displayed as a frame to surround the first flow element G24 and the second flow element G24. The condition element G26 indicates a restricting condition defining a time interval to be ensured between a fifth work job and a sixth work job, and is illustrated on a line connecting the fifth flow element G24 and the sixth flow element G24. The condition element G27 indicates a restricting condition defining a time interval to be ensured between a third work job and the fifth work job, and is illustrated on a line connecting the third flow element G24 and the fifth flow element G24 without passing through the fourth flow element G24. The tab G28 is provided at an upper portion of the flow display section G22 and is used for switching display between the condition input section G21 and the result output section G29.

The result output section G29 displays an execution flow generated by the programming module 500. The result output section G29 includes a flow display section G30 displaying an execution flow, and a tab G31. The flow display section G30 is displayed at a same position as the flow display section G22. The tab G31 is provided at the upper portion of the flow display section G30 at a position different from the tab G28 described above. Clicking on the tab G31 in a state where the flow display section G22 is displayed enables the flow display section G30 to be displayed. Clicking on the tab G28 in a state where the flow display section G30 is displayed enables the flow display section G22 to be displayed.

The restriction menu display area G32 displays a list of a plurality of restricting conditions that can be input in the second input area G20. The restriction menu display area G32 displays in order a plurality of menu elements G33 each corresponding to a type of restricting condition. As one example, the restriction menu display area G32 is arranged adjacent to the list display area G2, between the first input area G9 and the second input area G20.

The third input area G34 obtains an input of a computation level (described below) in the programming support. For example, the third input area G34 is configured to enable selection of a plurality of preset computation levels by radio buttons G35. As one example, the third input area G34 is arranged between the first input area G9 and the second input area G20, and is arranged so as to be adjacent to the list display area G2 on the side opposite to the restriction menu display area G32.

The condition registration button G36 is for registering (or recording) the input content that has been entered into the first input area G9, the second input area G20, and/or the third input area G34. The planning button G37 is for executing the programming support according to the input content that has been entered into the first input area G9, the second input area G20, and the third input area G34. Executing the programming support may be, for example, generating an operation program for operating a robot controller. The save button G38 is for saving the operation program generated by the programming support.

The configuration of the planning window G1 is merely an example. The input window may be configured in various way, to include the first input area and the second input area. For example, the input window may be configured such that the first input area and the second input area are positioned above and below the list display area, respectively. The input window may be configured to switch at least a portion of the first input area and at least a portion of the second input area to be displayed at a same position.

Returning to FIG. 10, the first update unit 402 updates the display data for the first input area G9 in accordance with an input to the user interface 130. The first update unit 402 may update the display data for the first input area G9 so as to enable the first restricting condition of the work job selected in the list display area G2 to be input. For example, when any of the list elements G3 is clicked (and thereby selected) in the list display area G2, the first update unit 402 updates display data for the first input area G9 to enable an input of the first restricting condition of the work job corresponding to the selected list element G3. In some examples, the first update unit 402 updates the display data for the first input area G9 so as to display at an input portion, information that has been previously recorded in association with the work job, and so as to leave the input portion of other item blank. For example, a work job may already have one or more condition set for some items (target, tool, etc.). Note that the first update unit 402 obtains the already registered information from the condition reading unit 411 described below.

In addition, the first update unit 402 updates the display data for the first input area G9 in accordance with the input to the first input area G9. For example, when the work content information has been input, by the operation on the item designation button G11 and the icon selection area G12, the first update unit 402 updates the input content display area G13 so as to reflect the input content. The first update unit 402 displays the input content in the name input area G15 in accordance with the text input to the name input area G15. The first update unit 402 updates the display data for the first input area G9 so as to display the condition creation window H1 in response to the clicking on the new creation button G18 in the condition input section G17.

For example, as illustrated in FIGS. 12A and 12B, the condition creation window H1 includes an input box H2, an input box H3, an input box H4, and a creation button H5. The input box H2 is for inputting a work object. The input box H3 is for inputting an application timing of the restricting condition. The application timing is information indicating at which time point the restricting condition is to be applied during the execution of the work job. The input box H4 is for designating a state of the work object as one example of the restricting condition. The input boxes H2, H3, and H4 may be configured to enable selection input of pre-registered options (refer to FIG. 12B). The creation button H5 is a button for creating a condition according to the data input in the condition creation window H1.

Returning to FIG. 10, the first update unit 402 creates a condition according to the data input in the condition creation window H1, and displays the display data for the first input area G9 so as to display the condition in the display section G19.

The second update unit 403 updates the display data for the second input area G20 in accordance with the input to the user interface 130. The second update unit 403 updates the display data for the second input area G20 so as to display a plurality of selected work jobs in the list display area G2 and to enable an input of the second restricting condition between the plurality of selected work jobs.

The second update unit 403 may update the display data for the second input area G20 so as to display the provisional flow G23 of the work jobs selected from the list display area G2, and displaying the selected work jobs in the provisional flow G23 to enable the input of the second restricting condition between the selected work jobs. For example, in response to selecting a list element G3 from the list in the list display area G2, the flow display section G22 is updated, via the second update unit 403, to display the list element G3, as a flow element G24. In some examples, the second update unit 403 updates the display data so as to add the flow element G24 corresponding to the selected work job, in the provisional flow G23.

Specific examples of the input to arrange a list element G3 as a flow element G24 in the second input area G20, include a drag-and-drop input operation of the selected list element G3 to the second input area G20, or alternatively, pasting the list element G3 having been copied from the list display area G2, into the second input area G20, as a corresponding flow element G24, although the input method is not limited to these.

In a case where the programming support apparatus 100 executes programming support of the operation program for a plurality of control targets, the second update unit 403 may update the display data for the second input area G20 so as to display each of the plurality of provisional flows G23 corresponding to each of the plurality of control targets.

With a configuration to display the provisional flow G23 in the second input area G20, it is possible to input the second restricting condition between the work jobs (between the flow elements G24) graphically, within the provisional flow G23. For example, in response to an input of arranging the menu element G33 selected in the restriction menu display area G32 between the flow elements G24 of the second input area G20, the second update unit 403 updates display data for the second input area G20 so as to insert the restricting condition corresponding to the menu element G33 between the flow elements G24.

Specific examples of an input to arrange the menu element G33 selected from the restriction menu display area G32, into the second input area G20, include a drag-and-drop input operation of the menu element G33 to the second input area G20, or alternatively, pasting the menu element G33 copied at the restriction menu display area G32 to the second input area G20, although the input method is not limited to these.

In a case where the programming support apparatus 100 executes programming support of the operation program for a plurality of control targets, the second update unit 403 may update the display data for the second input area G20 so as to insert a restricting condition between the flow elements G24 of mutually different control targets.

Figure 13A:
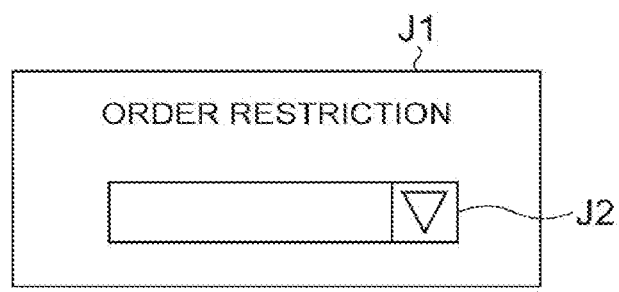
FIGS. 13A and 13B are schematic diagrams illustrating an order designation window.
Figure 13B:
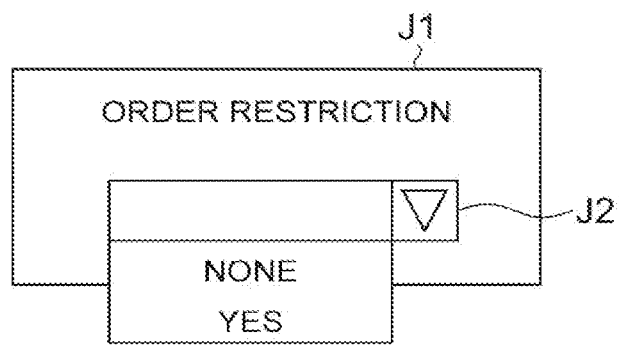

A second restricting condition may be inserted or added, by first selecting two of the flow elements, for example. The selection may include clicking on (or selecting) a line connecting the two flow elements G24. Upon selecting the two flow elements G24 which are connected, the second update unit 403 updates the display data for the second input area G20 so as to display a regulation input window J1 (see FIGS. 13A and 13B). The regulation input window J1 is for inputting restricting conditions between the work jobs corresponding to the selected flow elements G24. As illustrated in FIGS. 13A and 13B, the regulation input window J1 includes an input box J2. The input box J2 is for inputting a presence or absence of an order restriction (prohibition of order change). For example, the input box J2 may be configured to enable selective input of "YES" (to indicate the presence of an order restriction) and "NONE" (to indicate the absence of an order restriction) (refer to FIG. 13B).

Returning to FIG. 10, with reference to FIG. 11, the provisional flow G23 is generated by the provisional flow generation unit 416. When the list element G3 of the second work job is dragged to the second input area G20 in a state where the flow element G24 of the first work job is displayed in the second input area G20, the provisional flow generation unit 416 sets the order of the first work job and the second work job based on the positional relationship between the drag completion position and the existing flow element G24 to generate the first provisional flow G23. For example, in a case where the provisional flow G23 includes a first flow element G24 corresponding to a first work job, and a list element G3 corresponding to a second work job is drag-and-dropped below the first flow element G24, in the second input area G20, then a second flow element G24 is created, and the provisional flow G23 is updated to reflect that the second work job is to be executed after the first work job. In a case where the drag-and-drop completion position is above the first flow element G24, then the provisional flow G23 is updated to reflect that the second work job is to be executed before the first work job.

When a list element G3 is dragged from the list display area G2 to the second input area G20 (or when a work job is otherwise selected for insertion into the provisional flow G23), the provisional flow generation unit 416 inserts into the provisional flow G23, a work job corresponding to the list element G3. Accordingly, the provisional flow generation unit 416 receives an insertion position of the work job in accordance with the relationship between the existing flow element G24 and the drag completion position.

In a case where the programming support apparatus 100 executes programming support of the operation program for a plurality of control targets, the provisional flow generation unit 416 may generate each of a plurality of provisional flows G23 corresponding to each of the plurality of control targets.

The third update unit 404 updates the display data for the third input area G34 in accordance with the input to the user interface 130. For example, the third update unit 404 updates the display data so as to turn on the radio button G35 that is clicked or selected in the third input area G34.

The list generation unit 405 generates a list of list items corresponding to work jobs, to be displayed in the list display area G2, and outputs the list to the window data generation unit 401. For example, the list generation unit 405 generates the list of list elements with reference to the work job storage 114.

The work job storage 114 stores a plurality of work jobs created beforehand by a user. The work job storage 114 may be provided in the programming support apparatus 100 or may be provided in an apparatus other than the programming support apparatus 100 (for example, the robot controller 3).

The restriction menu generation unit 406 generates a list of menu elements G33 indicating restricting condition operators, to be displayed in the restriction menu display area G32, and outputs the list to the window data generation unit 401. For example, the restriction menu generation unit 406 generates the list of restriction menus with reference to the restriction menu storage 407. The restriction menu storage 407 stores a plurality of restriction menus created beforehand.

The option information acquisition unit 410 obtains first option information specifying an object contained in the environment model data and second option information indicating the state of the object from the above-described environment data storage 111.

The first input support unit 408 sets options of work objects and generates option display data. For example, the first input support unit 408 generates options for allowing selection input of work objects to the input box H2 (FIGS. 12A and 12B), on the condition creation window H1. The first input support unit 408 may set the options of the work object based on the first option information. In this case, the information obtained by the environment construction module 300 is used as options of the work object.

The second input support unit 409 sets options for the state designation condition in accordance with the work object as a state designation target, and generates option display data. For example, the second input support unit 409 generates options for allowing selection input of a state to the input box H4 (FIGS. 12A and 12B) in accordance with the work object input in the input box H2, in the condition creation window H1. The second input support unit 409 may set the options of the state designation condition based on the second option information. In this case, the information obtained by the environment construction module 300 is used as options of the state designation condition. For example, the second input support unit 409 extracts the state of the work object input to the input box H2, from the second option information, and sets the extraction result as options of the state designation condition.

The first condition setting unit 412 sets the first restricting condition in accordance with the input to the user interface 130 and writes the first restricting condition into a condition buffer 415 as a temporary storage in association with identification information of the work job as a target of the first restricting condition.

As described above, the first restricting condition may include a state designation condition to designate the state of the work object of the work job. In this case, the first condition setting unit 412 may include an object setting unit 413 and a state setting unit 414 as subdivided functional modules. The object setting unit 413 sets the work object of the work job based on an input in the first input area G9. For example, the object setting unit 413 sets the work object of the work job based on the content displayed in the input content display area G13. The state setting unit 414 sets the state designation condition based on an input to the first input area G9. For example, the state setting unit 414 sets the state designation condition of the work object based on the content input to the condition input section G17.

The second condition setting unit 417 sets the second restricting condition being a restricting condition on a relationship between the work jobs in accordance with the input to the user interface 130. For example, the second condition setting unit 417 sets the second restricting condition based on the restricting condition input between the work jobs in the second input area G20.

In a case where the programming support apparatus 100 executes the programming support of the operation program for a plurality of control targets, the second condition setting unit 417 may set a restricting condition between the work jobs of mutually different control targets.

The computation level setting unit 418 sets a computation level (described below) in the programming support in accordance with the input to the user interface 130. For example, the computation level setting unit 418 sets the computation level for adjusting a criterion for determining adoptability of an execution flow described below.

The condition registration unit 419 registers at least one of the first restricting condition and the second restricting condition in a condition storage. For example, the condition registration unit 419 may write the storage content of the condition buffer 415 (e.g. associated with the first restricting condition) into an individual condition storage 420. Moreover, the condition registration unit 419 may write the second restricting condition set by the second condition setting unit 417 into an inter-job condition storage 422 in association with the work jobs specified by the second restricting condition, as a target of the second restricting condition. Furthermore, the condition registration unit 419 writes a plurality of work jobs associated with the flow items displayed in the second input area G20 into an execution target storage 421 as execution target jobs. For example, the condition registration unit 419 writes into the execution target storage 421, as execution target jobs, the work jobs corresponding to the flow elements G24 of the provisional flow G23. Furthermore, the condition registration unit 419 writes the computation level set by the computation level setting unit 418 into a computation condition storage 423.

The condition reading unit 411 reads at least one of the first restricting condition and the second restricting condition from the condition storage. For example, the condition reading unit 411 reads the first restricting condition from the individual condition storage 420.

(3) Programming Module

Figure 14:
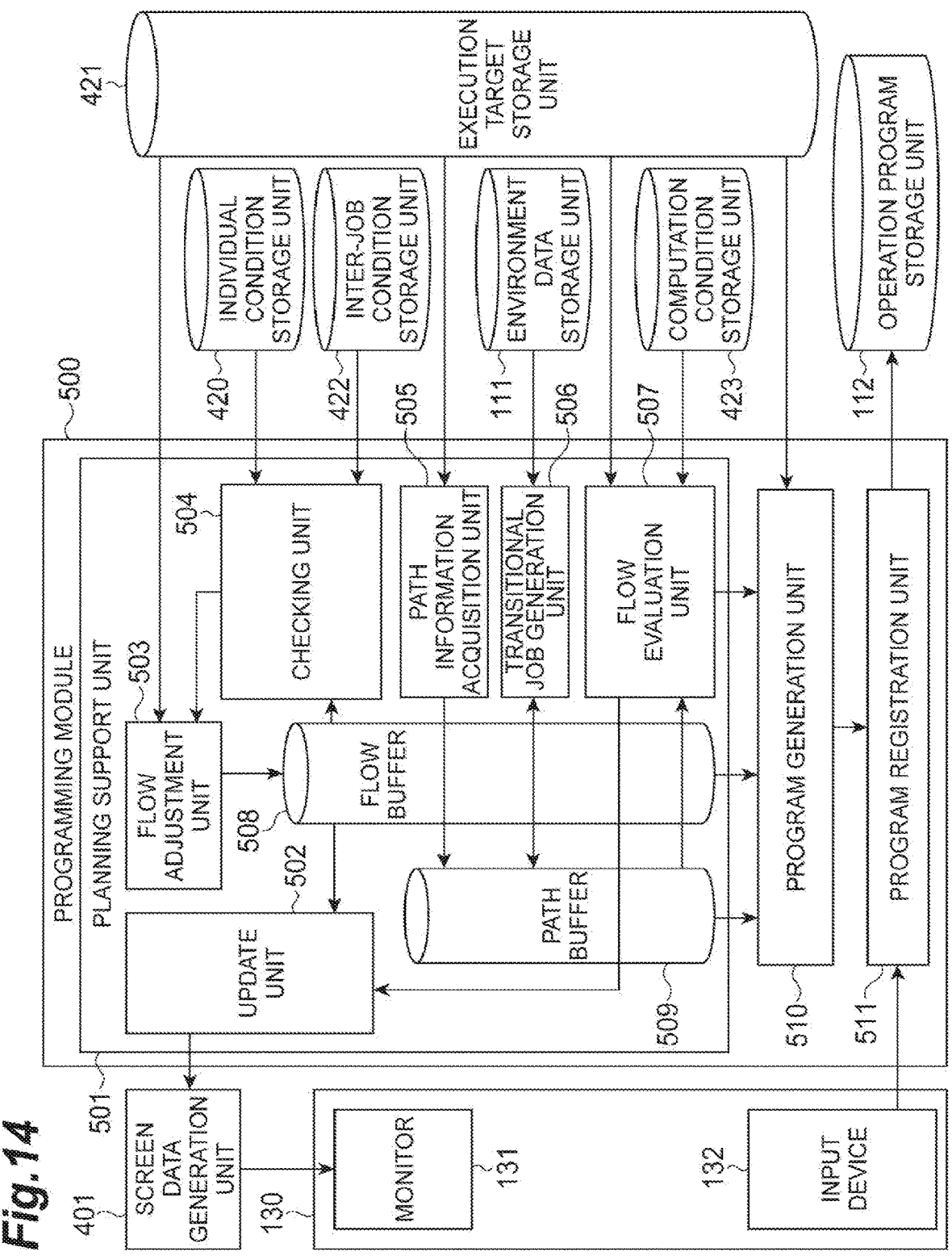
FIG. 14 is a block diagram illustrating a functional configuration of a programming module.

The programming module 500 is activated in response to clicking on the planning button G37 (FIG. 11). As illustrated in FIG. 14, the programming module 500 includes a planning support unit 501 and a program generation unit 510, as subdivided functional modules.

The planning support unit 501 checks the execution timing of at least one of the work jobs based on the first restricting condition and the second restricting condition. The checking is for determining whether the first restricting condition and the second restricting condition are satisfied. For example, the planning support unit 501 performs: storing a plurality of work jobs defining an operation pattern of the robot 2; setting, in accordance with an input to a user interface, an environmental condition that specifies an operation environment of the robot 2 for one of the work jobs in accordance with an input to a user interface; setting a plurality of work jobs to be executed by the robot in the plurality of work jobs in accordance with an input to the user interface; and determining, in an execution flow for defining an execution order of the plurality of work jobs set by the second condition setting unit, whether at least one of the work jobs satisfies the environmental condition based on the execution order. In some examples, the planning support unit 501 may be configured to perform: storing a plurality of work jobs each of which defines an operation pattern of a robot; setting an environmental condition of the robot at one or more execution timings associated with the work jobs in accordance with user input; selecting a plurality of the work jobs in accordance with the user input; and checking whether at least one work job of the plurality of work jobs satisfies the environmental condition of the robot at an execution timing of the one work job based on an execution flow of the plurality of work jobs. The execution flow may be automatically generated by the planning support unit 501 or may be set and input by the user. Below, the case where the planning assistance part 501 generates an execution flow automatically is described.

For example, the planning support unit 501 includes, as subdivided functional modules, a checking unit 504, a flow adjustment unit 503, a path information acquisition unit 505, a transitional job generation unit 506, a flow evaluation unit 507, and an update unit 502.

The checking unit 504 checks an execution timing of at least one of the work jobs based on the first restricting condition stored in the individual condition storage 420 and the second restricting condition stored in the inter-job condition storage 422. The checking unit 504 determines, based on the execution order, whether or not at least one work job satisfies the environmental condition in the execution flow in which the execution order of the plurality of execution target work jobs is determined.

For example, the checking unit 504 is configured to identify an environmental state at the time of executing one of the work jobs in the execution flow based on the operational content of the robot 2 in another work job in the execution flow and the execution order of the execution flow; and determine whether the environmental state satisfies the environmental condition of the one of the work jobs.

In a case that the execution flow includes a first work job and a second work job in this order, the checking unit 504 is configured to: identify the environmental state in the time of executing the second work job based on at least the work content of the robot 2 in the first work job; and determine whether the environmental state satisfies the environmental condition of the second work job.

In some examples, in a case that the operation pattern defined by the first work job includes an operation of physically manipulating the work object, and the environmental condition of the second work job includes a condition for specifying the state of the work object, the checking unit 504 may identify the state of the work object after the robot 2 operates in accordance with the first work job as the environmental state at the execution timing of the second work job, and check whether the environmental state satisfies the environmental condition of the second work job.

In a case that the execution flow includes the first work job, the second work job, and a third work job in this order, the checking unit 504 may be configured to: identify the environmental state in the time of executing the second work job based on at least the work content of the robot in the first work job; update the environmental state based on at least the work content of the robot in the second work job so as to identify the environmental state of the third work job; and determine whether the environmental state satisfies the environmental condition of the third work job.

The checking unit 504 may be configured to: generate, based on an environmental condition of the one work job in the execution flow and the operation content of the robot in the other work job in the execution flow, an order condition required between the one work job and the other work job so that the one work job satisfies the environmental condition; and determine whether the execution order of the execution flow satisfies the execution order.

The flow adjustment unit 503 generates an execution flow to be determined by the checking unit 504 so as to be consistent with the timing condition. Further, when it is determined that any work job does not satisfy the environmental condition in the execution flow, the execution order is changed so as to be consistent with the timing condition. For example, the flow adjustment unit 503 randomly generates an execution flow of the plurality of work jobs stored in the execution target storage 421 in a range where the timing condition is satisfied. After that, when it is determined that any work job does not satisfy the environmental condition in the execution flow, the flow adjustment unit 503 randomly changes the execution order so as to be consistent with the timing condition. Thereafter, the flow adjusting unit 503 repeats changing the execution order until the execution flow consistent with the timing condition does not include a work job that does not satisfy the environmental condition. Every time an execution flow is generated or changed, the flow adjustment unit 503 overwrites the result in a flow buffer 508 as a temporary storage.

In a case where the programming support apparatus 100 executes the programming support of the operation program for a plurality of control targets, the flow adjustment unit 503 may generate a plurality of execution flows each respectively corresponding to each of the plurality of control targets.

The path information acquisition unit 505 obtains first path information that defines an operation path of the robot 2 (temporal transition of the position and attitude of the distal end portion 2a) for at least one of the work jobs. For example, the path information acquisition unit 505 reads all the first path information of the work job as an execution target from the execution target storage 421.

The transitional job generation unit 506 generates second path information defining the operation path of the robot 2 between the work jobs based on the execution flow stored in the flow buffer 508, the first path information obtained by the path information acquisition unit 505, and the environment model data stored in the environment data storage 111. For example, the transitional job generation unit 506 connects between an end point of an operation path of a preceding work job and a start point of an operation path of a subsequent work job to generate the second path information so as to avoid collision between the robot 2 and its surrounding objects, and writes the second path information into a path buffer 509 as a temporary storage.

For example, the transitional job generation unit 506 repeats generation of a via point in order to avoid a collision and correction of the path so as to pass through the via point until collision avoidance is achieved over the entire path. Another method of generating the path is disclosed in, for example, Japanese Patent No. 4103057, the entire contents of which are incorporated by reference.

The flow evaluation unit 507 evaluates the execution flow and the first path information and/or the second path information based on an evaluation condition different from the first restricting condition and the second restricting condition, and determines adoptability of the execution flow based on an evaluation result. For example, the flow evaluation unit 507 evaluates the execution flow, the first path information, and the second path information based on the evaluation condition, and determines adoptability of the execution flow based on the above-described evaluation result. For example, the evaluation result may give an indication of the execution time if the execution flow was executed as an operation program, the energy consumption of executing the operation program, and/or the like. The evaluation result may be compared with a reference value in order to determine whether the evaluation condition is satisfied, and accordingly whether the execution flow is adoptable.

In some examples, the flow evaluation unit 507 derives a predetermined evaluation value for the operation program according to the execution flow, the first path information, and the second path information, and determines that the execution flow is adoptable in a case where the evaluation value has reached an acceptance level, and determines that execution flow is not adoptable in a case where the evaluation value has not reached the acceptance level. Specific examples of the evaluation value include an operation program execution time and power consumption of the operation program (power consumption of the robot 2 operating in accordance with the operation program). The evaluation value may be derived by combining the execution time and the power consumption.

Moreover, the flow evaluation unit 507 may repeat generation of the execution flow and derivation of the above-described evaluation value for a predetermined time, and may adopt an execution flow that achieves the most preferable evaluation value. For example, the flow evaluation unit 507 may adopt an execution flow achieving the shortest operation program execution time or may adopt an execution flow achieving the lowest power consumption of the operation program.

Note that the flow evaluation unit 507 may adjust a criterion for the process of determining adoptability of the execution flow. This criterion may be set according to the computation level stored in the computation condition storage 423. For example, the flow evaluation unit 507 may raise the above-described acceptance level or may extend the time for repeating the generation of the execution flow and the derivation of the above-described evaluation value in accordance with the raised computation level stored in the computation condition storage 423.

Moreover, the flow evaluation unit 507 may adjust accuracy of the operation program as an evaluation target in accordance with the computation level stored in the computation condition storage 423. For example, the flow evaluation unit 507 may reduce the operation time by simplifying the operation program as an evaluation target in accordance with the lowered computation level stored in the computation condition storage 423. Specific examples of simplification include omitting generation of the second path information so as to make the operation path between the work jobs linear, making the time between the work jobs constant, and roughening the mesh in the environment model data.

The update unit 502 updates the display data for the second input area G20 so as to display the execution flow determined to be adoptable by the flow evaluation unit 507 in the result output section G29.

The program generation unit 510 generates an operation program of the robot 2 based on the execution flow determined to be adoptable by the planning support unit 501. For example, the operation program is obtained by arranging the above-described first path information and the second path information in accordance with the above-described execution flow.

The program registration unit 511 registers the operation program generated by the program generation unit 510 in the operation program storage 112 in accordance with an input to the user interface 130. For example, in response to clicking on the save button G38, the program registration unit 511 writes the operation program into the operation program storage 112.

Note that it is satisfactory that the programming module 500 performs at least programming support based on the check result of the execution timing, and thus, the operation program may be generated manually (i.e. user-generated) or semi-automatically, in addition to or instead of executing automatic generation of the operation program. For example, the programming module 500 may be configured to display a warning in a case where the execution flow, that may have been generated automatically or input by the user, does not satisfy at least one of the first restricting condition and the second restricting condition.

(4) Simulation Module

Figure 15:
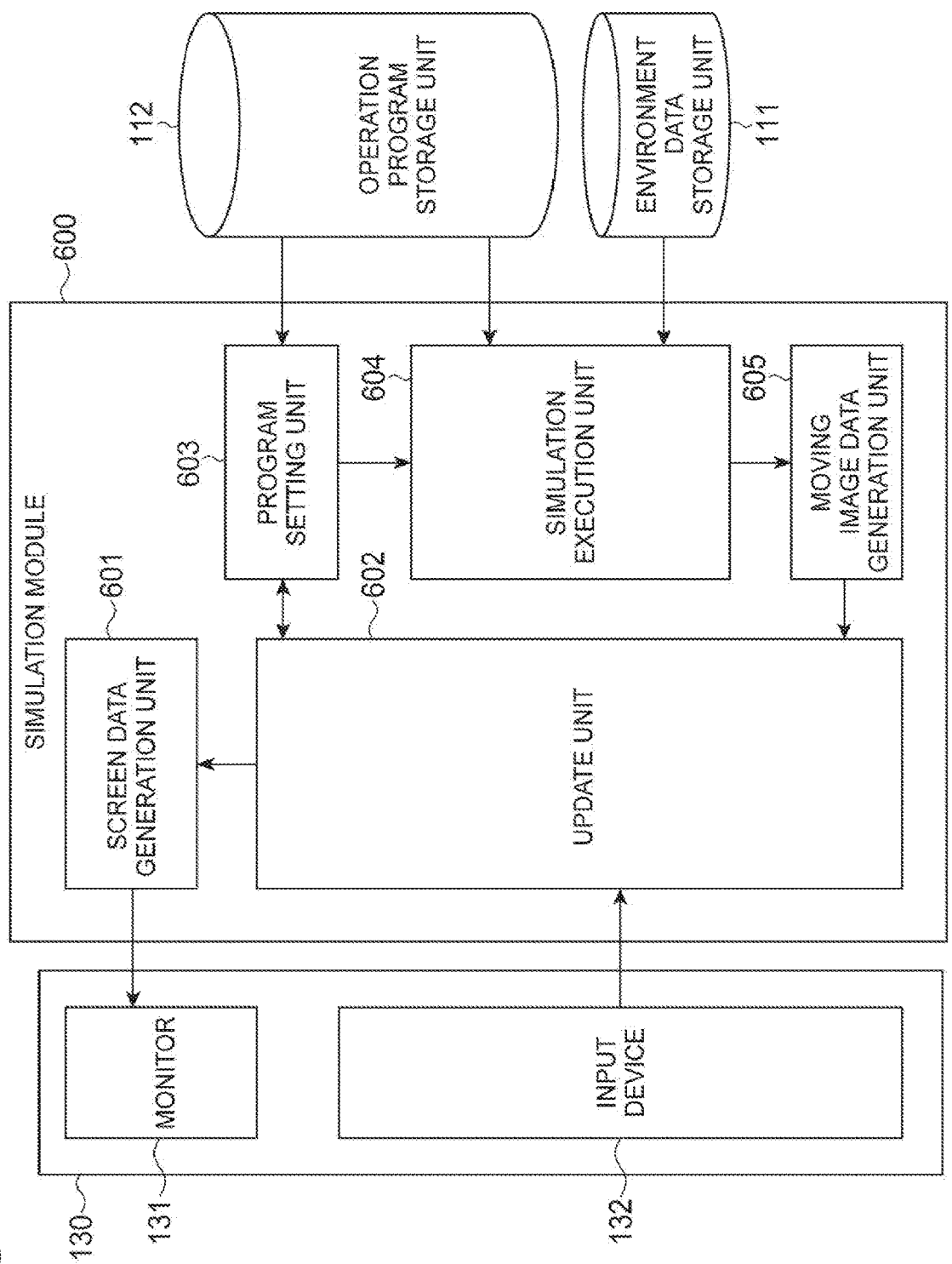
FIG. 15 is a block diagram illustrating a functional configuration of a simulation module.

As illustrated in FIG. 15, the simulation module 600 includes, as subdivided functional modules, a window data generation unit 601, an update unit 602, a program setting unit 603, a simulation execution unit 604, and a moving image data generation unit 605.

Figure 16:
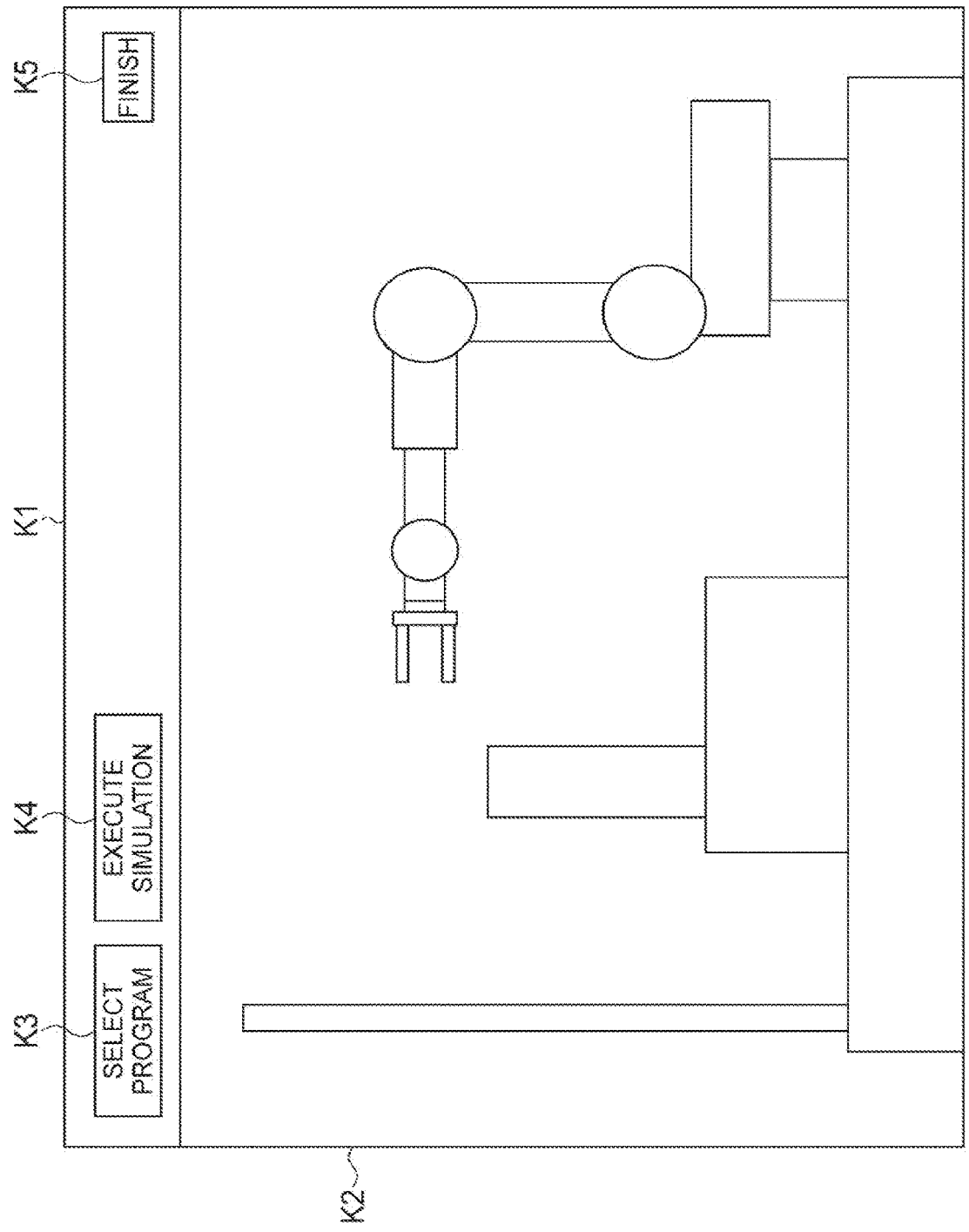
FIG. 16 is a schematic diagram illustrating a simulation window.

With further reference to FIG. 16, the window data generation unit 601 generates data for displaying a simulation window K1 on the monitor 131. The simulation window K1 is a window for graphically displaying a simulation result.

As illustrated in FIG. 16, the simulation window K1 includes a drawing area K2, a program selection button K3, a simulation execution button K4, and a finish button K5. The drawing area K2 is an area in which a simulation result is displayed in a three-dimensional image or the like. The program selection button K3 is used to select an operation program as a simulation target. The simulation execution button K4 is for instructing execution of simulation. The finish button K5 is for closing the simulation window K1 and finishing the processing by the simulation module 600.

Returning to FIG. 15, the update unit 602 updates the display data for the simulation window K1 in accordance with an operation input to the input device 132. For example, the update unit 602 updates the display data for the simulation window K1 so as to display the program selection window L1 in response to the clicking on the above-described program selection button K3. The program selection window L1 is a window on which an operation program as a simulation target is selected.

Figure 17:
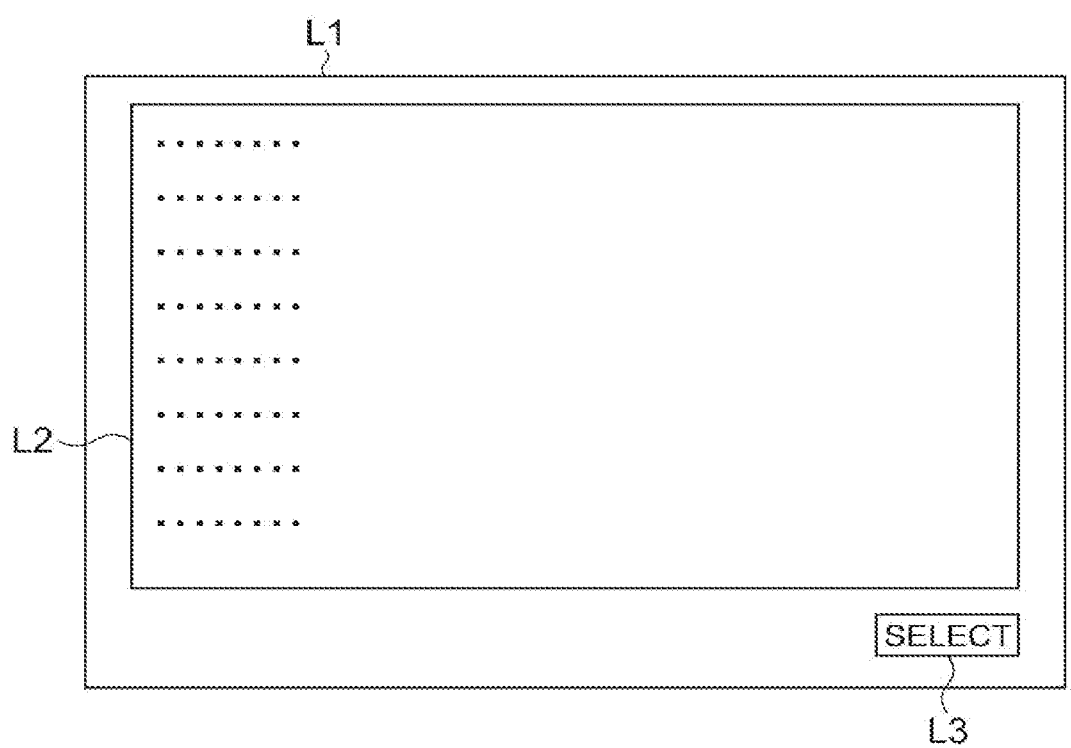
FIG. 17 is a schematic diagram illustrating a simulation target selection window.

As illustrated in FIG. 17, the program selection window L1 includes a list display area L2 and a selection button L3. The list display area L2 displays a list of selectable operation programs (for example, operation programs stored in the operation program storage 112). The selection button L3 is a button used to instruct selection of the operation program selected in the list display area L2.

Moreover, the update unit 602 updates display data for the drawing area K2 so as to display the moving image data in the list display area L2 after the simulation execution button K4 is clicked and moving image data (described below) corresponding to the simulation result is generated.

Returning to FIG. 15, the program setting unit 603 sets the operation program selected on the program selection window L1 to be an operation program as a simulation target. The simulation execution unit 604 executes operation simulation of the robot 2. For example, the simulation execution unit 604 causes the model of the robot 2 to operate in accordance with the operation program as a simulation target under the simulation environment specified by the environment model data stored in the environment data storage 111.

The moving image data generation unit 605 generates moving image data of the model of the robot 2 in accordance with a simulation result obtained by the simulation execution unit 604.

Figure 18:
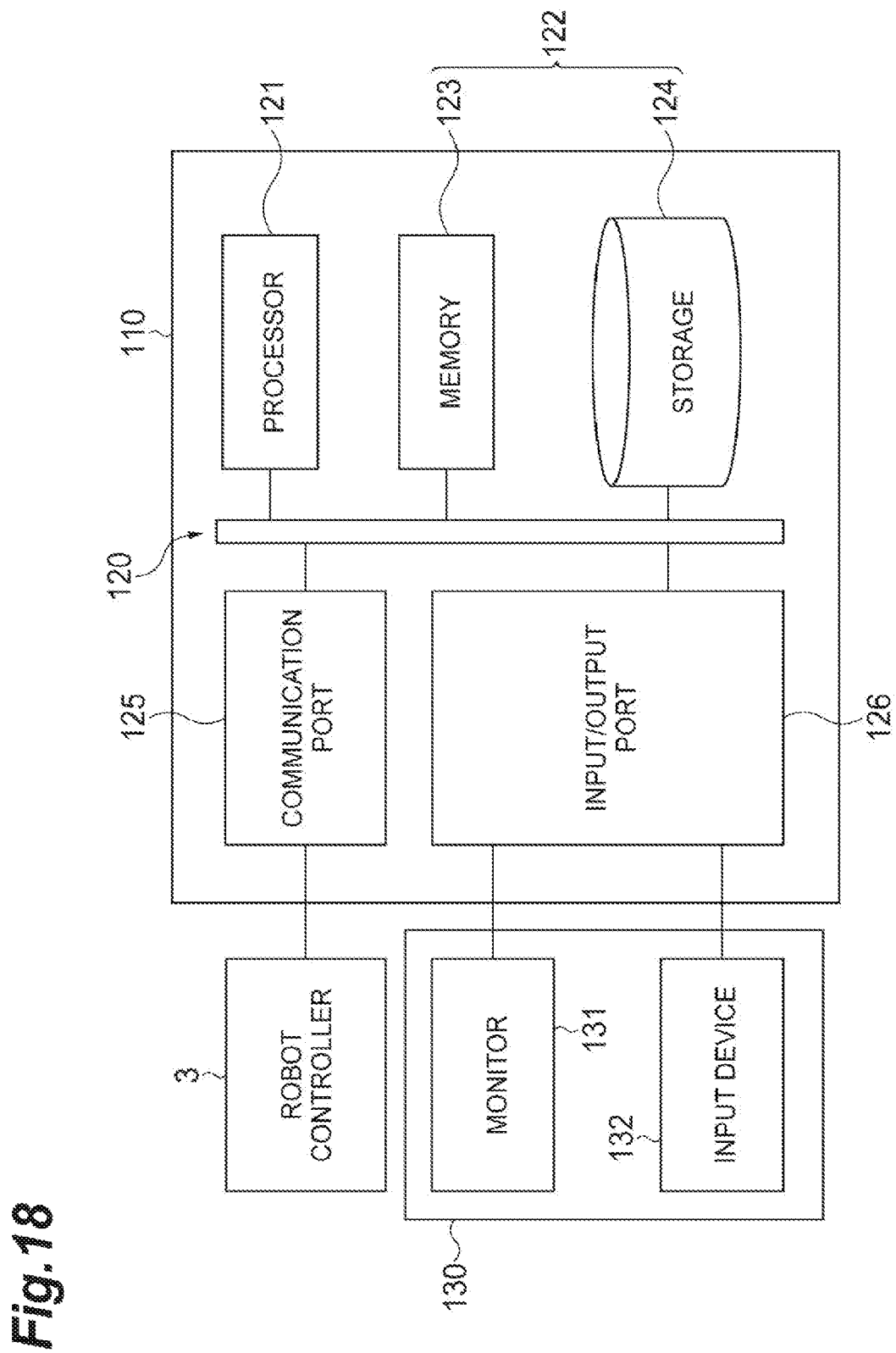
FIG. 18 is a block diagram illustrating a hardware configuration of a programming support apparatus.

FIG. 18 is a block diagram illustrating a hardware configuration of the main body 110. As illustrated in FIG. 18, the main body 110 includes a circuit 120, and the circuit 120 includes one or more processors 121, a storage 122, a communication port 125, and an input/output port 126. The storage 122 includes a memory 123 and a storage 124. The storage 124 stores programs used to configure each of the above-described functional modules of the main body 110. The storage 124 may be of any type as long as it is a computer-readable storage. Specific examples include a hard disk, nonvolatile semiconductor memory, a magnetic disk, and an optical disk. The memory 123 temporarily stores the program loaded from the storage 124, calculation results of the processor 121, or the like. The processor 121 executes programs in cooperation with the memory 123, thereby forming the functional modules.

The communication port 125 inputs and outputs an electric signal to/from the robot controller 3 in accordance with a command from the processor 121. The input/output port 126 inputs and outputs an electric signal to/from the monitor 131 and the input device 132 in accordance with a command from the processor 121.

3. Program Generation Method

Subsequently, a program generation procedure executed by the programming support apparatus 100 will be described as one example of the program generation method and the programming support method.

(1) Outline

Figure 19:
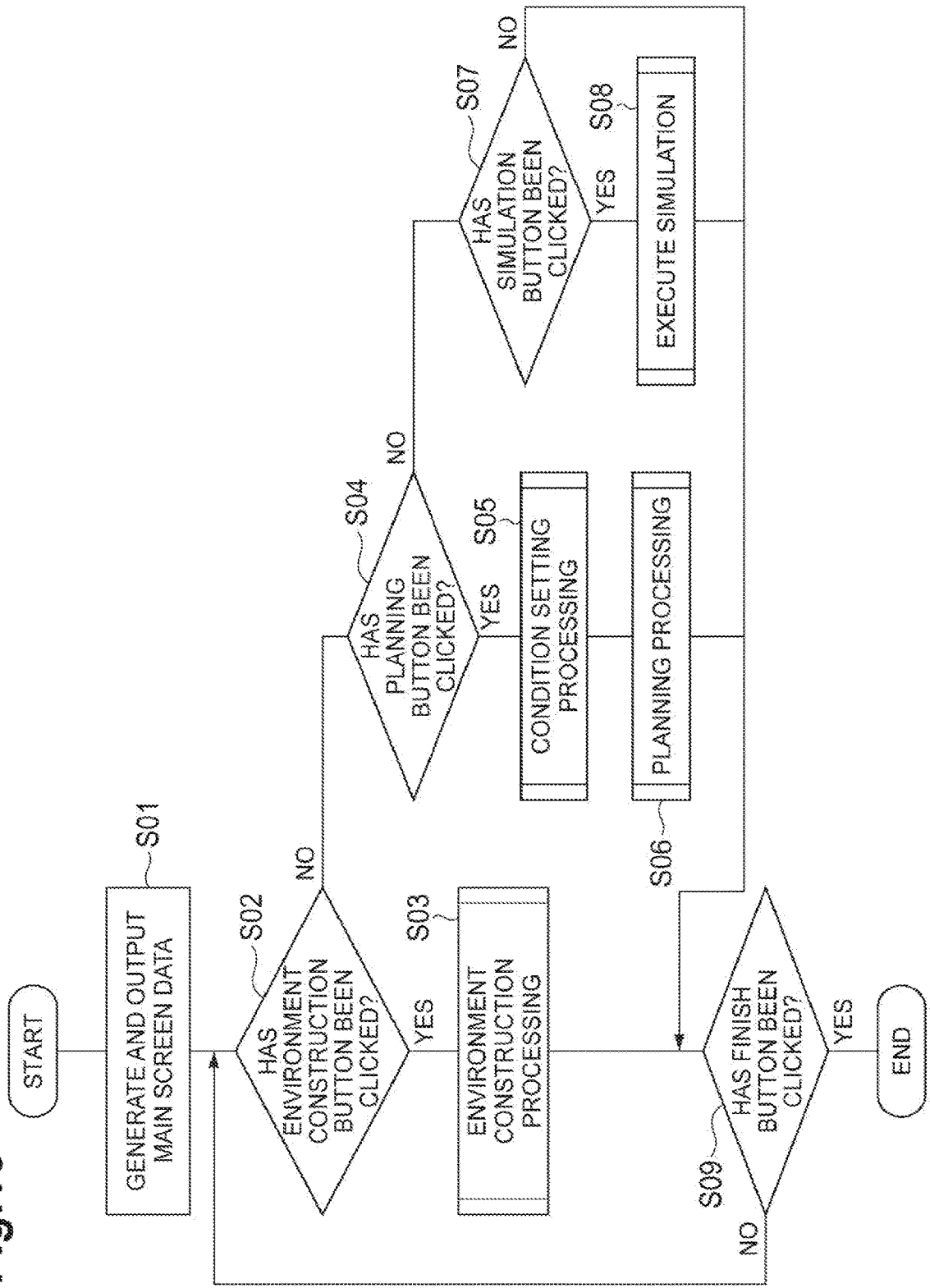
FIG. 19 is a flowchart illustrating a programming support procedure.

In some examples, the programming support apparatus 100 may be configured to sequentially execute some or all of the operations illustrated in FIG. 19 and as further described below. Whereas some of the operations may additionally be described as being executed by one or more "modules," in some examples some or all of the operations may be performed by one or more processing devices and/or hardware devices, and as further described above with respect to the example hardware configuration illustrated in FIG. 18. In step S01, the window data generation unit 201 generates display data for the main window A1 and outputs the data to the monitor 131.

The programming support apparatus 100 executes operation S02. In operation S02, the module switching unit 202 confirms whether the environment construction button A2 has been clicked.

In a case where it is determined in operation S02 that the environment construction button A2 has been clicked, the programming support apparatus 100 executes operation S03. In operation S03, the environment construction module 300 constructs environment model data for operation simulation of the robot 2. Specific processing content will be described below.

In a case where it is determined in operation S02 that the environment construction button A2 has not been clicked, the programming support apparatus 100 executes operation S04. In operation S04, the module switching unit 202 confirms whether the planning button A3 has been clicked.

In a case where it is determined in operation S04 that the planning button A3 has been clicked, the programming support apparatus 100 executes steps S05 and S06. In operation S05, the condition setting module 400 executes processing of setting a programming support condition including the above-described first restricting condition and the above-described second restricting condition. In operation S06, the programming module 500 executes programming support of the operation program in accordance with the programming support condition set by the condition setting module 400. For example, the programming module 500 generates an operation program in accordance with the above-described programming support condition. Details of these example processes will be described below.

In a case where it is determined in operation S04 that the planning button A3 has not been clicked, the programming support apparatus 100 executes operation S07. In operation S07, the module switching unit 202 confirms whether the simulation button A4 has been clicked.

In a case where it is determined in operation S07 that the simulation button A4 has been clicked, the programming support apparatus 100 executes operation S08. In operation S08, operation simulation of the robot 2 is executed. Specific processing content will be described below.

In operation S09, the module switching unit 202 confirms whether the finish button A5 has been clicked.

In a case where it is determined in operation S09 that the finish button A5 has not been clicked, the programming support apparatus 100 returns the processing to operation S02. Thereafter, the processing corresponding to the clicking on the environment construction button A2, the planning button A3, or the simulation button A4 is repeated until the finish button A5 is clicked.

In a case where it is determined in operation S09 that the finish button A5 has been clicked, the programming support apparatus 100 closes the main window A1 and finishes the processing.

(2) Procedure for Constructing Environment Model Data

Figure 20:
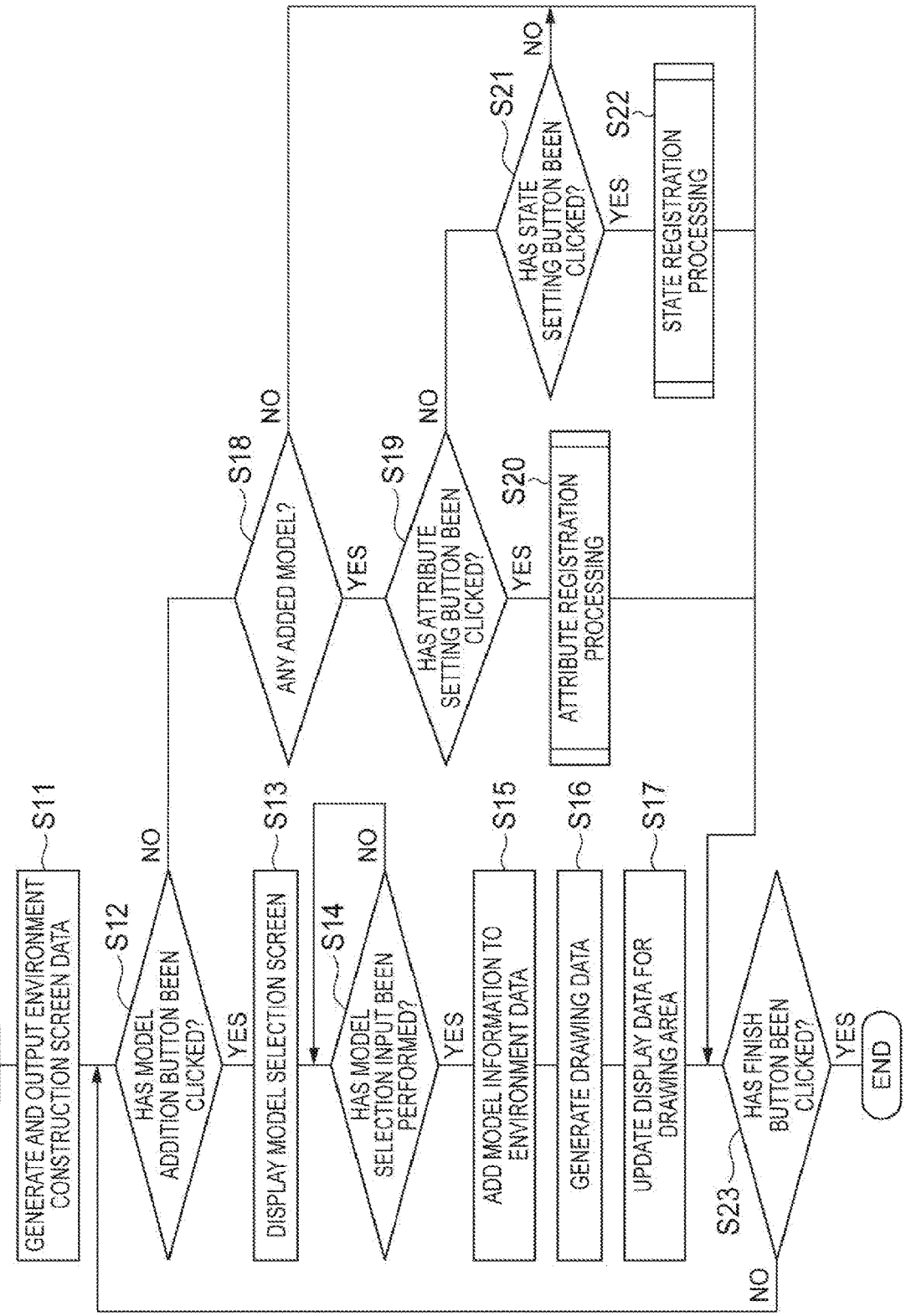
FIG. 20 is a flowchart illustrating an environment construction procedure.

Next, a procedure for constructing the environment data in above-described operation S03 will be described. As illustrated in FIG. 20, in operation S11, the window data generation unit 301 generates display data for the environment construction window B1 and outputs the data to the monitor 131.

In operation S12, the update unit 302 confirms whether the model addition button B3 has been clicked.

In a case where it is determined in operation S12 that the model addition button B3 has been clicked, the programming support apparatus 100 executes operation S13. In operation S13, the model addition unit 303 generates a list of model data with reference to the model data storage 113, and the update unit 302 generates display data for the model selection window C1 using the generated list, and updates display data for the environment construction window B1 so as to display the model selection window C1.

In operation S14, the model addition unit 303 waits for selection input of model data on the model selection window C1.

In operation S15, the model addition unit 303 obtains the model data selected on the model selection window C1 from the model data storage 113 and adds the obtained model data to the environment data of the environment model data storage 111.

In operation S16, the drawing data generation unit 304 generates drawing data for the simulation environment using the environment model data stored in the environment data storage 111 and outputs the data to the update unit 302 as display data for the simulation environment area B2.

In operation S17, the update unit 302 updates the display data for the simulation environment area B2 using the data output from the drawing data generation unit 304.

In a case where it is determined in operation S12 that the model addition button B3 has not been clicked, the programming support apparatus 100 executes operation S18. In operation S18, the model addition unit 303 confirms whether at least one piece of model data has been added to the environment model data.

In a case where it is determined in operation S18 that there is model data already added to the environment model data, the programming support apparatus 100 executes operation S19. In operation S19, the update unit 302 confirms whether the attribute setting button B4 has been clicked.

In a case where it is determined in operation S19 that the attribute setting button B4 has been clicked, the programming support apparatus 100 executes operation S20. In operation S20, the attribute data registration unit 305 registers attribute data of the input target model. Specific processing content will be described below.

In a case where it is determined in operation S19 that the attribute setting button B4 has not been clicked, the programming support apparatus 100 executes operation S21. In operation S21, the model addition unit 303 confirms whether the state setting button B5 has been clicked.

In a case where it is determined in operation S21 that the state setting button B5 has been clicked, the programming support apparatus 100 executes operation S22. In operation S22, the state data registration unit 306 registers the state data of the input target model. Specific processing content will be described below.

In operation S23, the update unit 302 confirms whether the finish button B6 has been clicked.

In a case where it is determined in operation S23 that the finish button B6 has not been clicked, the programming support apparatus 100 returns the processing to operation S12. Thereafter, the construction processing of the environment model data is repeated until the finish button B6 is clicked.

In a case where it is determined in operation S23 that the finish button B6 has been clicked, the programming support apparatus 100 closes the environment construction window B1 to finish the processing.

(Attribute Data Registration Procedure)

Figure 21:
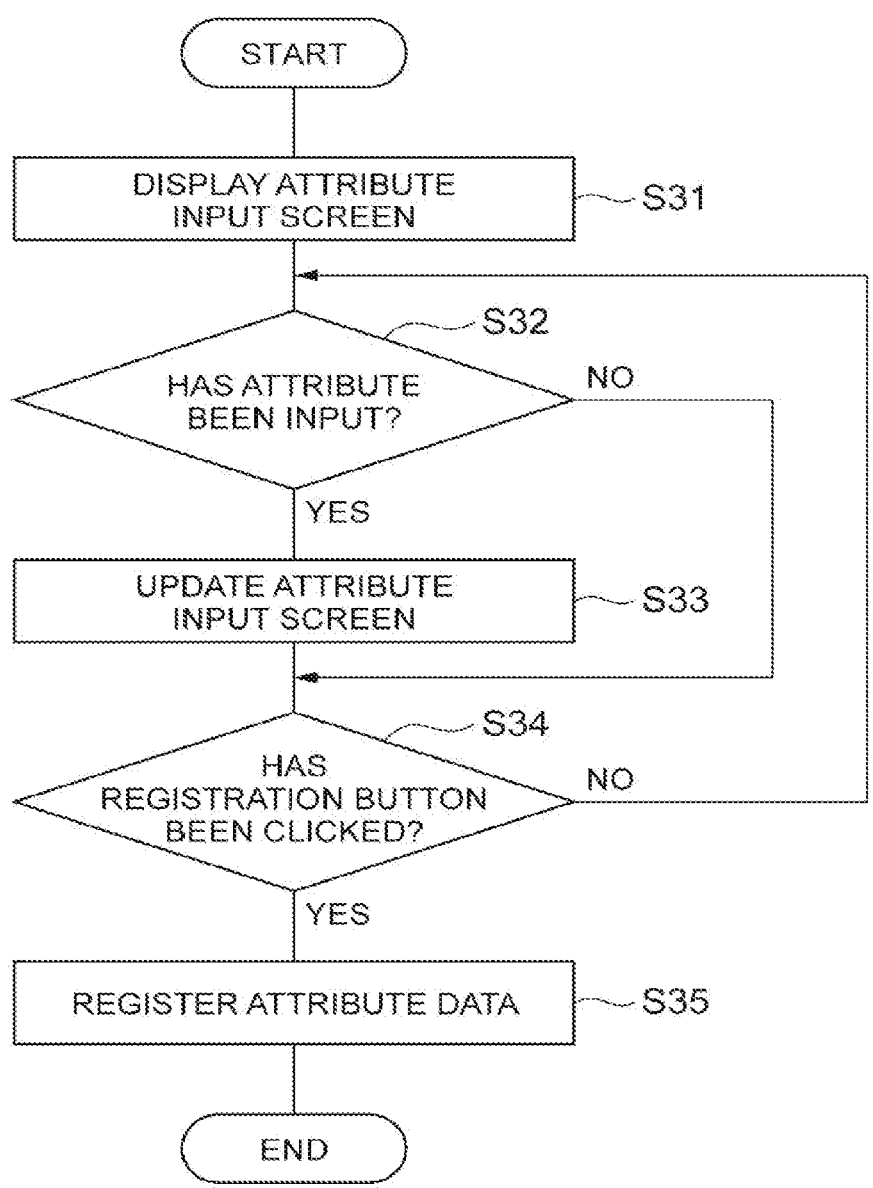
FIG. 21 is a flowchart illustrating an attribute data registration procedure.

As illustrated in FIG. 21, the programming support apparatus 100 first executes operation S31. In operation S31, the update unit 302 updates the display data for the environment construction window B1 so as to display the attribute input window D1.

In operation S32, the update unit 302 determines whether information has been input to the attribute input window D1.

In a case where it is determined in operation S32 that information has been input to the attribute input window D1, the programming support apparatus 100 executes operation S33. In operation S33, the update unit 302 updates the display data for the attribute input window D1 so as to reflect the input content.

In a case where it is determined in operation S32 that no information has been input to the attribute input window D1, the programming support apparatus 100 executes operation S34. In operation S34, the update unit 302 confirms whether the registration button D5 has been clicked.

In a case where it is determined in operation S34 that the registration button D5 has not been clicked, the programming support apparatus 100 returns the processing to operation S32. Thereafter, updating of the display data on the attribute input window D1 according to the input of the attribute data is repeated until the registration button D5 is clicked.

In a case where it is determined in operation S34 that the registration button D5 has been clicked, the programming support apparatus 100 executes operation S35. In operation S35, the attribute data registration unit 305 obtains the data input on the attribute input window D1, and writes the data into the environment data storage 111 in association with the input target model. This completes the attribute data registration procedure.

(State Data Registration Procedure)

Figure 22:
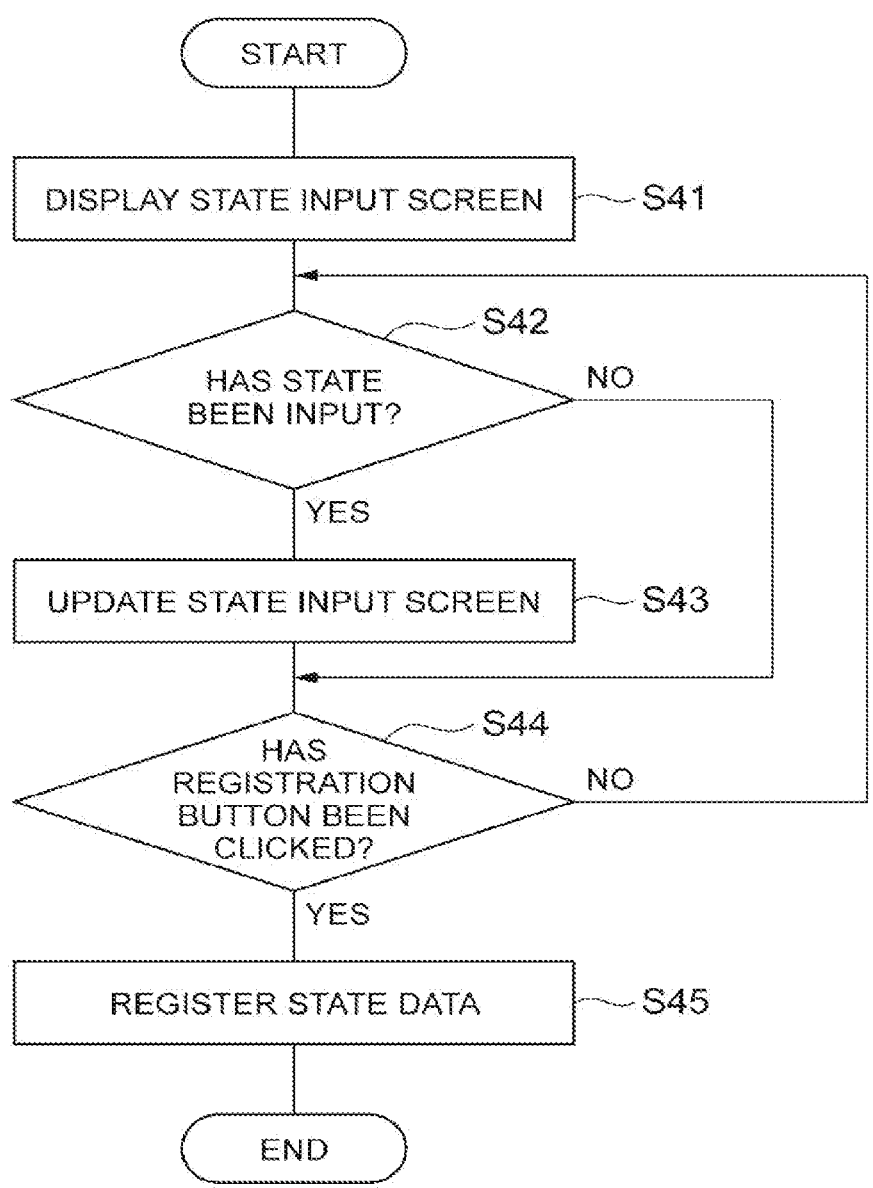
FIG. 22 is a flowchart illustrating a state data registration procedure.

As illustrated in FIG. 22, in operation S41, the update unit 302 updates the display data for the environment construction window B1 so as to display the state input window F1.

In operation S42, the update unit 302 determines whether information has been input to the state input window F1.

In a case where it is determined in operation S42 that information has been input to the state input window F1, the programming support apparatus 100 executes operation S43. In operation S43, the update unit 302 updates the display data for the state input window F1 so as to reflect the input content.

In a case where it is determined in operation S42 that no information has been input to the state input window F1, the programming support apparatus 100 executes operation S44. In operation S44, the update unit 302 confirms whether the registration button F4 has been clicked.

In a case where it is determined in operation S44 that the registration button F4 has not been clicked, the programming support apparatus 100 returns the processing to operation S42. Thereafter, updating of the display data on the state input window F1 according to the input of the state data is repeated until the registration button F4 is clicked.

In a case where it is determined in operation S44 that the registration button F4 has been clicked, the programming support apparatus 100 executes operation S45. In operation S45, the state data registration unit 306 obtains the data input on the state input window F1, and writes the into the environment data storage 111 in association with the input target model. This completes the state data registration procedure.

(3) Programming Support Condition Setting Procedure

Subsequently, a programming support condition setting procedure in above-described operation S03 will be described.

(Outline)

Figure 23:
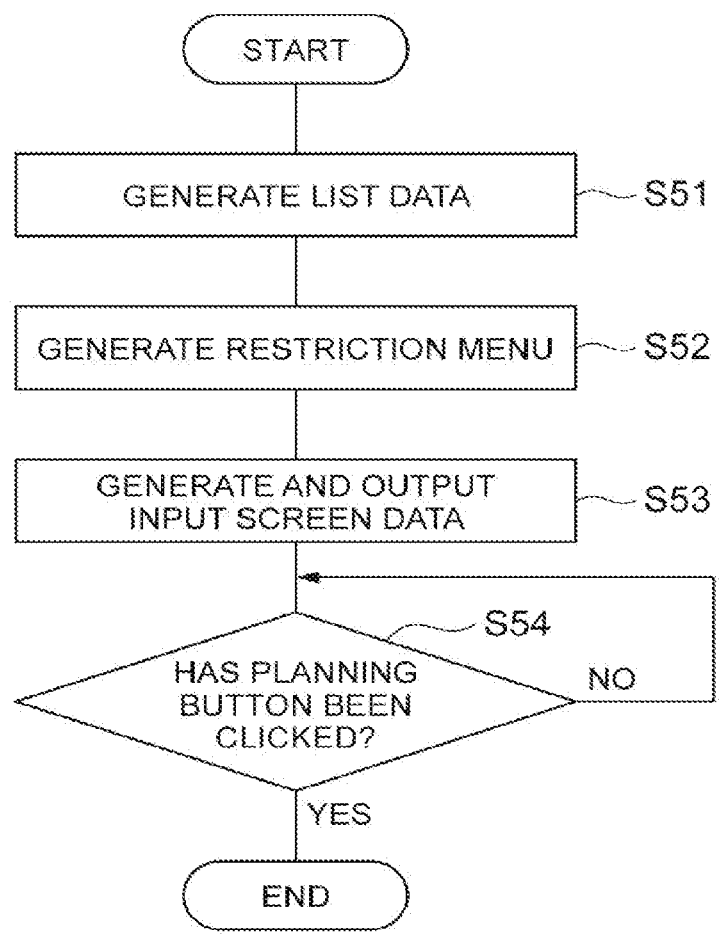
FIG. 23 is a flowchart illustrating a programming support condition setting procedure.

As illustrated in FIG. 23, in operation S51, the list generation unit 405 generates a list of work jobs to be displayed in the list display area G2, and outputs the list to the window data generation unit 401.

In operation S52, the restriction menu generation unit 406 generates a list of restricting conditions to be displayed in the restriction menu display area G32, and outputs the list to the window data generation unit 401.

In operation S53, the window data generation unit 401 generates display data for the planning window G1 and outputs the data to the monitor 131. In accordance with an input operation on the planning window G1, the process of setting the programming support condition is started and continued until the planning button G37 is clicked (operation S54). When the planning button G37 is clicked, the programming support condition setting procedure is completed.

Hereinafter, the programming support condition setting procedure will be described in separate procedures of a first restricting condition setting procedure, a second restricting condition setting procedure, and a computation level setting procedure.

(First Restricting Condition Setting Procedure)

Figure 24:
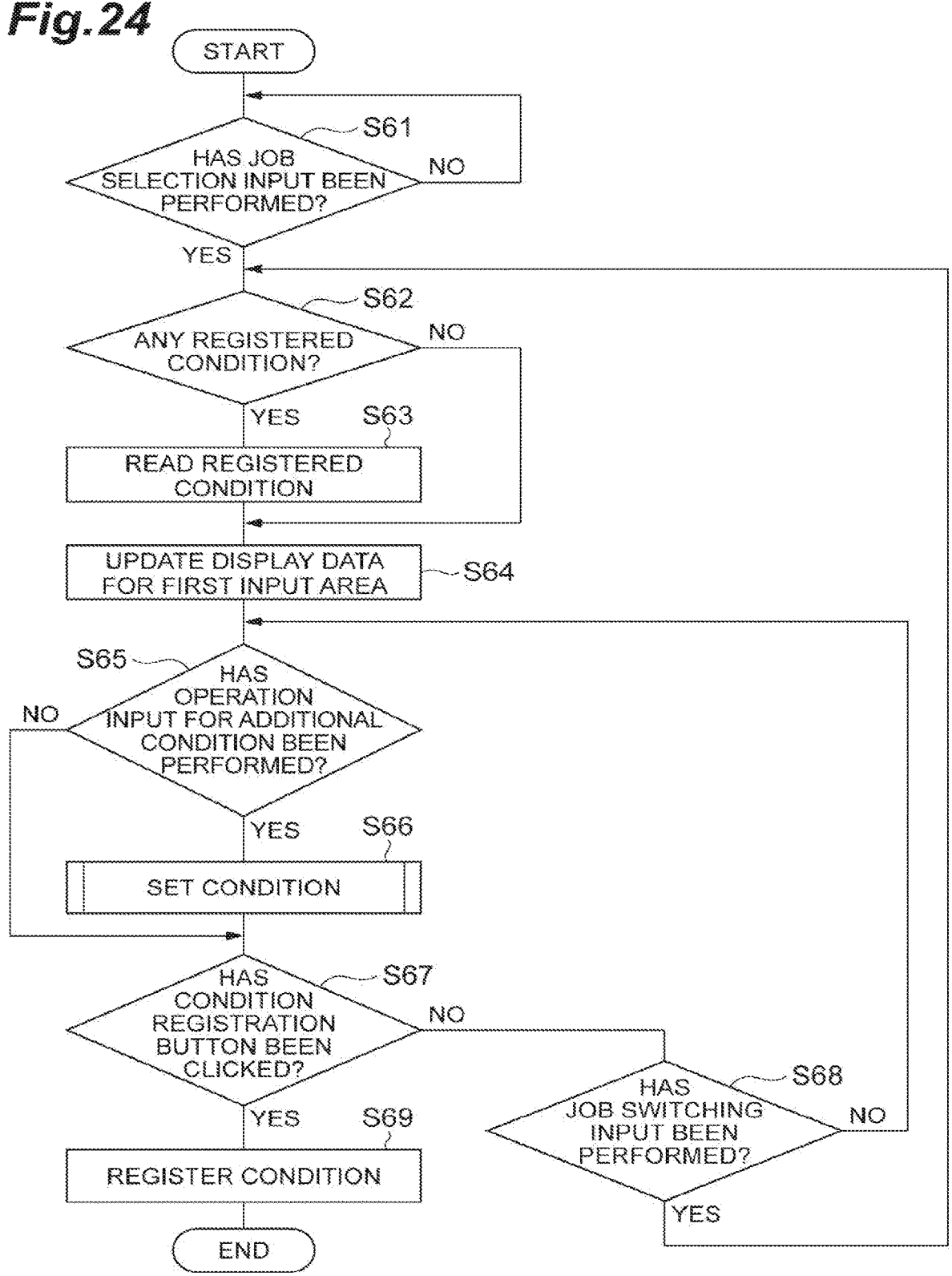
FIG. 24 is a flowchart illustrating a first restricting condition setting procedure.

As illustrated in FIG. 24, in operation S61, the first update unit 402 waits for selection input (for example, clicking on the list element G3) of a work job in the list display area G2.

In operation S62, the condition reading unit 411 confirms whether the first restricting condition for the work job selected in the list display area G2 (hereinafter referred to as "selected job") is stored in the individual condition storage 420.

In a case where it is determined in operation S62 that the first restricting condition of the selected job is stored in the individual condition storage 420, the programming support apparatus 100 executes operation S63. In operation S63, the condition reading unit 411 reads the first restricting condition stored in the individual condition storage 420.

In a case where it is determined in operation S62 that the first restricting condition of the selected job is not stored in the individual condition storage 420, the programming support apparatus 100 executes operation S64. In operation S64, the first update unit 402 updates the display data for the first input area G9 so as to enable an input of the first restricting condition of the selected job.

In some examples, the first update unit 402 updates display data for the first input area G9 so as to display information at an input portion of an item having information read from the individual condition storage 420 in operation S63, and so as to leave the input portion of other item blank.

In operation S65, the first update unit 402 confirms the presence or absence of input for adding the first restricting condition. In a case where it is determined in operation S65 that there has been an input for adding the first restricting condition, the programming support apparatus 100 executes operation S66. Operation S66 includes processing of setting the first restricting condition based on the content input to the first input area G9. Specific processing content will be described below.

In a case where it is determined in operation S65 that there is no input for adding the first restricting condition, the programming support apparatus 100 executes operation S67. In operation S67, the condition registration unit 419 confirms whether the condition registration button G36 has been clicked.

In a case where it is determined in operation S67 that the condition registration button G36 has not been clicked, the programming support apparatus 100 executes operation S68. In operation S68, the first update unit 402 confirms whether another work job is selected in the list display area G2.

In a case where it is determined in operation S68 that no other work job is selected, the programming support apparatus 100 returns the processing to operation S65. Thereafter, processing of setting the first restricting condition of the selected job based on the input to the first input area G9 is repeated until the condition registration button G36 is clicked or another work job is selected in the list display area G2.

In a case where it is determined in operation S68 that another work job has been selected, the programming support apparatus 100 returns the processing to operation S62, and starts the first restricting condition setting processing for a newly selected work job.

In a case where it is determined in operation S67 that the condition registration button G36 has been clicked, the programming support apparatus 100 executes operation S69. In operation S69, the condition registration unit 419 writes a first restricting condition setting result in the first input area G9 into the individual condition storage 420. This completes the first restricting condition setting procedure.

Figure 25:
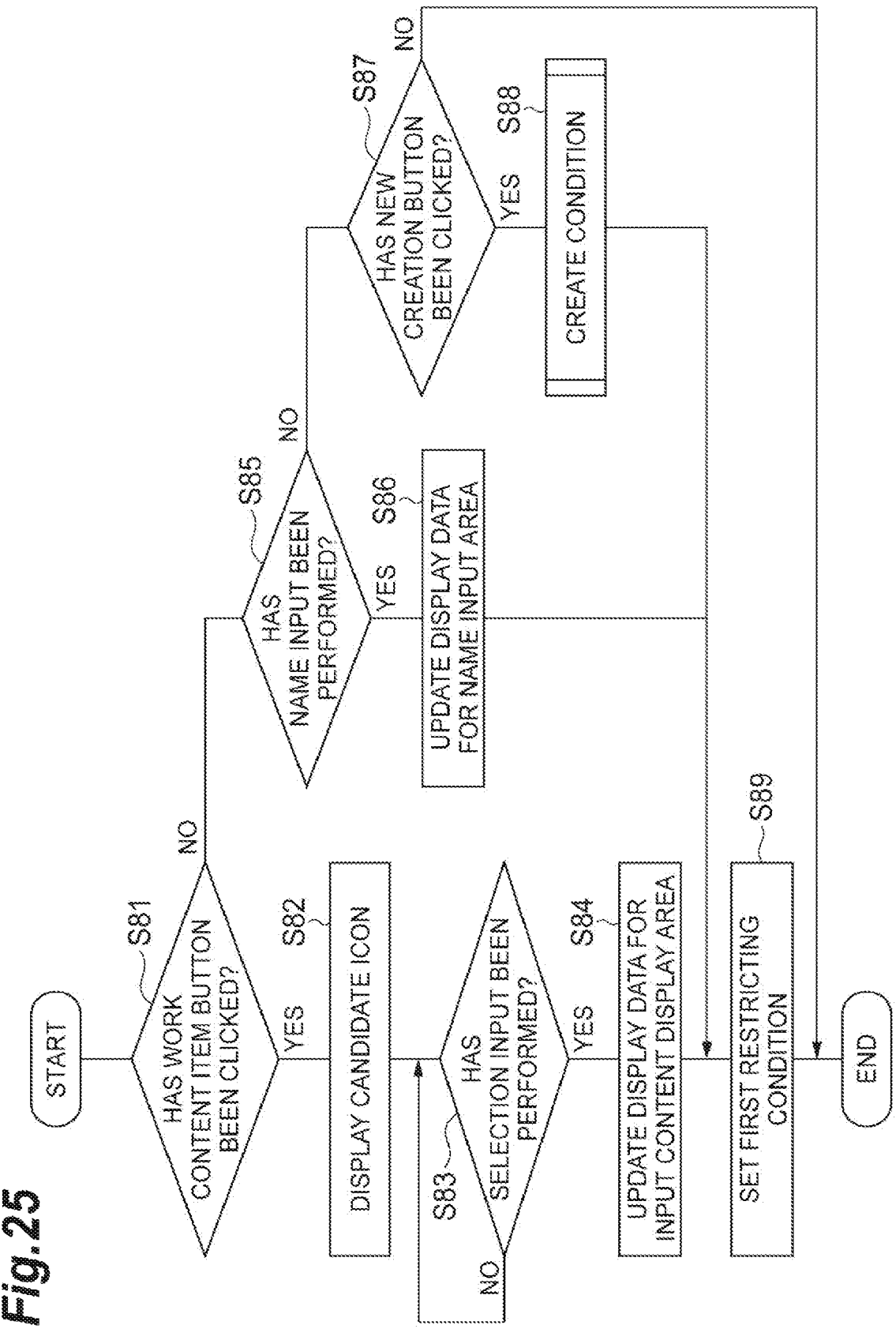
FIG. 25 is a flowchart illustrating an individual condition setting procedure.

Subsequently, the condition setting procedure in above-described operation S66 will be described. As illustrated in FIG. 25, the programming support apparatus 100 first executes operation S81. In operation S81, the first update unit 402 confirms whether the item designation button G11 in the work content input area G10 has been clicked.

In a case where it is determined in operation S81 that the item designation button G11 has been clicked, the programming support apparatus 100 executes operation S82. In operation S82, the first update unit 402 updates the display data for the list display area G2 so as to display an icon of the work content information (for example, work object) to be the options for the items corresponding to the item designation button G11, in the icon selection area G12.

In operation S83, the first update unit 402 waits for icon selection input in the icon selection area G12.

In operation S84, the first update unit 402 updates the display data for the first input area G9 so as to display an icon selected in the icon selection area G12, in the input content display area G13.

In a case where it is determined in operation S81 that the item designation button G11 has not been clicked, the programming support apparatus 100 executes operation S85. In operation S85, it is determined whether text input has been performed in the name input area G15 of the work content input area G10.

In a case where it is determined in operation S85 that there is text input in the name input area G15, the programming support apparatus 100 executes operation S86. In operation S86, the first update unit 402 updates the display data in the first input area G9 so as to display the input content in the name input area G15.

In a case where it is determined in operation S85 that there is no text input in the name input area G15, the programming support apparatus 100 executes operation S87. In operation S87, the first update unit 402 confirms whether the new creation button G18 has been clicked in the condition input section G17 of the restricting condition input area G16.

In a case where it is determined in operation S87 that the new creation button G18 has been clicked, the programming support apparatus 100 executes operation S88. Operation S88 includes processing of creating a condition to be set as the first restricting condition. Specific processing content will be described below.

In operation S89, the first condition setting unit 412 sets the first restricting condition in accordance with the input to the first input area G9 and writes the first restricting condition into the condition buffer 415 as a temporary storage in association with identification information of the work job as a target of the first restricting condition. This completes operation S66.

In a case where it is determined in operation S87 that the new creation button G18 has not been clicked, the programming support apparatus 100 completes operation S66 without executing operation S89.

Figure 26:
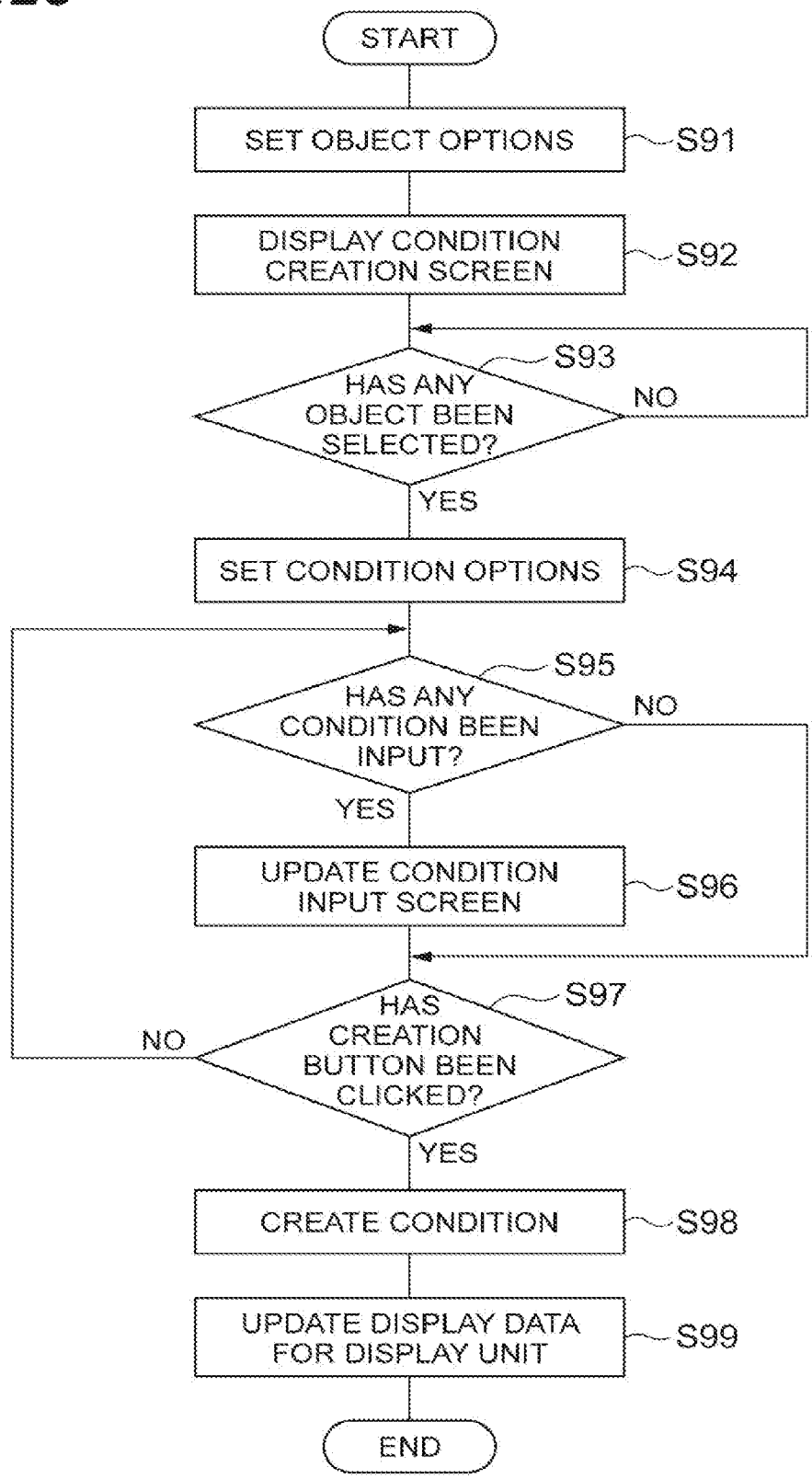
FIG. 26 is a flowchart illustrating a procedure for creating individual conditions.

Subsequently, the condition creation procedure in above-described operation S88 will be described. As illustrated in FIG. 26, in operation S91, the option information acquisition unit 410 obtains first option information specifying an object included in the environment model data from the above-described environment data storage 111. The first input support unit 408 sets options of work objects based on the first option information and generates display data for the options.

In operation S92, the first update unit 402 updates the display data for the first input area G9 so as to display the condition creation window H1. At this time, the first update unit 402 sets the above-described options of the work object in the input box H2 using the data generated by the first input support unit 408.

In operation S93, the first update unit 402 waits for selection input of the work object in the input box H2.

In operation S94, the option information acquisition unit 410 obtains second option information indicating a state of the work object input in the input box H2, from the environment data storage 111. The second input support unit 409 sets the options of the state designation condition based on the second option information and generates display data for the options. The first update unit 402 sets the above-described options of the state designation condition in the input box H4 using the data generated by the second input support unit 409.

In operation S95, the first update unit 402 confirms the presence or absence of input to the input box H3 or the input box H4.

In a case where it is determined in operation S95 that there is an input to the input box H3 or the input box H4, the programming support apparatus 100 executes operation S96. In operation S96, the first update unit 402 updates the display data in the first input area G9 so as to reflect the input content to the condition creation window H1.

In operation S97, the first update unit 402 confirms whether the creation button H5 has been clicked.

In a case where it is determined in operation S97 that the creation button H5 has not been clicked, the programming support apparatus 100 returns the processing to operation S95. Thereafter, updating of the display content of the condition creation window H1 according to the input to the input box H3 or the input box H4 is repeated until the creation button H5 is clicked.

In a case where it is determined in operation S97 that the creation button H5 has been clicked, the programming support apparatus 100 executes operation S98. In operation S98, the first update unit 402 creates a condition according to the data input on the condition creation window H1.

Next, the programming support apparatus 100 executes operation S99. In operation S99, the first update unit 402 updates the display data for the first input area G9 so as to display the condition created in operation S98 on the display section G19. This completes operation S88.

(Second Restricting Condition Setting Procedure)

Figure 27:
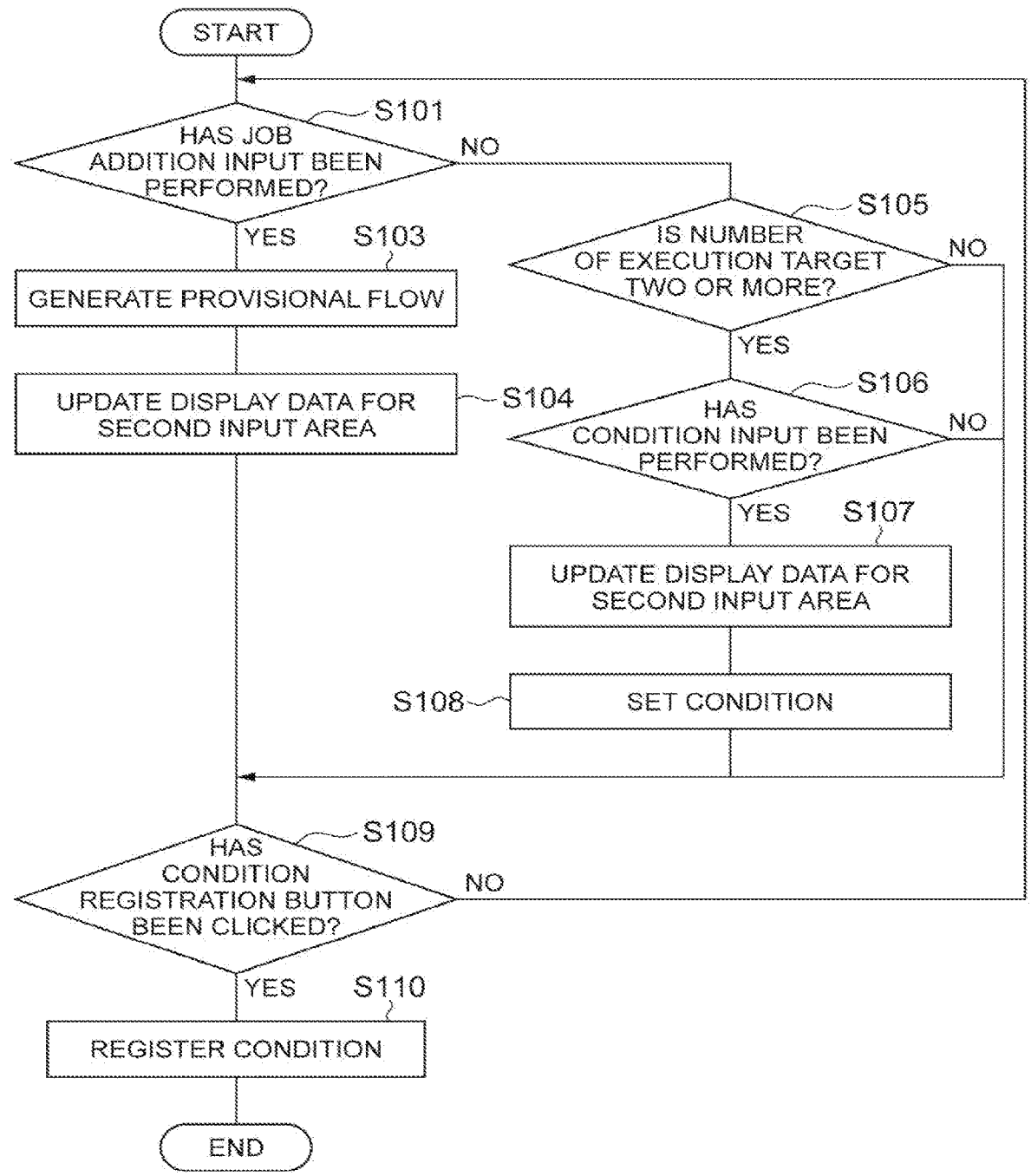
FIG. 27 is a flowchart illustrating a second restricting condition setting procedure.

As illustrated in FIG. 27, in operation S101, the second update unit 403 confirms the presence or absence of input for adding a work job to the second input area G20. For example, the second update unit 403 confirms whether the list element G3 has been dragged from the list display area G2 to the second input area G20.

In a case where it is determined in operation S101 that the list element G3 has been dragged from the list display area G2 to the second input area G20, the programming support apparatus 100 executes operation S103. In operation S103, the provisional flow generation unit 416 generates the provisional flow G23 of a plurality of work jobs displayed in the second input area G20. The provisional flow generation unit 416 sets the execution order of the work jobs in accordance with the relationship between the existing flow element G24 and the drag completion position in the second input area G20 and generates the provisional flow G23 in accordance with this order.

In operation S104, the second update unit 403 updates the display data for the second input area G20 so as to display the provisional flow G23 generated in operation S103 and to enable an input of the second restricting condition between the work jobs in the provisional flow G23.

In a case where it is determined in operation S101 that there is no input for adding a work job to the second input area G20, the programming support apparatus 100 executes operation S105. In operation S105, the second update unit 403 confirms whether two or more work jobs are displayed in the second input area G20.

In a case where it is determined in operation S105 that two or more work jobs are displayed in the second input area G20, the programming support apparatus 100 executes operation S106. In operation S106, the second update unit 403 confirms the presence or absence of input for adding a restricting condition to the second input area G20.

In a case where it is determined in operation S106 that there has been an input for adding a restricting condition, the programming support apparatus 100 executes operation S107. In operation S107, the second update unit 403 updates the display data for the second input area G20 so as to reflect addition of the restricting condition to the display of the provisional flow G23. For example, the second update unit 403 updates the display data for the second input area G20 such that, in a case where the menu element G33 has been dragged from the restriction menu display area G32 to the second input area G20 and the dragging is completed between the two flow elements G24, a restricting condition of the menu element 633 is to be inserted between the two flow elements G24.

In operation S108, the second condition setting unit 417 sets the second restricting condition based on the restricting condition input between the work jobs in the second input area G20.

After executing steps S104 and S108, the programming support apparatus 100 executes operation S109. In a case where it is determined in operation S105 that two or more work jobs are not displayed in the second input area G20 and in a case where it is determined that there is no input for adding a restricting condition in operation S106, the programming support apparatus 100 executes operation S109 without executing S104 or S108. In operation S109, the condition registration unit 419 confirms whether the condition registration button G36 has been clicked.

In a case where it is determined in operation S109 that the condition registration button G36 has not been clicked, the programming support apparatus 100 returns the processing to operation S101. The process of setting the second restricting condition based on the input to the second input area G20 is repeated until the condition registration button G36 is clicked.

In a case where it is determined in operation S109 that the condition registration button G36 has been clicked, the programming support apparatus 100 executes operation S110. In operation S110, the condition registration unit 419 writes the second restricting condition set by the second condition setting unit 417 in the inter-job condition storage 422 in association with the work job as a target of the second restricting condition. Moreover, the condition registration unit 419 writes each of a plurality of work jobs corresponding to each of the plurality of flow elements G24 of the provisional flow G23 into the execution target storage 421 as execution target jobs. This completes the second restricting condition setting procedure.

(Computation Level Setting Procedure)

Figure 28:
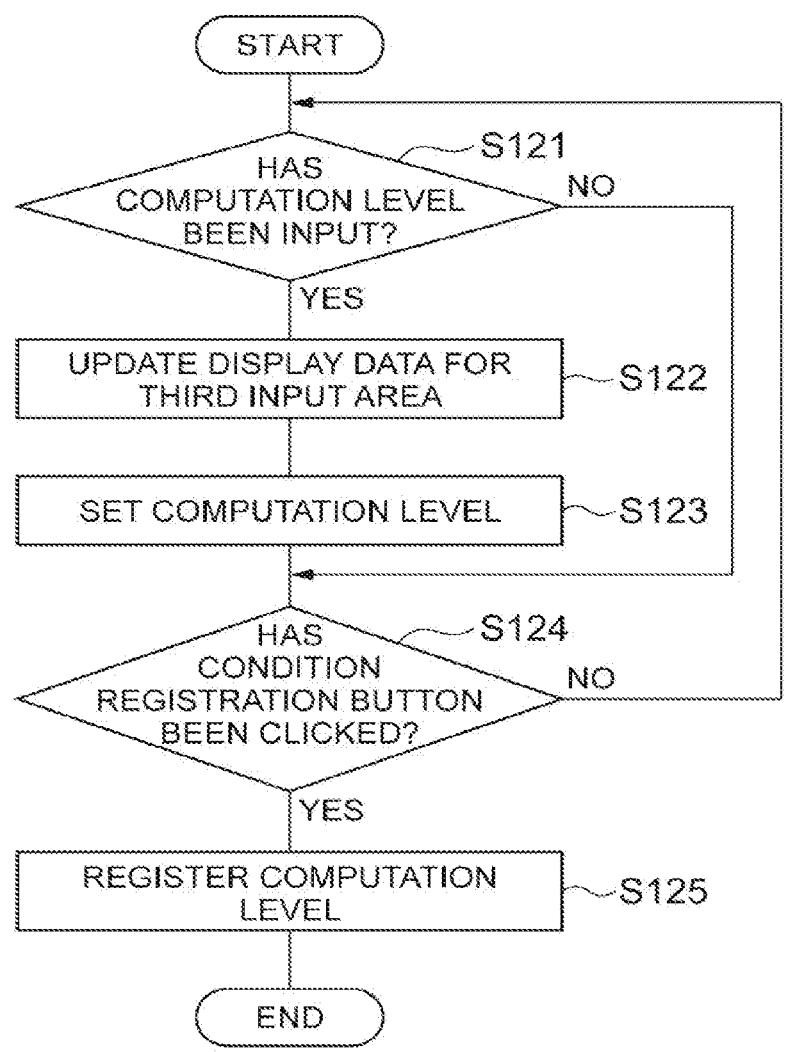
FIG. 28 is a flowchart illustrating a computation level setting procedure.

As illustrated in FIG. 28, the programming support apparatus 100 first executes operation S121. In operation S121, the third update unit 404 confirms whether a computation level has been input to the third input area G34.

In a case where it is determined in operation S121 that there is no input of computation level in the third input area G34, the programming support apparatus 100 executes operation S122. In operation S122, the third update unit 404 updates display data for the third input area G34 so as to reflect the input content in the third input area G34. For example, the third update unit 404 updates the display data so as to turn on the radio button G35 clicked in the third input area G34.

In operation S123, the computation level setting unit 418 sets the above-described computation level in accordance with the input to the third input area G34.

In a case where it is determined in operation S121 that the computation level has not been input in the third input area G34, the programming support apparatus 100 executes operation S124. In operation S124, the condition registration unit 419 confirms whether the condition registration button G36 has been clicked.

In a case where it is determined in operation S124 that the condition registration button G36 has not been clicked, the programming support apparatus 100 returns the processing to operation S121. The process of setting the computation level based on the input to the third input area G34 is repeated until the condition registration button G36 is clicked.

In step S125, the condition registration unit 419 writes the computation level set by the computation level setting unit 418 into the computation condition storage 423. This completes the computation level setting procedure.

(4) Program Generation Procedure

Figure 29:
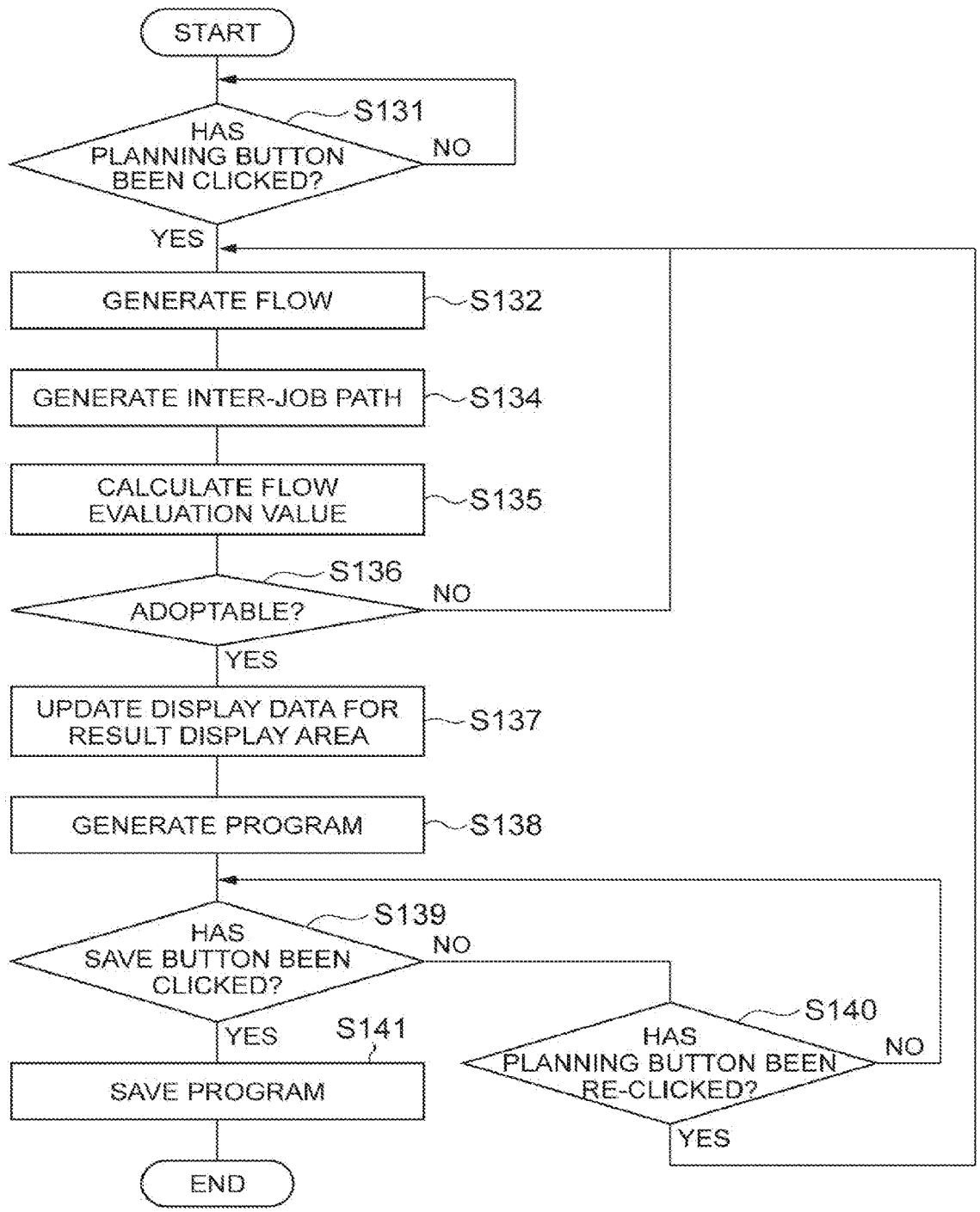
FIG. 29 is a flowchart illustrating a program generation procedure.

As illustrated in FIG. 29, in operation S131, the flow adjustment unit 503 waits for the clicking on the planning button G37.

In operation S132, the planning support unit 501 generates the execution flow which satisfies the first restricting condition and the second restricting condition, as will be explained further below with reference to FIG. 35.

In operation S134, the transitional job generation unit 506 generates second path information defining the operation path of the robot 2 between the work jobs based on the execution flow stored in the flow buffer 508, the first path information obtained by the path information acquisition unit 505, and the environment model data stored in the environment data storage 111.

In operation S135, the flow evaluation unit 507 evaluates the execution flow, the first path information, and the second path information based on an evaluation condition different from the first restricting condition and the second restricting condition. For example, the flow evaluation unit 507 derives evaluation values (such as the above-described execution time or power consumption) of the execution flow, the first path information, and the second path information based on the above-described evaluation condition.

In operation S136, the flow evaluation unit 507 determines adoptability of the execution flow. For example, the flow evaluation unit 507 determines that the execution flow is adoptable in a case where the evaluation value has reached the acceptance level, and determines that the execution flow is not adoptable in a case where the above-described evaluation value has not reached the acceptance level.

In a case where it is determined in operation S136 that the execution flow is not adoptable, the programming support apparatus 100 returns the processing to operation S132. The generation of the execution flow and calculation of the above-described evaluation value are repeated until the execution flow is determined to be adoptable.

In a case where it is determined in operation S136 that the above-described evaluation value is adoptable, the programming support apparatus 100 executes operation S137. In operation S137, the update unit 502 updates the display data for the first input area G9 so as to display the adoptable execution flow on the result output section G29.

In operation S138, the program generation unit 510 generates an operation program of the robot 2 based on the execution flow generated in steps S131 to S136.

In operation S139, the program registration unit 511 confirms whether the save button G38 has been clicked.

In a case where it is determined in operation S139 that the save button G38 has not been clicked, the programming support apparatus 100 executes operation S140. In operation S140, the flow adjustment unit 503 confirms whether the planning button G37 has been re-clicked.

In a case where it is determined in operation S140 that the planning button G37 has not been re-clicked, the programming support apparatus 100 returns the processing to operation S139.

In a case where it is determined in operation S140 that the planning button G37 has been re-clicked, the programming support apparatus 100 returns the processing to operation S132. This procedure executes generation of the operation program again.

In a case where it is determined in operation S139 that the save button G38 has been clicked, the programming support apparatus 100 executes operation S141. In operation S141, the program registration unit 511 writes the operation program generated in operation S138 into the operation program storage 112. This completes the operation program generation procedure.

Figure 35:
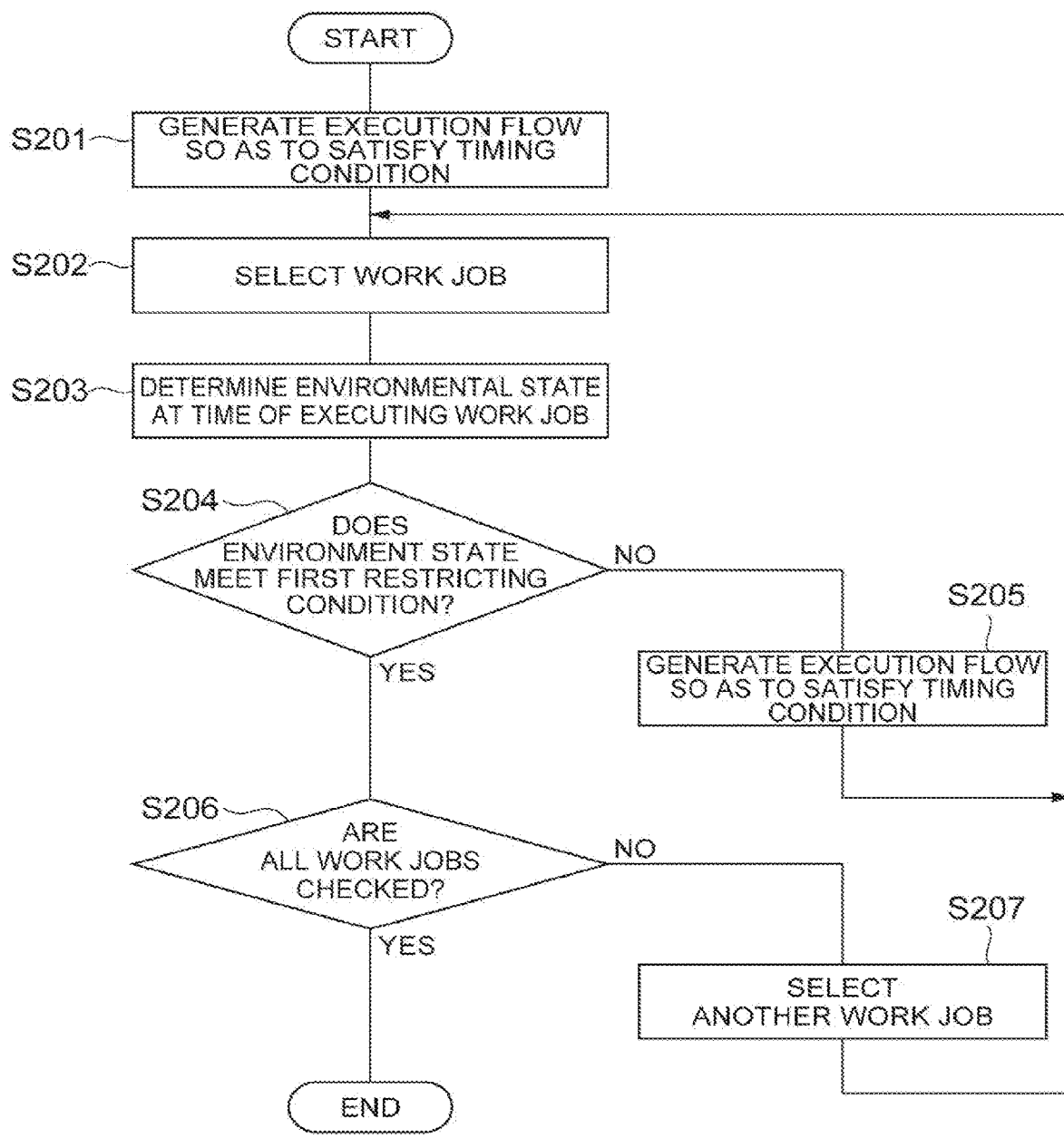
FIG. 35 is a flowchart of a checking procedure.

With reference to FIG. 35, an example procedure of the operation S132 for generating the work flow which satisfies the first restricting condition and/or the second restricting condition will be described.

In operation S201, the flow adjustment unit 503 generates an execution flow so as to be consistent with the timing condition. For example, the flow control unit 503 groups a plurality of execution target work jobs in accordance with timing conditions. Specifically, for each timing condition, all work jobs related to the timing condition are grouped to be consistent with the timing condition. Work jobs that are not related to any timing condition constitute a single group. As a result of grouping, if a plurality of work jobs to be executed include only one group, there is only one execution flow consistent with the timing condition. When a plurality of work jobs to be executed are divided into a plurality of groups, the flow adjustment unit 503 generates an execution flow by randomly arranging the plurality of groups.

Next, the programming support apparatus 100 executes steps S202, S203, and S204. In operation S202, the checking unit 504 selects one of the work jobs for which the first restricting condition is to be checked. In operation S203, based on the execution order of the work jobs which are positioned before the work job to be checked in the execution flow, the checking unit 504 determines an environmental state of the work job to be checked. For example, when Job02 (FIGS. 32 to 34) is the work job to be checked in the work flow, the checking unit 504 determines that since Job01 is executed before Job02 and Job03 is executed after Job02, the lid 12 is therefore open at the timing of Job02. In operation S204, the checking unit 504 checks whether the environmental state determined in operation S203 satisfies the first restricting condition.

In a case where it is determined in operation S204 that the execution environment does not satisfy the first restricting condition, the programming support apparatus 100 executes operation S205. In operation S205, the flow adjustment unit 503 adjusts the execution flow so as to be consistent with the timing condition. For example, the flow adjustment unit 503 changes the order among the plurality of groups grouped based on the timing condition. Thereafter, the programming support apparatus 100 returns the process to operation S202.

In a case where it is determined in operation S204 that the execution environment satisfies the first restricting condition, the programming support apparatus 100 executes operation S206. In operation S206, the checking unit 504 confirms whether confirmation of the first restricting condition is completed for all work jobs in the execution flow.

In a case where it is determined in operation S206 that there is at least one work job for which the first restricting condition is not yet checked (herein after "unchecked work job") remains, the programming support apparatus 100 executes operation S207. In operation S207, the checking unit 504 selects one unchecked work job, and returns the processing to operation S202. The programming support apparatus 100 repeats steps S202 to S207 until checking the first restricting condition for all work jobs of the work flow is completed.

In a case where it is determined in operation S206 that the checking of the first restricting condition for all work jobs is completed, the programming support apparatus 100 finishes the generation procedure of the execution flow.

(5) Simulation Procedure

Figure 30:
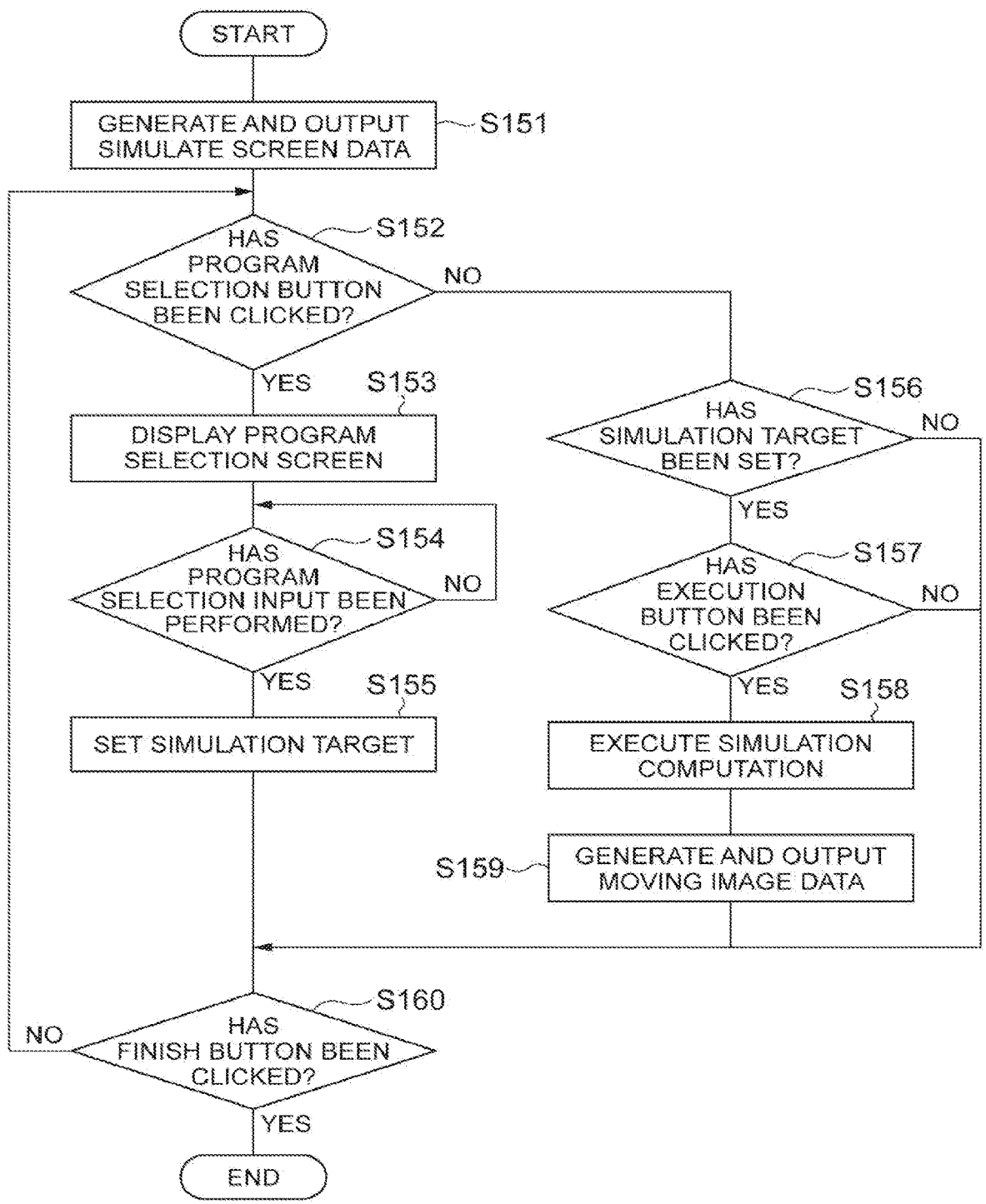
FIG. 30 is a flowchart illustrating a simulation procedure.

As illustrated in FIG. 30, in operation S151, the window data generation unit 601 generates display data for the simulation window K1 and outputs the generated data to the monitor 131.

In operation S152, the update unit 602 confirms whether the program selection button K3 has been clicked.

In a case where it is determined in operation S152 that the program selection button K3 has been clicked, the programming support apparatus 100 executes operation S153. In operation S153, the program setting unit 603 generates a list of operation programs with reference to the operation program storage 112. The update unit 602 updates the display data for the environment construction window B1 so as to display the program selection window L1 with the list being included in the list display area L2.

In operation S154, the program setting unit 603 waits for selection input of the operation program on the program selection window L1.

In operation S155, the program setting unit 603 sets the operation program selected on the program selection window L1 to be an operation program as a simulation target.

In a case where it is determined in operation S152 that the program selection button K3 has not been clicked, the programming support apparatus 100 executes operation S156. In operation S156, the simulation execution unit 604 confirms whether the operation program as a simulation target has been set.

In a case where it is determined in operation S156 that the operation program as a simulation target has been set, the programming support apparatus 100 executes operation S157. In operation S157, the update unit 602 confirms whether the simulation execution button K4 has been clicked.

In a case where it is determined in operation S157 that the simulation execution button K4 has been clicked, the programming support apparatus 100 executes operation S158. In operation S158, the simulation execution unit 604 causes the model of the robot 2 to operate in accordance with the operation program as a simulation target under the simulation environment specified by the environment model data stored in the environment data storage 111.

In operation S159, the moving image data generation unit 605 generates moving image data of the model of the robot 2 in accordance with a simulation result obtained by the simulation execution unit 604. The update unit 602 updates the display data for the drawing area K2 so as to display the moving image data in the list display area L2.

In operation S160, the update unit 602 confirms whether the finish button K5 has been clicked.

In a case where it is determined in operation S160 that the finish button K5 has not been clicked, the programming support apparatus 100 returns the processing to operation S152.

In a case where it is determined in operation S160 that the finish button K5 has been clicked, the programming support apparatus 100 closes the simulation window K1 to finish the processing.

As described above, the programming support apparatus 100 includes: the work job storage 114 configured to store a plurality of work jobs defining an operation pattern of a robot 2; the first condition setting unit 412 configured to set the environmental condition that specifies the operation environment of the robot 2 for one of the work jobs in accordance with an input to the user interface 130; the second condition setting unit 417 configured to set a plurality of work jobs to be executed by the robot 2 in the plurality of work jobs in accordance with an input to the user interface 130; and the planning support unit 501 configured to determine, in an execution flow for defining an execution order of the plurality of work jobs set by the second condition setting unit 417, whether at least one of the work jobs satisfies the environmental condition based on the execution order.

The environmental condition that is an execution restricting condition for a work job tends to have higher universality than a restricting condition on the relationship between the work jobs. Indeed, the environmental condition may apply to the work job, regardless of the operation program including the work job, while the restriction condition on the relationship between the work jobs may be specific to an operation program. Accordingly, by making it possible to set the condition for an execution flow of the work job as an environmental condition, it becomes easy to divert the registered contents. In some examples, at least some of the conditions can be reusable data. Therefore, it is easy to make use of the registered operation program at the time of programming, so as to be effective for reducing the burden of operation programming.

The planning support unit 501 may identify an environmental state at the time of executing one of the work jobs in the execution flow based on the operational content of the robot 2 in another work job in the execution flow and the execution order of the execution flow, and may determine whether the environmental state satisfies the environmental condition of the one of the work jobs. In this case, it can be easily determined whether at least one work job satisfies the environmental condition in an execution flow by comparing the environmental state that can be identified by the execution order with the environmental condition.

In a case that the execution flow includes a first work job and a second work job in this order, the planning support unit 501 may be configured to: identify the environmental state in the time of executing the second work job based on at least the work content of the robot 2 in the first work job; and determine whether the environmental condition satisfies the environmental condition of the second work job. In this case, whether the work job satisfies the environmental condition may be determined.

In a case that the execution flow includes the first work job, the second work job, and a third work job, the planning support unit 501 may be configured to: identify the environmental state in the time of executing the second work job based on at least the work content of the robot in the first work job; update the environmental state based on at least the work content of the robot in the second work job so as to identify the environmental state of the third work job; and determine whether the environmental state satisfies the environmental condition of the third work job. In this case, it may be checked whether the work job satisfies the environmental condition by sequentially updating the environmental state according to the operation content of the robot 2 corresponding to the work jobs arranged in order.

In a case that an operation pattern defined by the first work job includes an operation of physically manipulating a work object, and that the environmental condition of the second work job includes a condition to identify a condition of the work object, the planning support unit 501 may be configured to: identify a state of the work object after the robot operates in accordance with the first work job as an environmental state at the time of executing the second work job; and determine whether the environmental state satisfies the environmental condition of the second work job. In this case, it may be checked whether or not the work job satisfies the environmental condition.

The planning support unit 501 may be configured to: generate, based on an environmental condition of the one work job in the execution flow and the operation content of the robot in the other work job in the execution flow, an order condition required between the one work job and the other work job so that the one work job satisfies the environment; and determine whether the execution order of the execution flow satisfies the execution order. In this case, it may be checked whether the work job satisfies the environmental condition by replacing the environmental condition with the order condition.

In a case that the execution flow includes a first work job determining an operation pattern including a motion of physically manipulating a work object and a second work job on which the environmental condition including a condition defining a state of the work object is set, the planning support unit 501 may be configured to generate the order condition between the first work job and the second work job based on a state of the work object after the robot operates in accordance with the first work job and the state of the work object defined by the environmental condition of the second work job. In this case, it may be checked whether or not the work job satisfies the environmental condition.

The second condition setting unit 417 may be further configured to set a timing condition identifying a relationship of execution timings between at least two of the work jobs to be executed in accordance with an input to the user interface 130, and the planning support unit 501 may be further configured to determine whether the at least one work job satisfies the environmental condition in the execution flow in which the execution order is defined so that the timing condition is satisfied. In this case, usability can be improved by a flexible user interface that allows not only input of environmental conditions but also input of timing conditions. Further, when at least a part of the environmental conditions is input as the timing condition, the calculation load in determining whether or not the environmental condition is satisfied is reduced.

The programming support apparatus 100 may further include the window data generation unit 401 configured to generate data for displaying the planning window G1 including the first input area G9 for inputting the environmental condition and the second input area G20 for choosing the work jobs to be executed, on the user interface 130. This configuration further facilitates grouping some data as reusable data and other data as customizable.

The programming support apparatus 100 may further include: the first update unit 402 configured to update display data for the first input area G9 in accordance with an input to the user interface 130; and a second update unit 403 configured to update display data for the second input area G20 in accordance with an input to the user interface 130. The window data generation unit 401 may generate display data for the planning window G1 further including the list display area G2 indicating a list of a plurality of work jobs. The first update unit 402 may update the display data for the first input area G9 so as to enable an input of the environmental condition of the selected work job in the list display area G2, and the second update unit 403 may update the data for the second input area G20 so as to display the plurality of selected work jobs in the list display area G2 and to enable an input of the timing condition between the plurality of selected work jobs. This configuration facilitates selection of both the work job for which the environmental condition is to be input and the work job for which the timing condition is to be input.

The programming support apparatus 100 may further include the provisional flow generation unit 416 configured to generate a provisional flow of a plurality of work jobs displayed in the second input area G20. The second update unit 403 may update the display data for the second input area G20 so as to display the provisional flow and to enable an input of the timing condition between the work jobs in the provisional flow. This configuration may facilitate inputting the second restricting condition by an intuitive operation procedure in which unchangeable portion is designated after setting the provisional flow. This further facilitates input of the second restricting condition by the operator.

The environmental condition may include a state designation condition to designate the state of the work object of the work job. The first condition setting unit 412 may include: the object setting unit 413 configured to set a work object based on an input to the first input area G9; and the state setting unit 414 configured to set a state designation condition based on an input to the first input area G9. This configuration enables input of the work object and the state designation condition by the operator with low likelihood of indecisiveness to set the first restricting condition, further facilitating input of the first restricting condition by the operator.

The programming support apparatus 100 may further include: the first input support unit 408 configured to set options of work objects and generate display data for the options; and the second input support unit 409 configured to set options of state designation conditions in accordance with the work object as a state designation target and generate display data for the options. With this configuration, the input of the state designation condition is supported in accordance with the input of the work object, further facilitating the input of the first restricting condition by the operator.

The programming support apparatus 100 may further include an option information acquisition unit 410 configured to obtain first option information specifying an object included in environment model data for operation simulation of the robot 2 and second option information indicating a state of the object, from the environment data storage 111 storing the environment model data. The first input support unit 408 may set the options of the work object based on the first option information. The second input support unit 409 may set the options of the state designation condition based on the second option information. This configuration enables setting of the options using the environment model data, further facilitating the input of the first restricting condition by the operator.

The window data generation unit 401 may generate display data for the planning window G1 so as to allow the list display area G2 to be arranged between the first input area G9 and the second input area G20. With this configuration of arranging the list display area G2 shared by the selection of the work job for which the environmental condition is to be input and the selection of the work job for which the timing condition is to be input between the first input area G9 and the second input area G20, it may further enhance the workability of the operator.

The programming support apparatus 100 may further include; the condition registration unit 419 configured to register at least the environmental condition to the condition storage in association with the work job; and the condition reading unit 411 configured to read the first restricting condition and the second restricting condition from the condition storage. This configuration allows a previously recorded restricting condition to be read. Accordingly, it becomes easier to make good use of an already registered operation program.

The planning support unit 501 may include: the checking unit 504 configured to determine whether the at least one work job in the execution flow satisfies the environmental condition; the flow adjustment unit 503 configured to change the execution order so as to be consistent with the timing condition in a case that any one of the work jobs in the execution flow does not satisfy the environmental condition; and the flow evaluation unit 507 configured to evaluate the execution flow based on an evaluation condition different from the environmental condition and the timing condition, and determine adoptability of the execution flow based on an evaluation result. This enables addition of an evaluation process based on the evaluation condition different from the restricting condition, may facilitate performing more reliable programming support.

The planning support unit 501 may further include the transitional job generation unit 506 configured to generate the transitional job defining the operation pattern of the robot 2 between the work jobs based on the execution flow and the environment model data for operation simulation of the robot 2, and the flow evaluation unit 507 may evaluate the execution flow, the work jobs to be executed, and at least one of the transitional job based on the evaluation condition and determine adoptability of the execution flow based on an evaluation result. With this configuration, adoptability of the execution flow is determined in consideration of the operation pattern of the robot between the work jobs, enabling more reliable programming support.

The programming support apparatus 100 may further include the computation level setting unit 418 configured to set a computation level for adjusting a criterion for determining adoptability of the execution flow in accordance with an input to the user interface 130. With this configuration, a balance between speed and reliability of programming support can be adjusted in accordance with user needs.

While the examples have been described above, the present invention is not necessarily limited to the above-described examples, and various modifications are possible without departing from the spirit and scope of the present invention. For example, the programming support apparatus 100 may not include the main module 200, the environment construction module 300, or the simulation module 600.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

Regarding the above examples, the following appendices are appended.

Appendix 1

A programming support apparatus comprising:
a first condition setting unit configured to set a first restricting condition that is an execution restricting condition for each of a plurality of work jobs to be executed by a robot in accordance with an input to a user interface;
a second condition setting unit configured to set a second restricting condition that is a restricting condition on a relationship between the work jobs in accordance with an input to the user interface; and
a planning support unit configured to check an execution timing of at least one of the work jobs based on the first restricting condition and the second restricting condition.

Appendix 2

The programming support apparatus according to appendix 1, further comprising a window data generation unit configured to generate data for displaying an input window including a first input area for inputting the first restricting condition and a second input area for inputting the second restricting condition, on the user interface.

Appendix 3

The programming support apparatus according to appendix 2, further comprising:
a first update unit configured to update display data for the first input area in accordance with an input to the user interface; and
a second update unit configured to update display data for the second input area in accordance with an input to the user interface;
wherein the window data generation unit generates display data for the input window further including a list display area indicating a list of the plurality of work jobs,
the first update unit updates the display data for the first input area so as to enable an input of the first restricting condition of the work job selected in the list display area, and
the second update unit updates the display data for the second input area so as to display the plurality of work jobs selected in the list display area and to enable an input of the second restricting condition between the plurality of work jobs.

Appendix 4

The programming support apparatus according to appendix 3 further comprising a provisional flow generation unit configured to generate a provisional flow of the plurality of work jobs displayed in the second input area, wherein the second update unit updates the display data for the second input area so as to display the provisional flow and to enable an input of the second restricting condition between the work jobs in the provisional flow.

Appendix 5

The programming support apparatus according to appendix 3 or 4,
wherein the first restricting condition includes a state designation condition to designate a state of a work object of the work job, and
the first condition setting unit includes
an object setting unit configured to set the work object based on an input to the first input area, and
a state setting unit configured to set the state designation condition based on an input to the first input area.

Appendix 6

The programming support apparatus according to appendix 5, further comprising:
a first input support unit configured to set options of the work object and generate display data for the options; and
a second input support unit configured to set options of state designation conditions in accordance with the work object as a state designation target and generate display data for the options.

Appendix 7

The programming support apparatus according to appendix 6, further comprising an option information acquisition unit configured to obtain first option information specifying an object included in environment data for operation simulation of the robot and second option information indicating a state of the object, from an environment data storage configured to store the environment data,
wherein the first input support unit sets options of the work object based on the first option information, and
the second input support unit sets options of the state designation condition based on the second option information.

Appendix 8

The programming support apparatus according to appendix 7,
wherein the window data generation unit generates the display data for the input window so as to allow the list display area to be arranged between the first input area and the second input area.

Appendix 9

The programming support apparatus according to any one of appendices 2 to 8, further comprising:
a condition registration unit configured to register at least one of the first restricting condition and the second restricting condition to a condition storage; and
a condition reading unit configured to read at least one of the first restricting condition and the second restricting condition from the condition storage.

Appendix 10

The programming support apparatus according to any one of appendices 1 to 9, wherein the planning support unit further executes generating an execution flow of the plurality of work jobs based on a check result of the execution timing.

Appendix 11

The programming support apparatus according to appendix 10, further comprising a path information acquisition unit configured to obtain first path information defining an operation path of the robot for at least one of the work jobs,
wherein the planning support unit includes:
a timing check unit configured to check the execution timing of at least one of the work jobs based on the first restricting condition and the second restricting condition;
a flow generation unit configured to generate the execution flow so as to satisfy the first restricting condition and the second restricting condition based on the check result of the execution timing; and
a flow evaluation unit configured to evaluate the execution flow and the first path information based on an evaluation condition different from the first restricting condition and the second restricting condition and determine adoptability of the execution flow based on an evaluation result.

Appendix 12

The programming support apparatus according to appendix 11,
wherein the planning support unit further includes a path generation unit configured to generate second path information defining an operation path of the robot between the work jobs based on the execution flow, the first path information, and environment data for operation simulation of the robot, and
the flow evaluation unit evaluates the execution flow, the first path information, and the second path information based on the evaluation condition and determines adoptability of the execution flow based on an evaluation result.

Appendix 13

The programming support apparatus according to appendix 11 or 12, further comprising a computation level setting unit configured to set a computation level for adjusting a criterion for determining adoptability of the execution flow, in accordance with an input to the user interface.

Appendix 14

The programming support apparatus according to any one of appendices 10 to 13, further comprising a program generation unit configured to generate an operation program of the robot based on the execution flow generated by the planning support unit.

Appendix 15

A robot system comprising:
the programming support apparatus according to appendix 14;
the robot; and
a controller configured to control the robot in accordance with the operation program generated by the program generation unit.

Appendix 16

A method to be executed by a programming support apparatus, the method comprising:
setting a first restricting condition that is an execution restricting condition for each of a plurality of work jobs to be executed by the robot, in accordance with an input to a user interface;
setting a second restricting condition that is a restricting condition on a relationship between the work jobs in accordance with an input to the user interface; and
checking an execution timing of at least one of the work jobs based on the first restricting condition and the second restricting condition.

Appendix 17

A program generation method to be executed by a programming support apparatus, the method comprising:
setting a first restricting condition that is an execution restricting condition for each of a plurality of work jobs to be executed by a robot, in accordance with an input to a user interface;
setting a second restricting condition that is a restricting condition on a relationship between the work jobs in accordance with an input to the user interface;
obtaining first path information defining an operation path of the robot for at least one of the work jobs;
checking an execution timing of at least one of the work jobs based on the first restricting condition and the second restricting condition;
generating an execution flow of the plurality of work jobs so as to satisfy the first restricting condition and the second restricting condition based on a check result of the execution timing; and
generating an operation program of the robot based on the execution flow.

What is claimed is:

1. A programming support apparatus comprising circuitry configured to:
store an execution flow as a sequence of work job programs in a storage device, including a first work job program in which a robot performs a first operation pattern that causes a change in physical state of one or more objects being manipulated by the robot, and a second work job program in which the robot performs a second operation pattern after the first operation pattern of the first work job program;
store an object association that relates the first work job program to the change in physical state of the one or more objects caused by the first operation pattern, wherein the object association is stored in the storage device separately from the execution flow;
store an environmental condition that must be satisfied for the robot to perform the second operation pattern;
estimate a physical state of the one or more objects based on the object association stored in the storage device without causing the robot to perform the first operation pattern of the first work job program in the execution flow;
compare the estimated physical state of the one or more objects with the environmental condition that must be satisfied for the robot to perform the second operation pattern of the second work job program;
modify the execution flow by changing the sequence of work job programs such that a third work job program in which the robot performs a third operation pattern is executed before the second work job program, in response to determining that the physical state of the one or more objects does not satisfy the environmental condition of the second operation pattern, wherein the stored object association is maintained after modifying the execution flow;
store a second object association that relates the third work job program to the change in physical state of the one or more objects caused by the third operation pattern, wherein the second object association is stored in the storage device separately from the execution flow;
re-estimate the physical state of the one or more objects based on both the object association of the first work job program and the second object association of the third work job program stored in the storage device, without causing the robot to perform the first operation pattern and the third operation pattern in the modified execution flow;
compare the re-estimated physical state of the one or more objects with the environmental condition of the second operation pattern;
generate an operation program based on the modified execution flow, in response to determining that the physical state of the one or more objects satisfies the environmental condition of the second operation pattern, wherein the third operation pattern of the third work job program is performed before the second operation pattern in the modified execution flow; and
transmit the operation program to control the robot based on the operation program.

2. The programming support apparatus according to claim 1, wherein the execution flow includes the first work job program, the second work job program, and the third work job program,
wherein the second operation pattern causes an additional change in the physical state of the one or more objects,
wherein the object association relates the second work job program to the additional change in physical state of the one or more objects caused by the second operation pattern, and
wherein the circuitry is further configured to:
store an additional environmental condition that must be satisfied for the robot to perform the third operation pattern;
estimate an additional physical state of the one or more objects at a time of execution of the third work job program based on the object association without causing the robot to perform the first operation pattern of the first work job program and the second operation pattern of the second work job program in the execution flow;
compare the additional physical state of the one or more objects with the additional environmental condition that must be satisfied for the robot to perform the third operation pattern of the third work job program; and modify the execution flow by changing the sequence of work job programs in response to determining that the additional physical state of the one or more objects does not satisfy the additional environmental condition, wherein the stored object association is maintained after modifying the execution flow.

3. A robot system comprising:
the programming support apparatus according to claim 1;
the robot; and
a controller configured to control the robot in accordance with the operation program transmitted from the programming support apparatus.

4. The programming support apparatus according to claim 1, wherein the circuitry is further configured to:
store a timing condition identifying a relationship of execution timings between at least two of the work job programs, wherein the timing condition is stored in the storage device separately from the execution flow and the object association; and
modify the execution flow in response to determining that the execution flow does not satisfy the timing condition, wherein the stored object timing condition is maintained after modifying the execution flow.

5. The programming support apparatus according to claim 4, wherein the circuitry is further configured to generate data for displaying an input window in a user interface, the input window comprising:
a first input area for inputting the object association and the environmental condition; and
a second input area for inputting the execution flow and the timing condition.

6. The programming support apparatus according to claim 5, wherein the input window further includes a list display area showing a list of the work job programs, and
wherein the circuitry is further configured to:
update, in response to determining that one work job program is designated in the list display area, the first input area to enable an input for the one work job program;
generate the execution flow in response to determining that the work job programs are transferred from the list display area to the second input area; and
update the second input area so as to display the execution flow.

7. The programming support apparatus according to claim 1, wherein the third operation pattern of the third work job program is performed between the first operation pattern and the second operation pattern in the modified execution flow, in generating the operation program.

8. A programming support method comprising:
storing an execution flow as a sequence of work job programs in a storage device, including a first work job program in which a robot performs a first operation pattern that causes a change in physical state of one or more objects being manipulated by the robot, and a second work job program in which the robot performs a second operation pattern after the first operation pattern of the first work job program;
storing an object association that relates the first work job program to the change in physical state of the one or more objects caused by the first operation pattern, wherein the object association is stored in the storage device separately from the execution flow;
storing an environmental condition that must be satisfied for the robot to perform the second operation pattern;
estimating a physical state of the one or more objects based on the object association stored in the storage device without causing the robot to perform the first operation pattern of the first work job program in the execution flow;
comparing the estimated physical state of the one or more objects with the environmental condition that must be satisfied for the robot to perform the second operation pattern of the second work job program;
modifying the execution flow by changing the sequence of work job programs such that a third work job program in which the robot performs a third operation pattern is executed before the second work job program, in response to determining that the physical state of the one or more objects does not satisfy the environmental condition of the second operation pattern, wherein the stored object association is maintained after modifying the execution flow;
storing a second object association that relates the third work job program to the change in physical state of the one or more objects caused by the third operation pattern, wherein the second object association is stored in the storage device separately from the execution flow;
re-estimating the physical state of the one or more objects based on both the object association of the first work job program and the second object association of the third work job program stored in the storage device, without causing the robot to perform the first operation pattern and the third operation pattern in the modified execution flow;
comparing the re-estimated physical state of the one or more objects with the environmental condition of the second operation pattern;
generating an operation program based on the modified execution flow, in response to determining that the physical state of the one or more objects satisfies the environmental condition of the second operation pattern, wherein the third operation pattern of the third work job program is performed before the second operation pattern in the modified execution flow; and
transmitting the operation program to control the robot based on the operation program.

9. The programming support method according to claim 8, wherein the execution flow includes the first work job program, the second work job program, and the third work job program,
wherein the second operation pattern causes an additional change in the physical state of the one or more objects,
wherein the object association relates the second work job program to the additional change in physical state of the one or more objects caused by the second operation pattern, and
wherein the method further comprises:
storing an additional environmental condition that must be satisfied for the robot to perform the third operation pattern;
estimating an additional physical state of the one or more objects at a time of execution of the third work job program based on the object association without causing the robot to perform the first operation pattern of the first work job program and the second operation pattern of the second work job program in the execution flow;
comparing the additional physical state of the one or more objects with the additional environmental condition that must be satisfied for the robot to perform the third operation pattern of the third work job program; and
modifying the execution flow by changing the sequence of work job programs in response to determining that the additional physical state of the one or more objects does not satisfy the additional environmental condition, wherein the stored object association is maintained after modifying the execution flow.

10. The programming support method according to claim 8, further comprising:
storing a timing condition identifying a relationship of execution timings between at least two of the work job programs, wherein the timing condition is stored in the storage device separately from the execution flow and the object association; and
modifying the execution flow in response to determining that the execution flow does not satisfy the timing condition, wherein the stored object timing condition is maintained after modifying the execution flow.

11. The programming support method according to claim 10, further comprising generating data for displaying an input window in a user interface, the input window comprising:
a first input area for inputting the object association and the environmental condition; and
a second input area for inputting the execution flow and the timing condition.

12. The programming support method according to claim 11, wherein the input window further includes a list display area showing a list of the work job programs, and
wherein the method further comprises updating, in response to determining that one work job program is designated in the list display area, the first input area to enable an input for the one work job program.

13. The programming support method according to claim 12, further comprising:
generating the execution flow in response to determining that the work job programs are transferred from the list display area to the second input area; and
updating the second input area so as to display the execution flow.

14. The programming support method according to claim 8, further comprising re-executing said estimating the physical state, said comparing the physical state, and said modifying the execution flow, until the physical state of the one or more objects satisfies the environmental condition.

15. The programming support method according to claim 8, wherein the third operation pattern of the third work job program is performed between the first operation pattern and the second operation pattern in the modified execution flow, in generating the operation program.

16. A non-transitory memory device having instructions stored thereon that, in response to execution by a processing device, cause the processing device to perform operations comprising:
storing an execution flow as a sequence of work job programs in a storage device, including a first work job program in which a robot performs a first operation pattern that causes a change in physical state of one or more objects being manipulated by the robot, and a second work job program in which the robot performs a second operation pattern after the first operation pattern of the first work job program;
storing an object association that relates the first work job program to the change in physical state of the one or more objects caused by the first operation pattern, wherein the object association is stored in the storage device separately from the execution flow;

storing an environmental condition that must be satisfied for the robot to perform the second operation pattern;

estimating a physical state of the one or more objects based on the object association stored in the storage device without causing the robot to perform the first operation pattern of the first work job program in the execution flow;

comparing the estimated physical state of the one or more objects with the environmental condition that must be satisfied for the robot to perform the second operation pattern of the second work job program;

modifying the execution flow by changing the sequence of work job programs such that a third work job program in which the robot performs a third operation pattern is executed before the second work job program, in response to determining that the physical state of the one or more objects does not satisfy the environmental condition of the second operation pattern, wherein the stored object association is maintained after modifying the execution flow;

storing a second object association that relates the third work job program to the change in physical state of the one or more objects caused by the third operation pattern, wherein the second object association is stored in the storage device separately from the execution flow;

re-estimating the physical state of the one or more objects based on both the object association of the first work job program and the second object association of the third work job program stored in the storage device, without causing the robot to perform the first operation pattern and the third operation pattern in the modified execution flow;

comparing the re-estimated physical state of the one or more objects with the environmental condition of the second operation pattern;

generating an operation program based on the modified execution flow, in response to determining that the physical state of the one or more objects satisfies the environmental condition of the second operation pattern, wherein the third operation pattern of the third work job program is performed before the second operation pattern in the modified execution flow; and transmitting the operation program to control the robot based on the operation program.

17. The memory device according to claim 16, wherein the execution flow includes the first work job program, the second work job program, and the third work job program, wherein the second operation pattern causes an additional change in the physical state of the one or more objects, wherein the object association relates the second work job program to the additional change in physical state of the one or more objects caused by the second operation pattern, and wherein the operations further comprise:

storing an additional environmental condition that must be satisfied for the robot to perform the third operation pattern;

estimating an additional physical state of the one or more objects at a time of execution of the third work job program based on the object association without causing the robot to perform the first operation pattern of the first work job program and the second operation pattern of the second work job program in the execution flow;

comparing the additional physical state of the one or more objects with the additional environmental condition that must be satisfied for the robot to perform the third operation pattern of the third work job program; and modifying the execution flow by changing the sequence of work job programs in response to determining that the additional physical state of the one or more objects does not satisfy the additional environmental condition, wherein the stored object association is maintained after modifying the execution flow.

18. The memory device according to claim 16, wherein the operations further comprise:

storing a timing condition identifying a relationship of execution timings between at least two of the work job programs, wherein the timing condition is stored in the storage device separately from the execution flow and the object association; and modifying the execution flow in response to determining that the execution flow does not satisfy the timing condition, wherein the stored object timing condition is maintained after modifying the execution flow.

19. The memory device according to claim 18, wherein the operations further comprise generating data for displaying an input window in a user interface, the input window comprising:

a first input area for inputting the object association and the environmental condition; and a second input area for inputting the execution flow and the timing condition.

20. The memory device according to claim 19, wherein the input window further includes a list display area showing a list of the work job programs, and wherein the operations further comprise updating, in response to determining that one work job program is designated in the list display area, the first input area to enable an input for the one work job program.

21. The memory device according to claim 18, wherein the operations further comprise re-executing said estimating the physical state, said comparing the physical state, and said modifying the execution flow, until the physical state of the one or more objects satisfies the environmental condition.

22. The memory device according to claim 20, wherein the operations further comprise:

generating the execution flow in response to determining that the work job programs are transferred from the list display area to the second input area; and updating the second input area so as to display the execution flow.

23. The memory device according to claim 16, wherein the third operation pattern of the third work job program is performed between the first operation pattern and the second operation pattern in the modified execution flow, in generating the operation program.

* * * * *